United States Patent [19]

MacWilliams et al.

[11] Patent Number: 5,355,467
[45] Date of Patent: Oct. 11, 1994

[54] SECOND LEVEL CACHE CONTROLLER UNIT AND SYSTEM

[75] Inventors: Peter D. MacWilliams, Aloha; Robert L. Farrell, Portland, both of Oreg.; Adalberto Golbert; Itzik Silas, both of Haifa, Israel

[73] Assignee: Intel Corporation, Santa Clara, Calif.

[21] Appl. No.: 208,090

[22] Filed: Mar. 8, 1994

Related U.S. Application Data

[63] Continuation of Ser. No. 710,507, Jun. 4, 1991, abandoned.

[51] Int. Cl.⁵ .................................. G06F 13/00
[52] U.S. Cl. .................................. 395/425
[58] Field of Search .......................... 395/425

[56] References Cited

U.S. PATENT DOCUMENTS

| 4,442,487 | 4/1984 | Fletcher et al. | 395/425 |
| 4,445,174 | 4/1984 | Fletcher et al. | 395/425 |
| 4,802,085 | 1/1989 | Levy et al. | 395/375 |
| 5,214,767 | 5/1993 | Wanner et al. | 395/425 |

FOREIGN PATENT DOCUMENTS

| 0052370 | 11/1981 | European Pat. Off. . |
| 0243724 | 4/1987 | European Pat. Off. . |
| 0434250 | 11/1990 | European Pat. Off. . |
| 2065941 | 12/1980 | United Kingdom . |
| 2178205 | 6/1986 | United Kingdom . |
| 2223868 | 9/1989 | United Kingdom . |
| 2235554 | 3/1990 | United Kingdom . |
| 2248952 | 6/1991 | United Kingdom . |

Primary Examiner—David L. Robertson
Attorney, Agent, or Firm—Blakely, Sokoloff, Taylor & Zafman

[57] ABSTRACT

A second level cache memory controller, implemented as an integrated circuit unit, operates in conjunction with a secondary random access cache memory and a main memory (system) bus controller to form a second level cache memory subsystem. The subsystem is interfaced to the local processor (CPU) bus and to the main memory bus providing independent access by both buses, thereby reducing traffic of the main memory bus when the data required by the CPU is located in secondary cache. Similarly, CPU bus traffic is minimized when secondary cache access by the main memory bus for snoops and write-backs to main memory. Snoop latches interfaced with the main memory bus provide snoop access to the cache memory via the cache directory in the secondary cache controller unit. The controller also supports parallel look-up in the controller tag array and the secondary cache using most-recently-used (MRU) main memory write-through and pipelining of memory bus cycle requests.

9 Claims, 26 Drawing Sheets

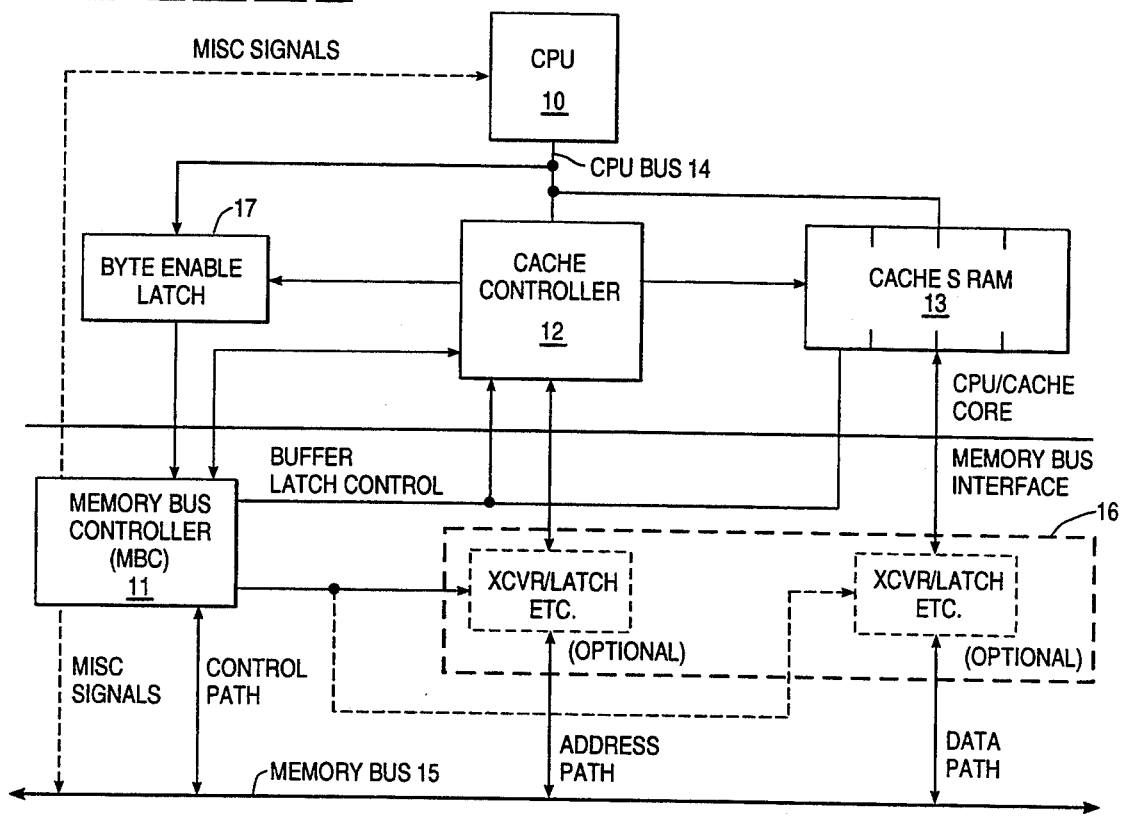
FIG_1
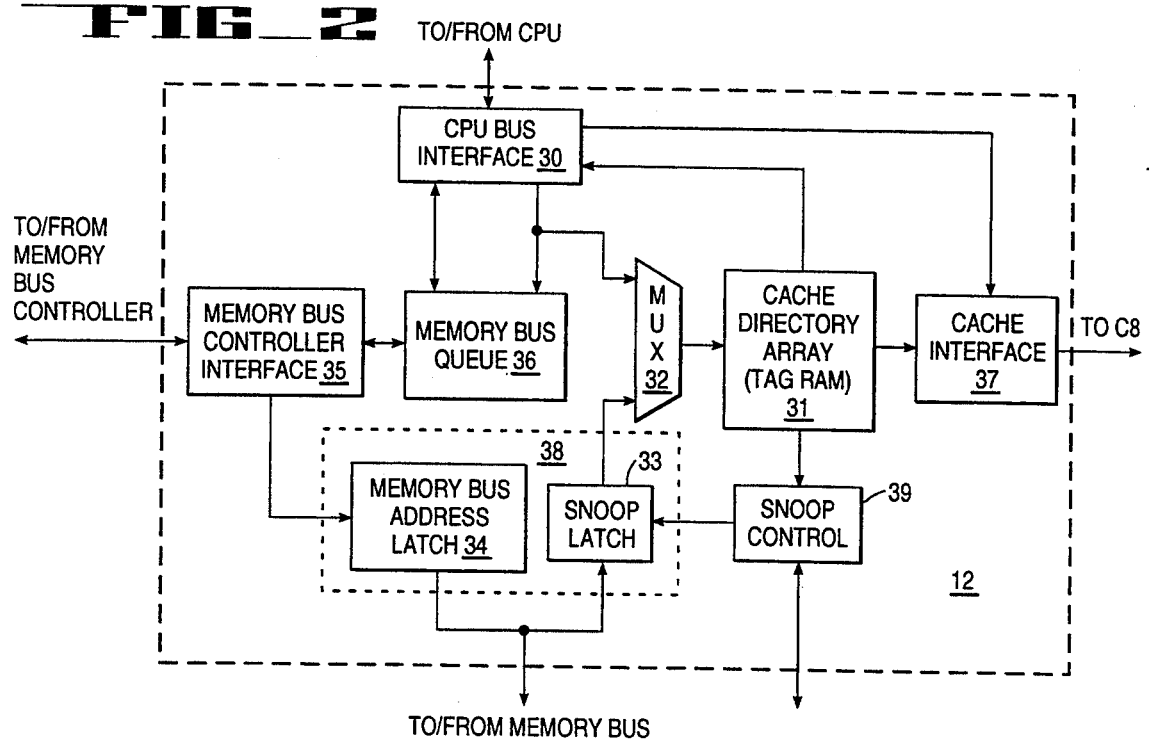
FIG_2

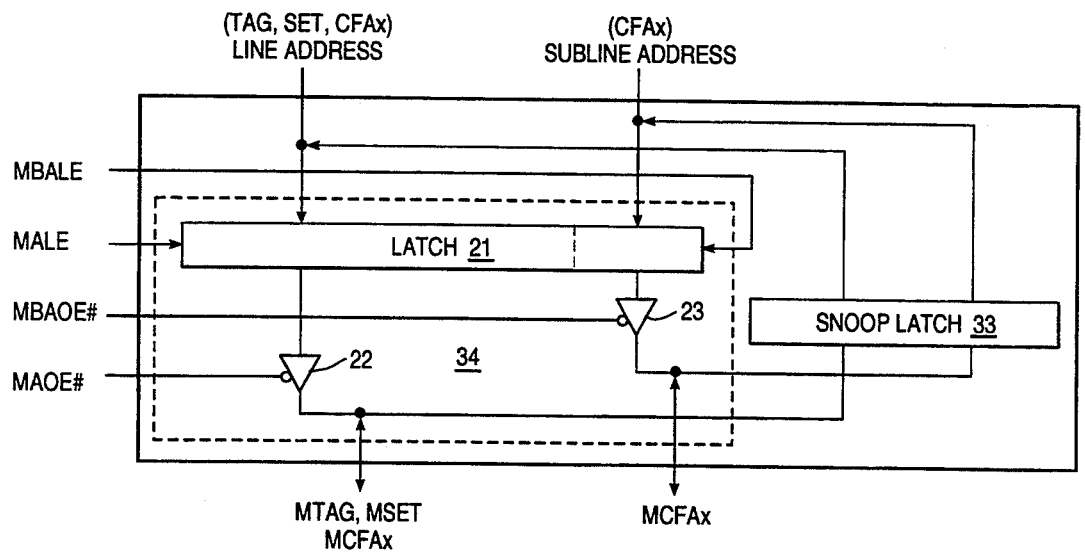
FIG_3
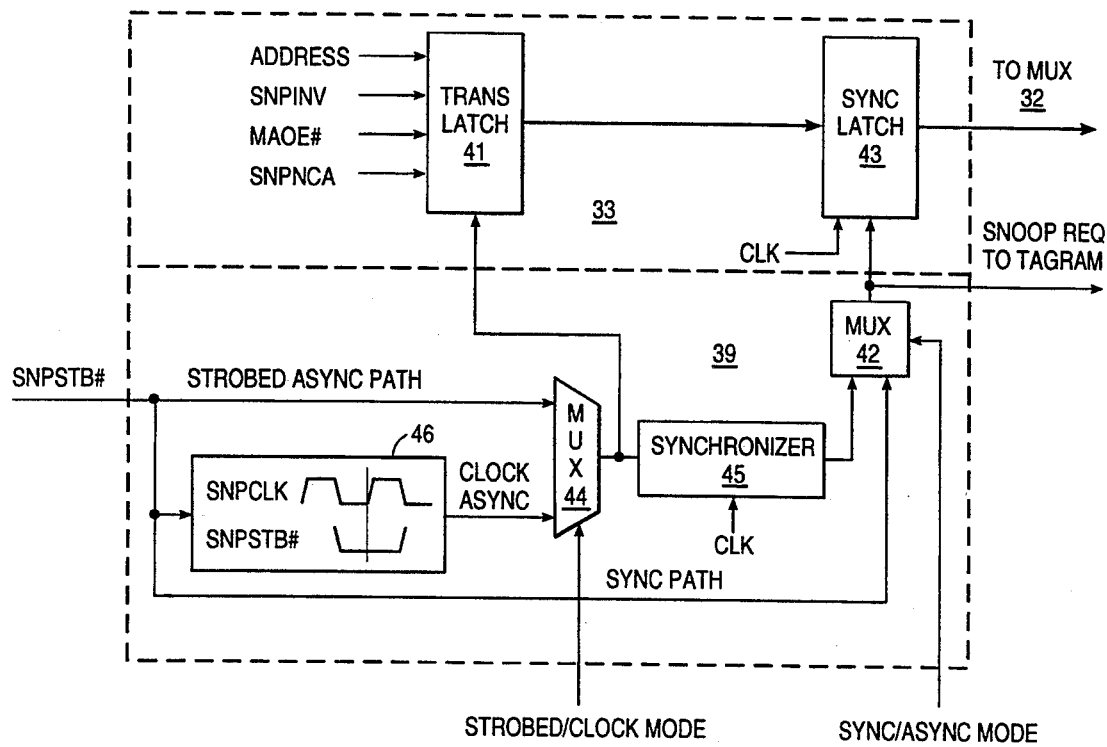
FIG_4

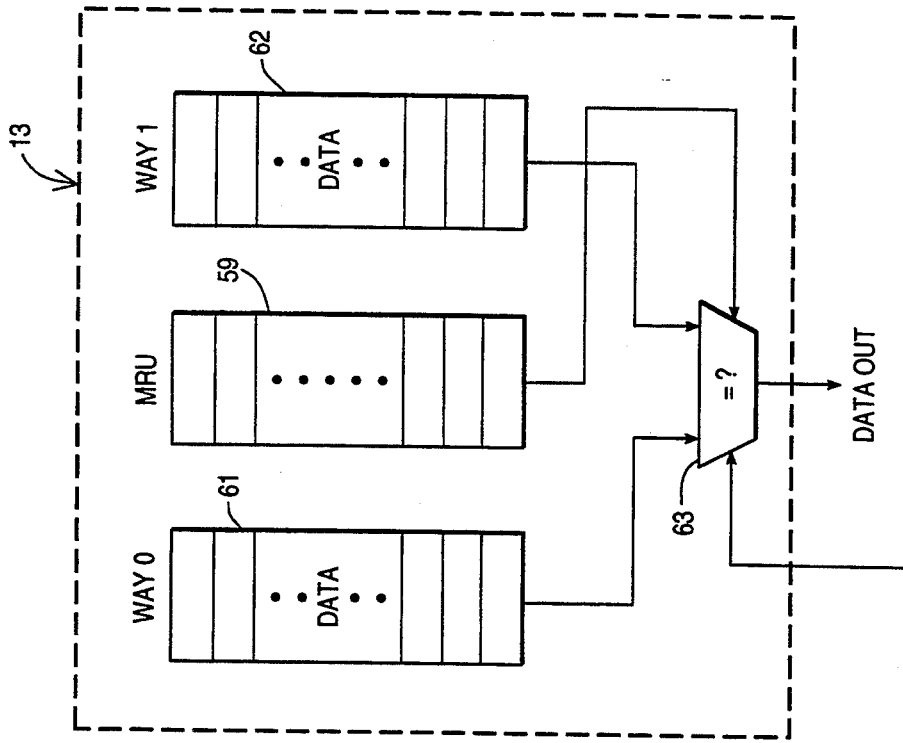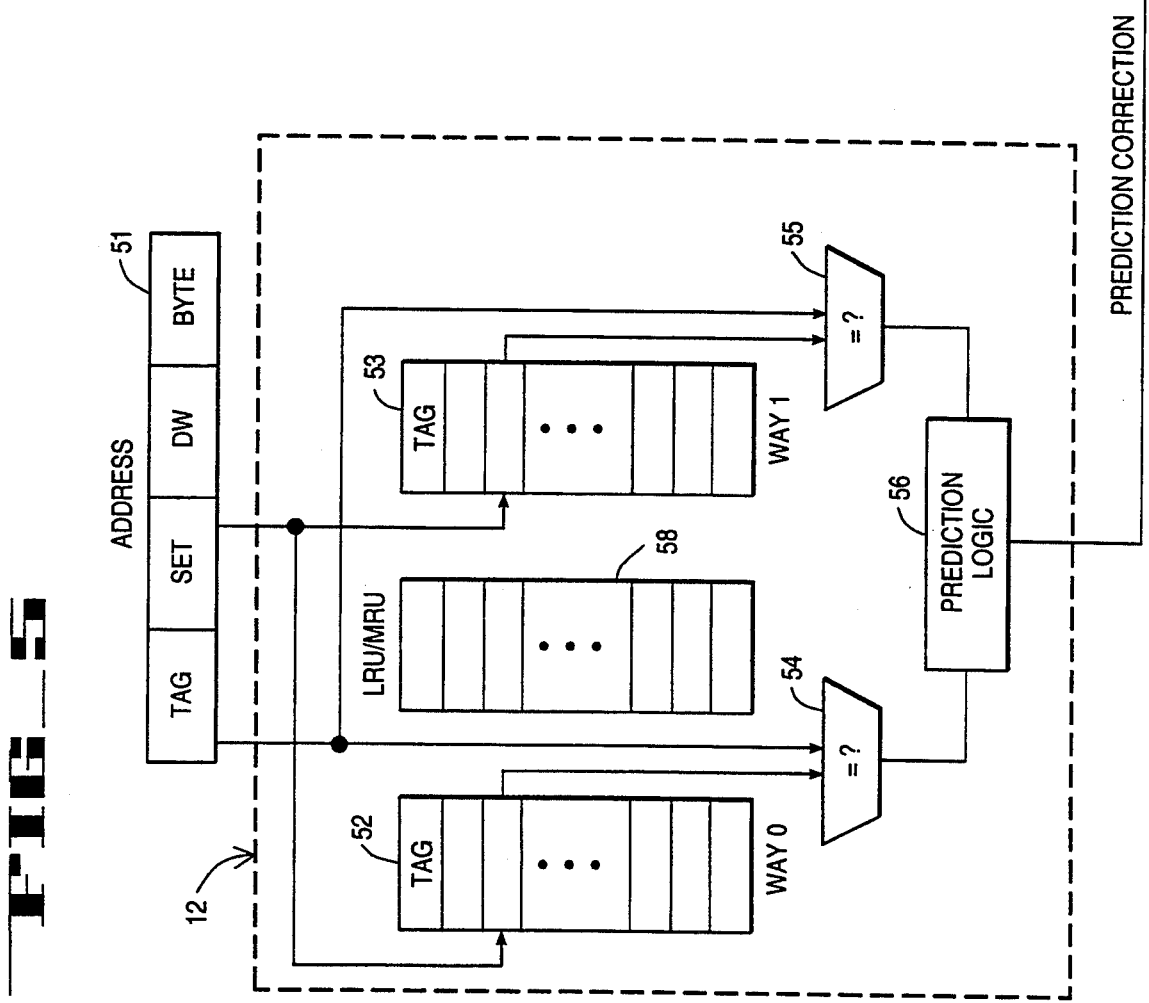
FIG_5

FIG_6

| | A | B | C | D | E | F | G | H | J | K | L | M | N | P | Q | R | S | |
|---|---|---|---|---|---|---|---|---|---|---|---|---|---|---|---|---|---|---|
| 1 | TAG6 | TAG10 | RDYSRC | PBIOUT# | VCC | SNPBSY# | VCC | VCC | MRO# | VCC | VCC | DRCTM# | VCC | BRDY# | SWEND# | MKEN# | NC | 1 |
| 2 | TAG7 | CPAS | MCACHE# | PALL0# | VSS | VSS | VSS | VSS | VSS | VSS | VSS | CRDY# | VSS | TM6 | MALE | V36 | NC | 2 |
| 3 | TAG3 | TAG5 | KLOCKS | CDC# | CAD0# | SNPADS# | MTMIT# | SNPCYC# | CWAY | MWDWT# | VSS | DGT# | TDI | TCK | SNPNCA | SNPSTD# | SNPCLK | 3 |
| 4 | TAG1 | TAG4 | TDO | CMIO# | CWF# | COTS# | CAHOLD | MHTM# | CPLOCK# | VSS | CNA# | KWEND# | PLUSM# | MBALE | SYNC# | MCFAC2 | MAOE# | 4 |
| 5 | VCC | VSS | TAG11 | NENE# | | | | | | | | | | SNPINV | RESET | VSS | VCC | 5 |
| 6 | VCC | VSS | SMLN# | CFA2 | | | | | | | | | | MBAOE# | MCFA3 | VSS | VCC | 6 |
| 7 | VCC | VSS | TAG6 | TAG8 | | | | | | | | | | MTAG11 | MTAG10 | VSS | VCC | 7 |
| 8 | VCC | VSS | TAG0 | TAG2 | | | | | | | | | | MTAG6 | MTAG4 | VSS | VCC | 8 |
| 9 | SET10 | SET9 | VCC | SET7 | | | BOTTOM SIDE VIEW | | | | | | | MTAG1 | MTAG2 | VSS | VCC | 9 |
| 10 | VCC | VSS | VSS | SET8 | | | | | | | | | | MSET8 | MTAG0 | VSS | VCC | 10 |
| 11 | VCC | VSS | SET6 | CLK | | | | | | | | | | MSET2 | MSET10 | VSS | VCC | 11 |
| 12 | VCC | SET3 | SET4 | SET5 | | | | | | | | | | MSET1 | MSET9 | VSS | VCC | 12 |
| 13 | VCC | VSS | SET1 | SET0 | | | | | | | | | | MCFA6 | MSET5 | VSS | VCC | 13 |
| 14 | NC | CFA1 | SET2 | CFA6 | CFA6 | BRDYC2# | VSS | DC# | [CPQS] [WRMRST] | WRARP# | WBA | MCFA1 | MCFA6 | MSET3 | MTAG6 | | | 14 |
| 15 | NC | ADO# | BLAST# | BRDYC1# | CFA0 | LEN | CLEN0 | PCD | RADS# | CLEN1 | WAY | WBWB# | WBTYP | MCFA4 | MSET0 | MTAG6 | MTAG7 | 15 |
| 16 | CFA4 | LOCK# | BLB# | KID4# | VSS | MIC# | VSS | VSS | VSS | VSS | VSS | VSS | VSS | DUO# | MCFA0 | MSET4 | MTAG9 | 16 |
| 17 | AHOLD | WP# | PWT | [CPUTYP] | VCC | VCC | VCC | VCC | NC | VCC | VCC | VCC | VCC | MCYO# | MAWEA# | MSET6 | MSET7 | 17 |
| | A | B | C | D | E | F | G | H | J | K | L | M | N | P | Q | R | S | |

PINOUT (BOTTOM VIEW)

FIG_7

| SIGNAL | LOCATION | SIGNAL | LOCATION | SIGNAL | LOCATION |
|---|---|---|---|---|---|
| ADS# | B15 | AHOLD | A17 | BGT# | M03 |
| BLAST# | C15 | BLE# C16 | | BOFF#[CLEN0] | G15 |
| BRDY# | P01 | BRYC1# | D15 | BRDYC2# | F14 |
| BUS# | P16 | CACHE# | G14 | CADS# | E03 |
| CAHOLD | G04 | CDC# D03 | | CDTS# | F04 |
| CFA0 | E15 | CFA1 B14 | | CFA2# | D06 |
| CFA3 | B02 | CFA4 A16 | | CFA5 | E14 |
| CFA6 | D14 | CFG3 J14 | | CLK | D11 |
| CMIO# | D04 | CNA#[CFG0] | L04 | CRDY#[SLFTST#] | M02 |
| CWAY | J03 | CWR# | E04 | DC# | H14 |
| DRCTM# | M01 | EADS# | J15 | FLUSH#[NCPFLD] | N04 |
| FPFLD[FPFLDEN] | J04 | FSIOUT# | D01 | HITM# | H04 |
| HITM[CPUTYP] | D17 | INV[CLEN1] | K15 | KEN# D16 | |
| KLOCK# | C03 | KWEND#[CFG2] | M04 | LEN | F15 |
| LOCK# | B16 | MALE# | Q02 | MAOE# | S04 |
| MAWEA# | Q17 | MBALE[HIGHZ#] | P04 | MBAOE# | P06 |
| MCACHE# | C02 | MCFA0 | Q16 | MCFA1 | N14 |
| MCFA2 | R04 | MCFA3 | Q06 | MCFA4 | P15 |
| MCFA5 | P14 | MCFA6 | P13 | MCYC# | P17 |
| MIO# | F16 | MKEN# | R01 | MRO# | J01 |
| MSET0 | Q15 | MSET1 | P12 | MSET10 | Q11 |
| MSET2 | P11 | MSET3 | Q14 | MSET4 | R16 |
| MSET5 | Q13 | MSET6 | R17 | MSET8 | P10 |
| MSET9 | Q12 | MTAG0 | Q10 | MTAG1 | P09 |
| MTAG10 | Q07 | Mtag11 | P07 | MTAG2 | Q09 |
| MTAG3 | R14 | MTAG4 | Q08 | MTAG5 | R15 |
| MTAG6 | S14 | MTAG7 | S15 | MTAG7 | S17 |
| MTAG8 | P08 | MTAG9 | S16 | MTHIT# | G03 |
| MWBWT# | K03 | NA# J17 | | NENE# | D05 |
| PALLC# | D02 | PCD H15 | | PWT | C17 |
| RDYSRC | C01 | RESET | Q05 | SET0 | D13 |
| SET1 | C13 | SET10 | A09 | SET2 | C14 |
| SET3 | B12 | SET4 C12 | | SET5 | C11 |
| SET6 | D12 | SET7 D09 | | SET8 | D10 |
| SET9 | B09 | SMLN# | C06 | SNPADS# | F03 |
| SNPBSY# | F01 | SNPCLK[SNPMD] | S03 | SNPCYC# | H03 |
| SNPINV | P05 | SNPNCA | Q03 | SNPSTB# | R03 |
| SWEND#[CFG1] | Q01 | SYNC#[MEMLDRV] | Q04 | TAG0 | C08 |
| TAG1 | A04 | TAG10 | B01 | TAG11 | C05 |
| TAG2 | D08 | TAG3 A03 | | TAG4 | B04 |
| TAG5 | B03 | TAG6 C07 | | TAG7 | A02 |
| TAG8 | D07 | TAG9 A01 | | TCK | P03 |
| TDI N03 | | TDO C04 | | TMS | P02 |
| WAYL15 | | WBA M14 | | WBTYP | N15 |
| WBWE# | M15 | WBWT#[WRMRST] | K14 | WR# | B17 |
| WRARR# | L14 | | | | |
| NC A14, A15, S01, S02 | | VCC A05-A08, A10-A13, E01, E17, H01, H17, K01, K17, L01, L17, C09, N17, F17, G01, G17, M17, N01, S05-S13 | | VSS B05-B08, B0-B11, B13 E02, E16, F02, H02, H16, J02, J16, K02, K04, K16, L02-L03, L16, C10, N16, G02, G16, R02, R05-R10, M16, N02, R11-R13 | |

FIG_8
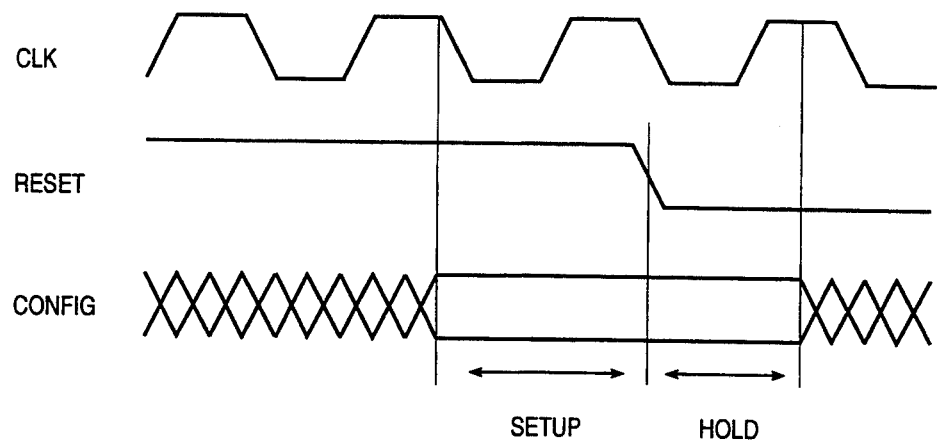
FIG_9
CFG0-CFG3, CPU CONFIGURATION
| CFIG NO. | LINE RATIO | LINES/Sec | NO. OF TAGS | CFG3 | CFG2 | CFG1 | CFG0 | LR1 | LR0 | SEC2# | TAG8 |
|---|---|---|---|---|---|---|---|---|---|---|---|
| 1 | 1 | 1 | 8K | 0 | 0 | 1 | 1 | 0 | 0 | 1 | 1 |
| 2 | 2 | 1 | 4K | 0 | 1 | 1 | 0 | 0 | 1 | 1 | 0 |
| 3 | 1 | 2 | 8K | 0 | 0 | 0 | 1 | 0 | 0 | 0 | 1 |
| 4 | 2 | 1 | 8K | 0 | 1 | 1 | 1 | 0 | 1 | 1 | 1 |
| 5 | 4 | 1 | 4K | 1 | 0 | 1 | 0 | 1 | 0 | 1 | 0 |
| 6 | 2 | 2 | 8K | 0 | 1 | 0 | 1 | 0 | 1 | 0 | 1 |
| 7 | 4 | 1 | 8K | 1 | 0 | 1 | 1 | 1 | 0 | 1 | 1 |
| 8 | 8 | 1 | 4K | 1 | 1 | 1 | 0 | 1 | 1 | 1 | 0 |

FIG_10

80486 CPU CFG ADDRESS CONNECTIONS

| CFIG NO. | LINE RATIO | LINES/Sec | NO. OF TAGS | CFA6 | CFA5 | CFA4 | CFA3 | CFA2 | CFA1 | CFA0 |
|---|---|---|---|---|---|---|---|---|---|---|
| 1 | 1 | 1 | 8K | A4 | A31 | A30 | A29 | A28 | A3 | A2 |
| 2 | 2 | 1 | 4K | A4 | A31 | A30 | A29 | A28 | A3 | A2 |
| 3 | 1 | 2 | 8K | A5 | A4 | A31 | A30 | A29 | A3 | A2 |
| 4 | 2 | 1 | 8K | A5 | A4 | A31 | A30 | A29 | A3 | A2 |
| 5 | 4 | 1 | 4K | A5 | A4 | A31 | A30 | A29 | A3 | A2 |
| 6 | 2 | 2 | 8K | A6 | A5 | A4 | A31 | A30 | A3 | A2 |
| 7 | 4 | 1 | 8K | A6 | A5 | A4 | A31 | A30 | A3 | A2 |
| 8 | 8 | 1 | 4K | A6 | A5 | A4 | A31 | A30 | A3 | A2 |

FIG_11

CYCLE LENGTH DETERMINATION

| CYCLE TIME | CW/Rs | CLEN NO. 1 | RDYSRC | MCACHE# | MKENs | MEMORY CYCLE LENGTH |
|---|---|---|---|---|---|---|
| | 1 | 0,0 | 0 | 1 | X | CPU REG = 1 |
| | 1 | A,B | 0 | 1 | X | CPU REQ = A,B |
| | 1 | X,X | 0 | 0 | X | C5 LINE |
| | 0 | 0,0 | 1 | 1 | X | CPU REG = 1 |
| | 0 | 0,1 | 1 | 1 | X | CPU REG = 2 |
| | 0 | 1,X | 1 | 1 | X | CPU REG = 4 |
| | 0 | 0,0 | 1 | 0 | 1 | CPU REG = 1 |
| | 0 | 0,1 | 1 | 0 | 1 | CPU REG = 2 |
| | 0 | 1,X | 1 | 0 | 1 | CPU REG = 4 |
| | 0 | X,X | 1 | 0 | 0 | CPU REG = 4 C5 LINE |
| | 0 | X,X | 0 | 0 | X | C5 LINE |
| | X | 0,0 | 1 | 1 | X | CPU REG = 1 |
| | 0 | 0,0 | 1 | 1 | X | CPU REG = 1 |
| | 1 | 0,0 | 0 | 1 | X | CPU REG = 1 |

FIG_12

80486 CPU CFG ADDRESS CONNECTIONS

| CFIG NO. | MCFA6 | MCFA5 | MCFA4 | MCFA3 | MCFA2 | MCFA1-0 | MTAG[11:0] | MSET[10:0] |
|---|---|---|---|---|---|---|---|---|
| 1 | MAxx | MAxx | MAxx | MAxx | MAxx | MBAxx | MAxx | MAxx |
| 2 | MBAxx | MAxx | MAxx | MAxx | MAxx | MBAxx | MAxx | MAxx |
| 3 | MAxx | MAxx | MAxx | MAxx | MAxx | MBAxx | MAxx | MAxx |
| 4 | MAxx | MBAxx | MAxx | MAxx | MAxx | MBAxx | MAxx | MAxx |
| 5 | MBAxx | MBAxx | MBAxx | MAxx | MAxx | MBAxx | MAxx | MAxx |
| 6 | MAxx | MAxx | MBAxx | MAxx | MAxx | MBAxx | MAxx | MAxx |
| 7 | MAxx | MBAxx | MBAxx | MAxx | MAxx | MBAxx | MAxx | MAxx |
| 8 | MBAXX | MBAxx | MBAxx | MAxx | MAxx | MBAxx | MAxx | MAxx |

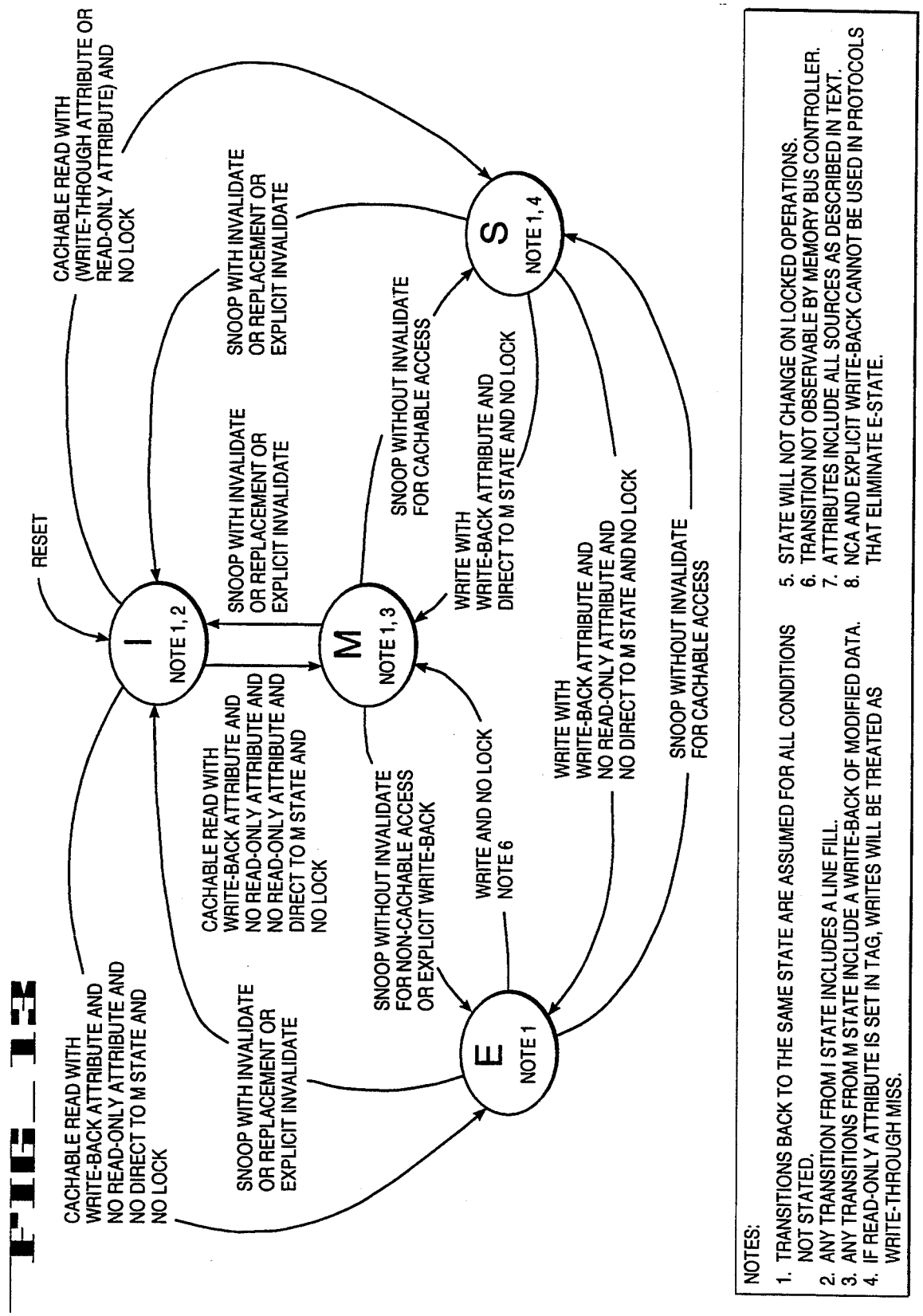

FIG_14

MASTER — READ CYCLE

| PRES. STATE | CONDITION: NEXT STATE | MEM BUS ACTIVITY | CPU BUS ACTIVITY | COMMENTS |
|---|---|---|---|---|
| M | !LOCK: M | – | !NWT | NORMAL READ HIT [M] |
| | LOCK: M | RTHR | !KEN | READ THROUGH CYCLE, DATA FROM ARRAY |
| E | !LOCK: E | – | NWT | NORMAL READ HIT [E] |
| | LOCK: E | RTHR | !KEN | READ THROUGH CYCLE, DATA FROM MEMORY |
| S | !LOCK.!TRO: S | – | NWT | NORMAL READ HIT [S] |
| | !LOCK.TRO: S | – | !KEN | NORMAL READ TO READ-ONLY SECTOR. STAYS IN [S] STATE AND DEACTIVATE KEN TO PREVENT CPU FROM CACHING LINE |
| | LOCK: S | RTHR | !KEN | READ THROUGH CYCLE, DATA FROM MEMORY |
| I | PCD+!MKEN+LOCK: I | RNRM | !KEN | NON-CACHEABLE READ, LOCKED CYCLES |
| | !PCD.!MKEN.!LOCK.MRO: S | LFIL | !KEN | CACHEABLE READ, READ-ONLY. FILL LINE TO C5. DO NOT ALLOW CPU TO CACHE LINE BY DEACTIVATING KEN#. SET THE C5's TRO BIT TO INDICATE THE SECTOR READ ONLY ATTRIBUTE |
| | !PCD.MKEN.!LOCK.!MRO.(PWT+MWT): S | LFIL | NWT | CACHEABLE READS, FORCED WRITE-THROUGH |
| | !PCD.MKEN.!LOCK.!MRO.!PWT.!.!MWT.!DRCTM:E | LFIL | NWT | LINE NOT SHARED, THUS ENABLING THE c5 TO MOVE INTO AN EXCLUSIVE STATE |
| | !PCD.MKEN.!LOCK.!MRO.!PWT.!MWT.DRCTM: M | LFIL | NWT | AS BEFORE WITH DIRECT [M] STATE TRANSFER. KEEP N11 IN WRITE THROUGH MODE |

FIG_15 MASTER — WRITE CYCLE

| PRES. STATE | CONDITION: NEXT STATE | MEM BUS ACTIVITY | CPU BUS ACTIVITY | COMMENTS |
|---|---|---|---|---|
| M | !LOCK: M | - | SRUP, !NWT | WRITE HIT. WRITE TO CACHE. ALLOW XP TO PERFORM INTERNAL WRITE CYCLES. (ENTER INTO [E], [M] STATES). |
|   | LOCK: M | WTHR | SRUP, !NWT | LOCKED CYCLE. WRITE-THROUGH UPDATING CACHE SRAM. MOST UPDATED COPY OF THE LINE IS STILL OWNED BY CC. ALL LOCKED WRITE CYCLES ARE POSTED. |
| E | !LOCK: M | - | SRUP, !NWT | WRITE HIT. UPDATE SRAM. LET XP EXECUTE INTERNAL WRITE CYCLES. |
|   | LOCK: E | WTHR | SRUP, NWT | LOCK FORCES CYCLE TO MEMORY BUS. MAIN MEMORY REMAINS UPDATED |
| S | TRO: S | WTHR | - | READ-ONLY. WRITE CYCLE WITH WRITE THROUGH ATTRIBUTE FROM CPU OR MEMORY BUS. LOCKED CYCLES. |
|   | !TRO.(PWT+MWT+LOCK): S | WTHR | SRUP, NWT | NOT READ-ONLY. WRITE CYCLE WITH WRITE THROUGH ATTRIBUTE FROM CPU OR MEMORY BUS. LOCKED CYCLES. |
|   | !TRO.!PWT.!LOCK.!MWT.!DRCTM: E | WTHR | SRUP, NWT | NOT READ-ONLY. NO WRITE-THROUGH CYCLE, NO LOCK REQUEST ALLOW GOING INTO EXCLUSIVE STATE. |
|   | !TRO.!PWT.!LOCK.!MWT.DRCTM: M | WTHR | SRUP, NWT | NOT READ-ONLY. NO WRITE-THROUGH CYCLE, NO LOCK REQUEST ALLOW GOING INTO EXCLUSIVE STATE. DRCTM FORCES FINAL STATE TO M. |
| I | PCD+!MKEN+PWT+LOCK+MRO: I | WTHR | - | WRITE MISS NON-CACHEABLE, WRITE THROUGH, LOCKED CYCLE OR READ-ONLY. |
|   | !PCD.MKEN.!PWT.!LOCK.!MRO:I | WTHR, LFIL | - | WRITE MIS WITH ALLOCATION. AFTER THE WRITE CYCLE, A LINE FILL (ALLOCATION) IS SCHEDULED. |
|   | !PCD.MKEN.!PWT.!LOCK.MRO: S |   |   | IF MKEN AND MRO ARER ASSERTED, AN ALLOCATION TO THE [S] STATE WILL OCCUR. |
|   | ALLOCATION FINAL STATE<br>MWT: S<br>!MWT.!DRCTM: E<br>!MWT.DRCTM:M | ALLOC |   | ALLOCATION FINAL STATE AS A FUNCTION OF THE LINE FILL ATTRIBUTES. |

FIG_16

SNOOPING — WITHOUT INVALIDATION REQUEST

| PRES. STATE | CONDITION: NEXT STATE | MEM BUS ACTIVITY | CPU BUS ACTIVITY | COMMENTS |
|---|---|---|---|---|
| M | ISNPNCA: S<br>SNPNCA: E | MTHIT<br>MHITM<br>WBCK | YP: INQR | SNOOP HIT TO MODIFIED LINE. CC INDICATES TAG HIT AND MODIFIED HIT. CC SCHEDULES FLUSHING OF THE MODIFIED LINE TO MEMORY. IF NON-CACHEABLE DEVICE, STAY IN [E] STATE. |
| E | ISNPNCA: S<br>SNPNCA: E | MTHIT | – | IF SNOOPING BY CACHEABLE DEVICE, INDICATE MTHIT AND GO TO SHARED STATE. IF NO CACHING DEVICE ONLY INDICATE MTHIT, STAY EXCLUSIVE. |
| S | S | MTHIT | – | |
| I | I | – | – | |

FIG_17

SNOOPING — WITH INVALIDATION REQUEST

| PRES. STATE | CONDITION: NEXT STATE | MEM BUS ACTIVITY | CPU BUS ACTIVITY | COMMENTS |
|---|---|---|---|---|
| M | I | MTHIT<br>MHITM<br>WBCK | XP: INQR<br>BINV<br>486: BINV | SNOOP HIT TO MODIFIED LINE. CC INDICATES TAG HIT AND MODIFIED HIT. CC SCHEDULES FLUSHING OF THE MODIFIED LINE TO MEMORY. INVALIDATE CPU. |
| E | I | MTHIT | BINV | INDICATE TAG HIT, INVALIDATE CC CPU LINES. |
| S | I | MTHIT | BINV | SAME AS BEFORE. |
| I | I | – | – | |

FIG_18

SYNC CYCLES

| PRES. STATE | CONDITION: NEXT STATE | MEM BUS ACTIVITY | CPU BUS ACTIVITY | COMMENTS |
|---|---|---|---|---|
| M | E<br>E | WBCK<br>WBCK | XP: INQR<br>- | GET MODIFIED DATA FROM XP FLUSH TO MEMORY.<br>FOR 80486 CPU JUST WRITE BACK |
| E | E | - | - | IMEMORY ALREADY SYNCHRONIZED |
| S | S | - | - | MEMORY ALREADY SYNCHRONIZED |
| I | I | - | - | |

FIG_19

FLUSH CYCLES

| PRES. STATE | CONDITION: NEXT STATE | MEM BUS ACTIVITY | CPU BUS ACTIVITY | COMMENTS |
|---|---|---|---|---|
| M | I | WBCK | XP: INQR, BINV | FLUSH AND INVALIDATE XP |
| E | I | - | XP: BINV | INVALIDATE XP |
| S | I | - | XP: BINV | INVALIDATE XP |
| I | I | - | - | |

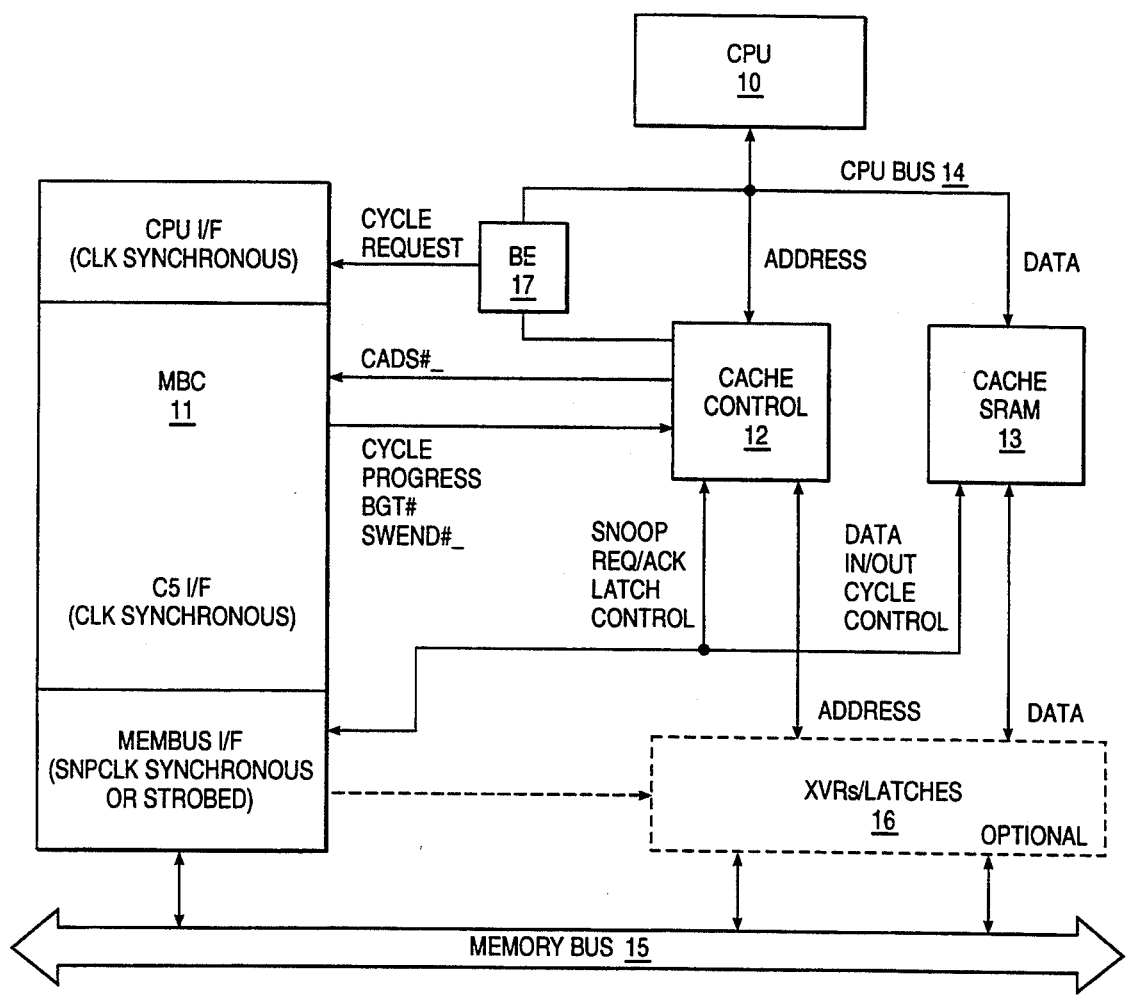

FIG_21
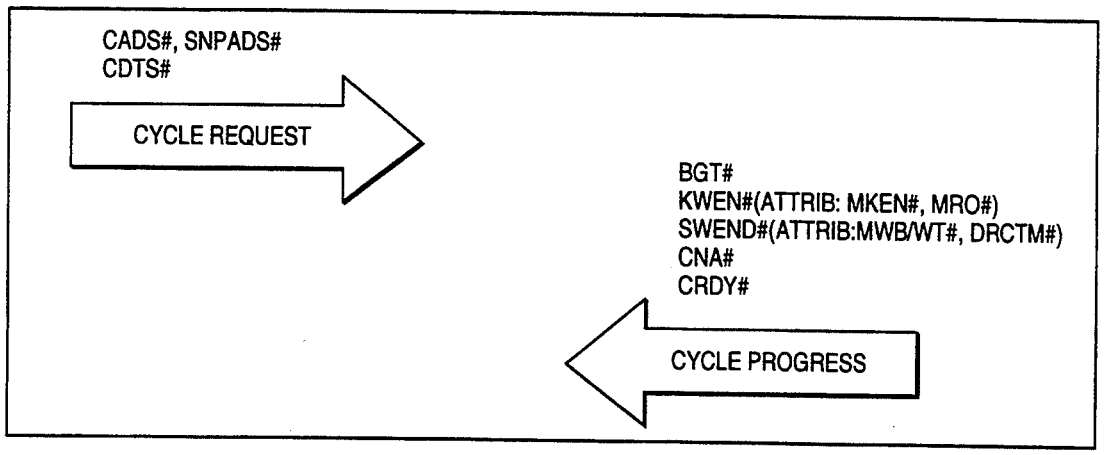
FIG_22
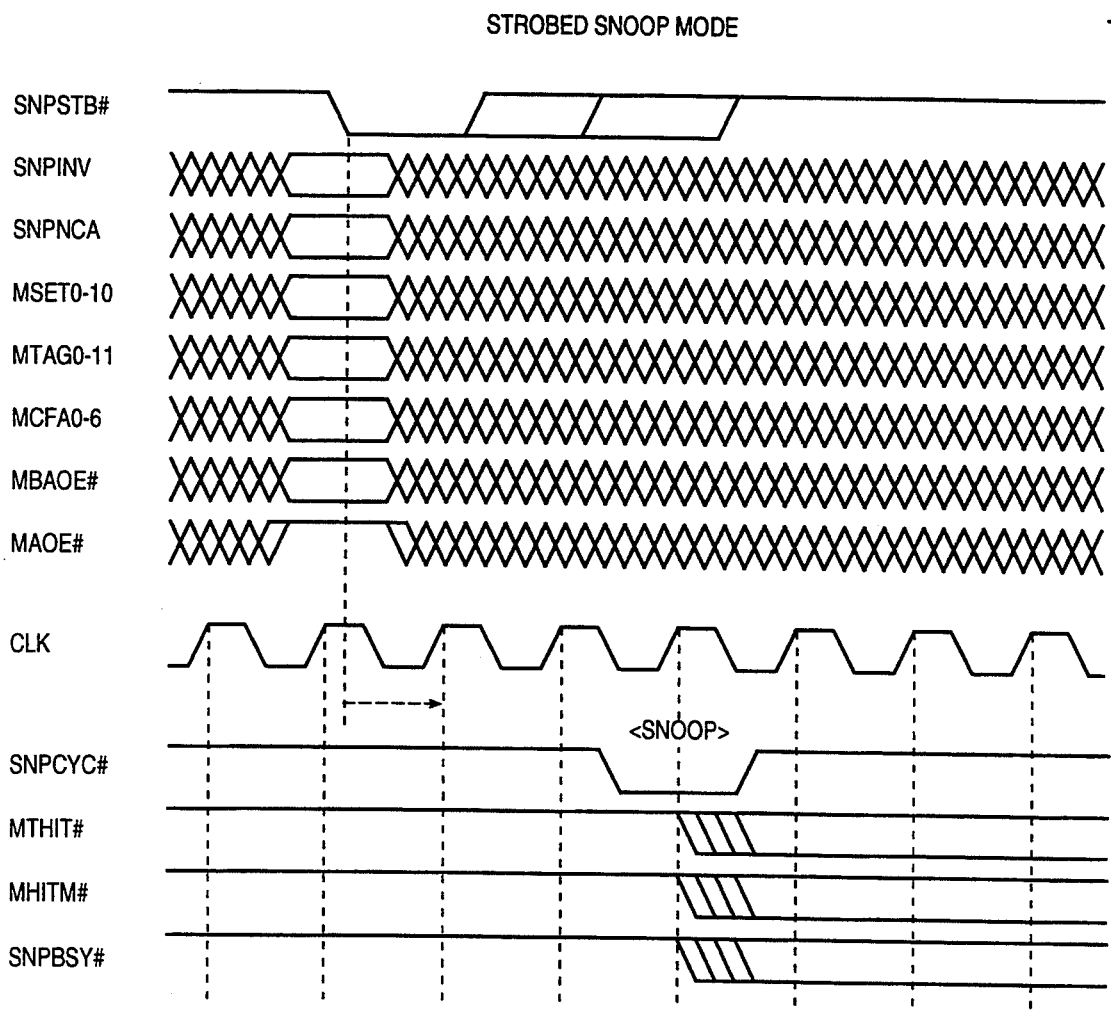

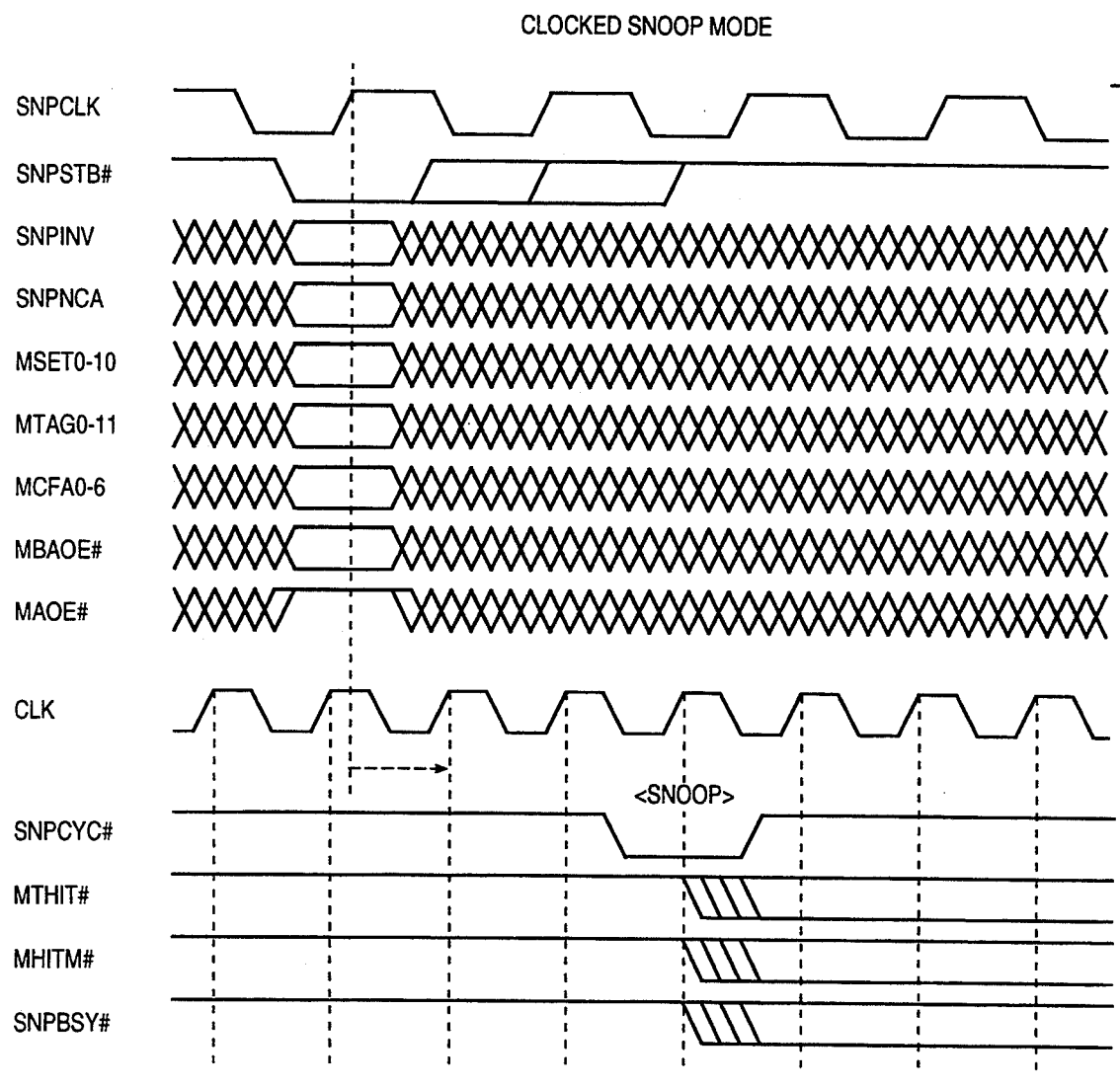
FIG_23

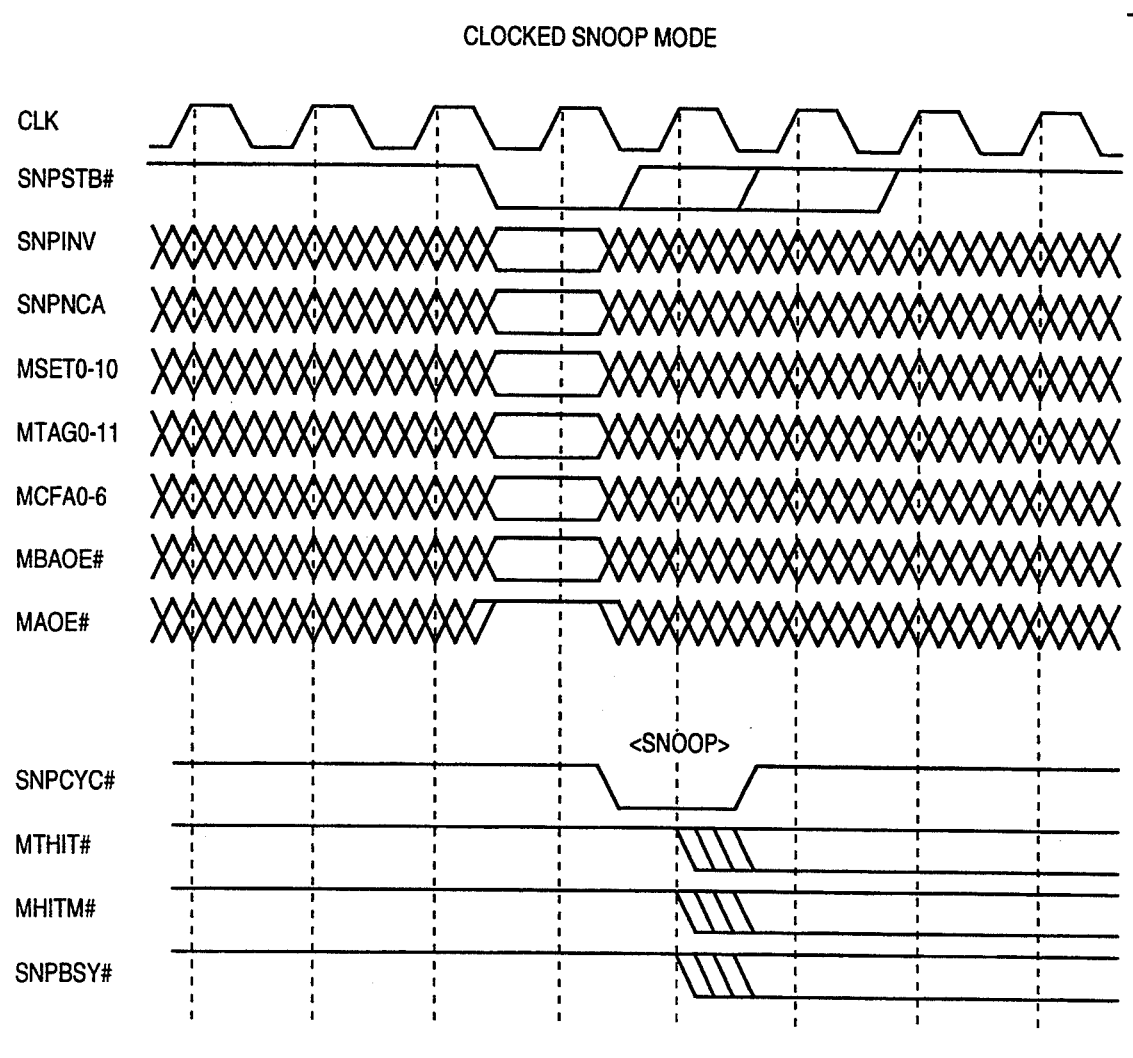
FIG_24

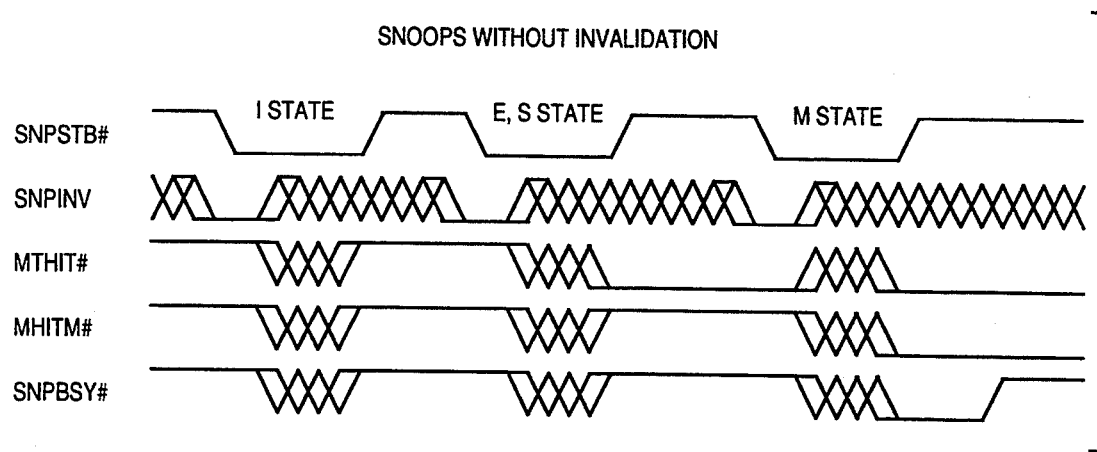
FIG_25
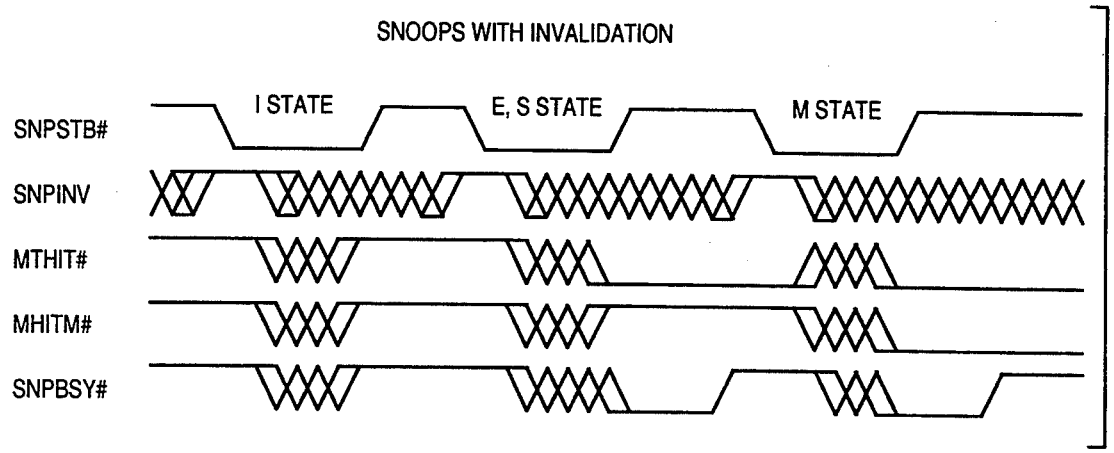
FIG_26

FIG_27
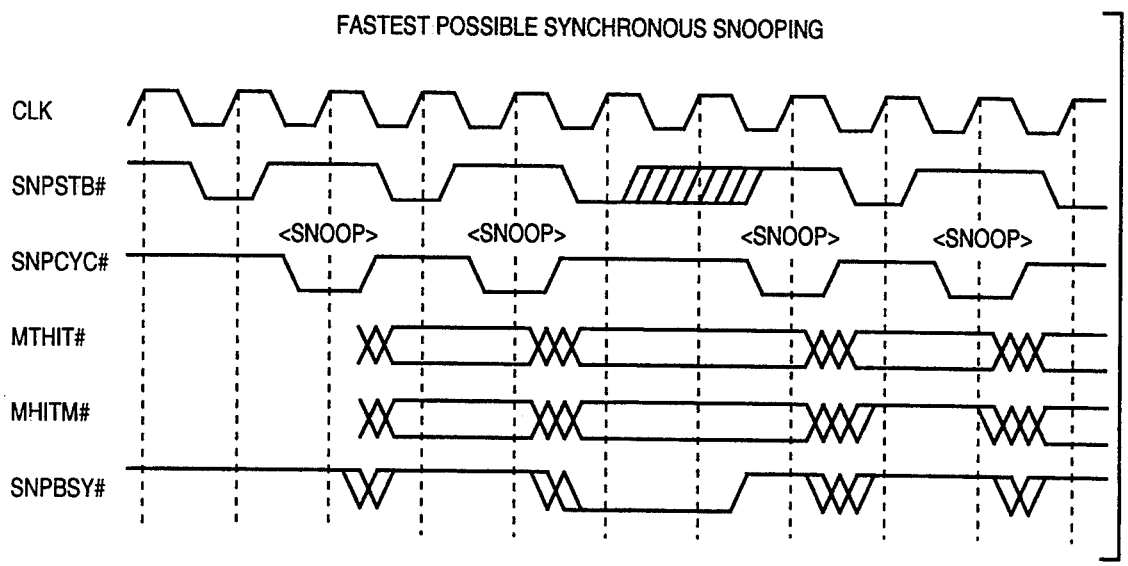
FIG_28
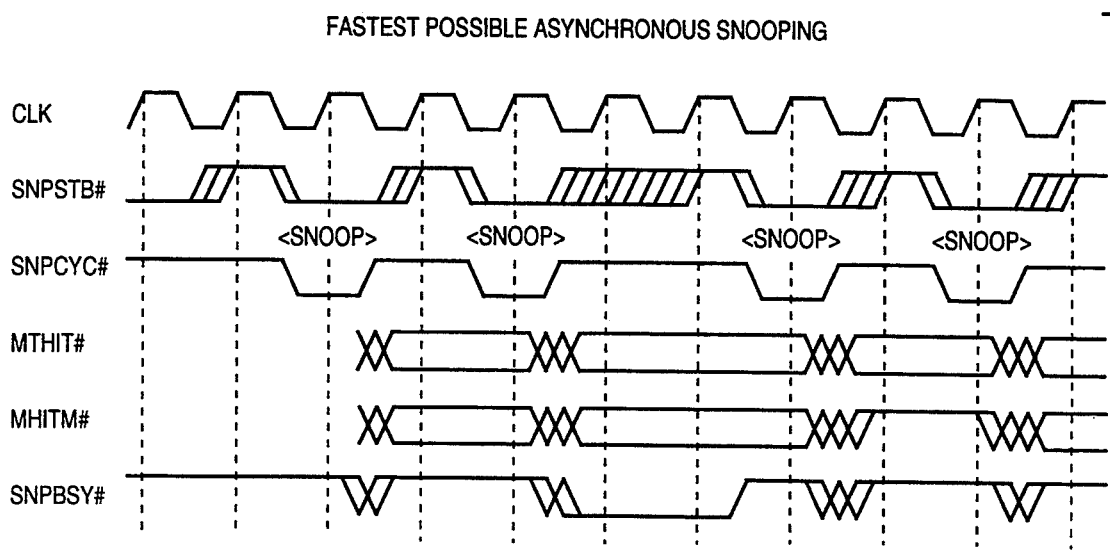

FIG_29
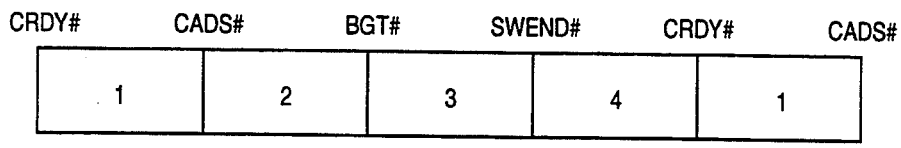
FIG_30
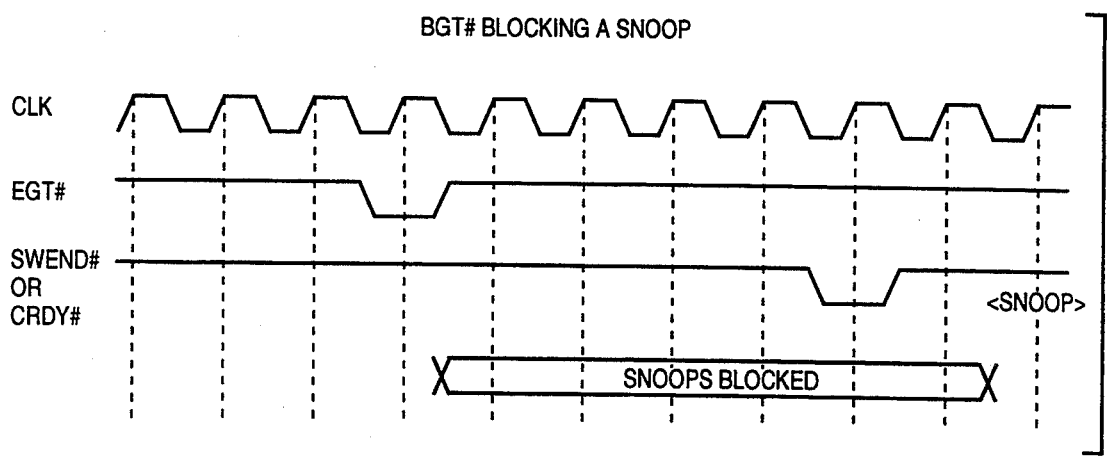
FIG_31
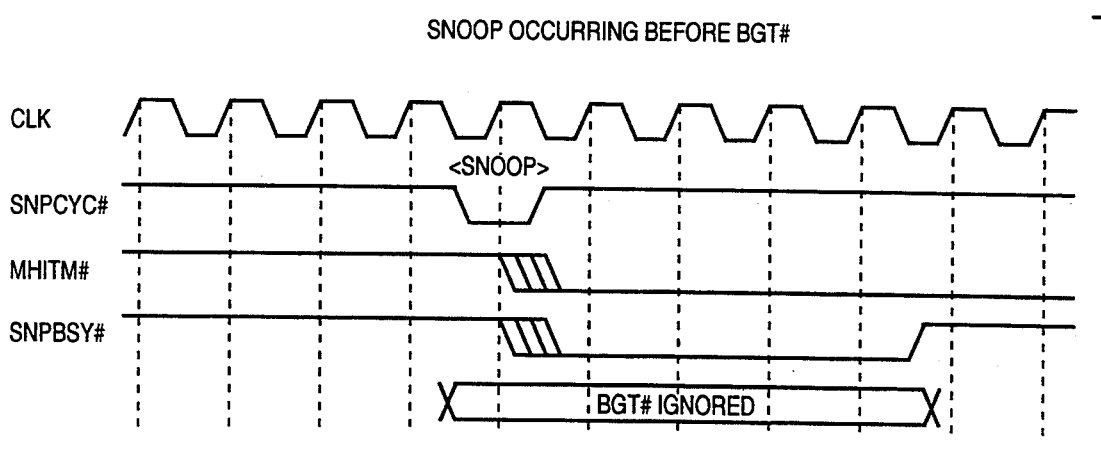

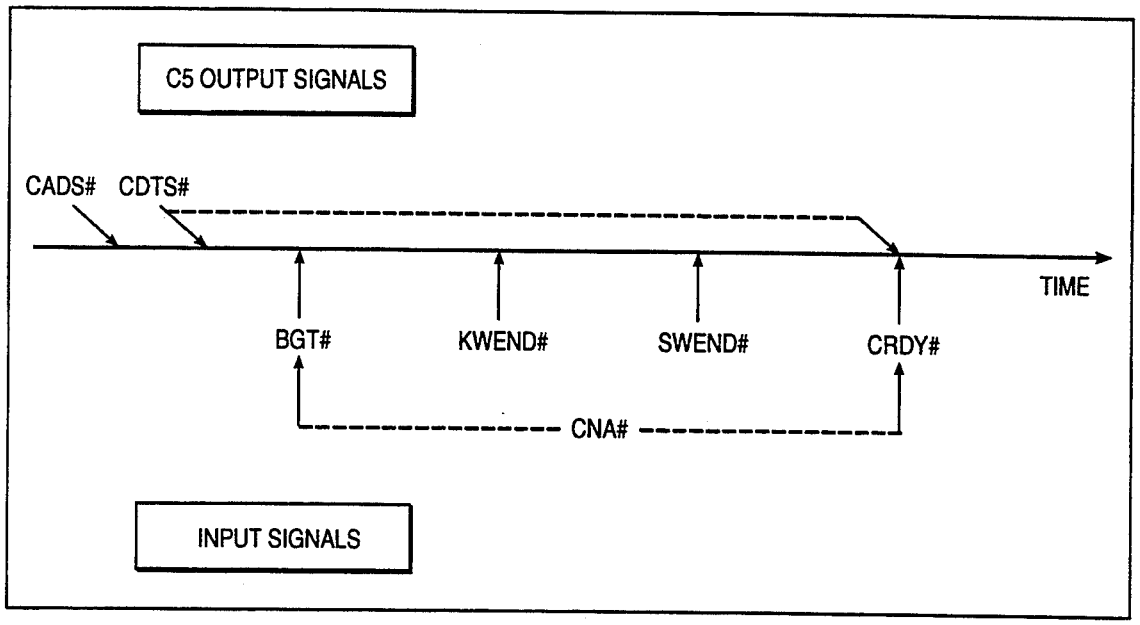
FIG_32
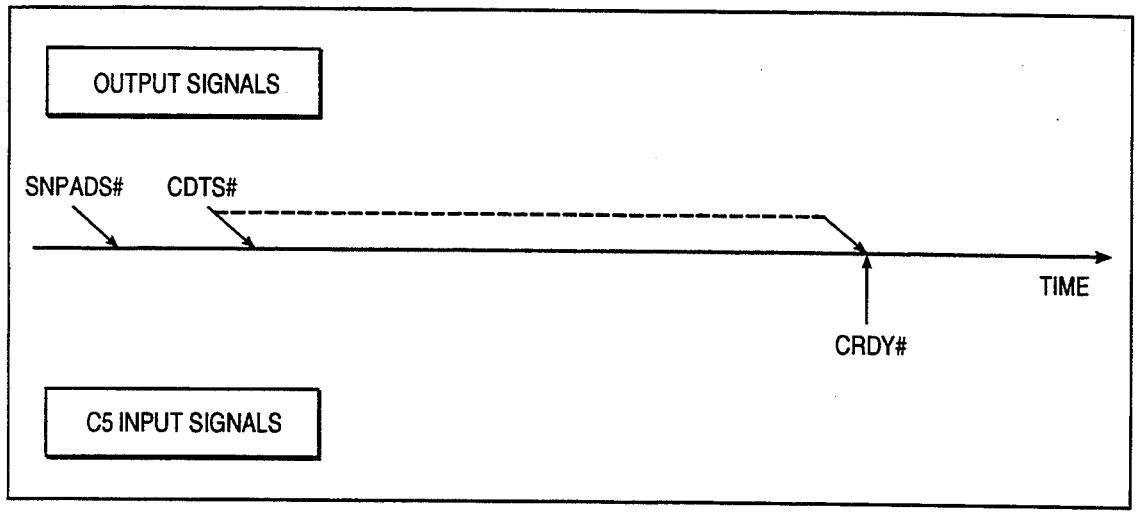
FIG_33

FIG_34
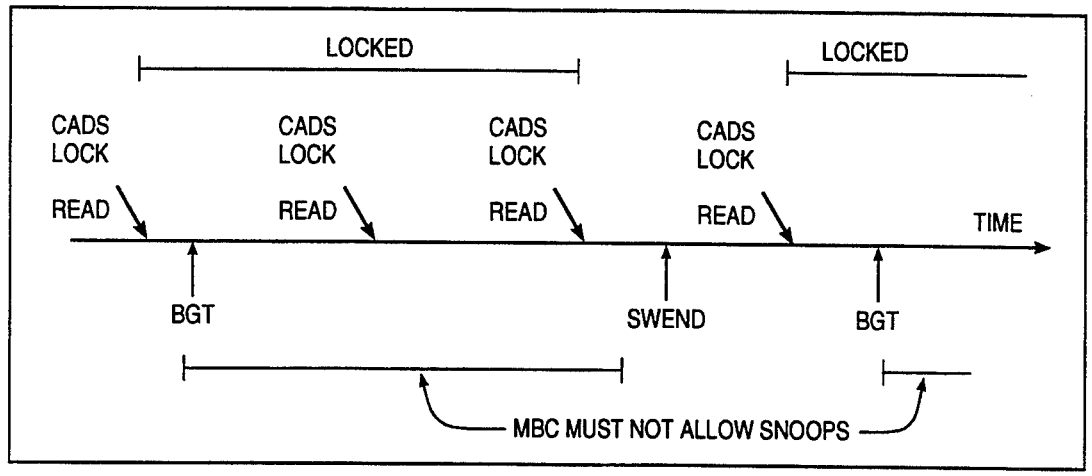
FIG_35
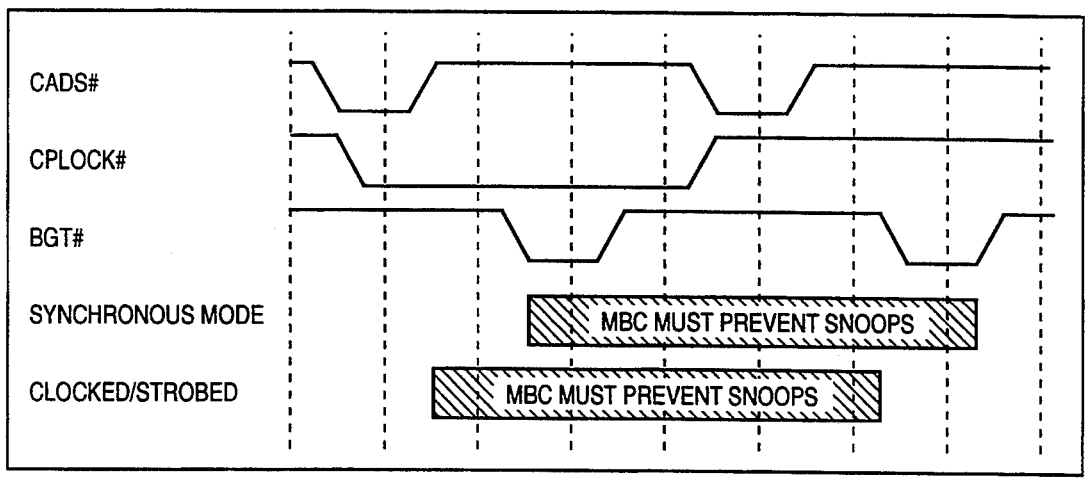

FIG_36
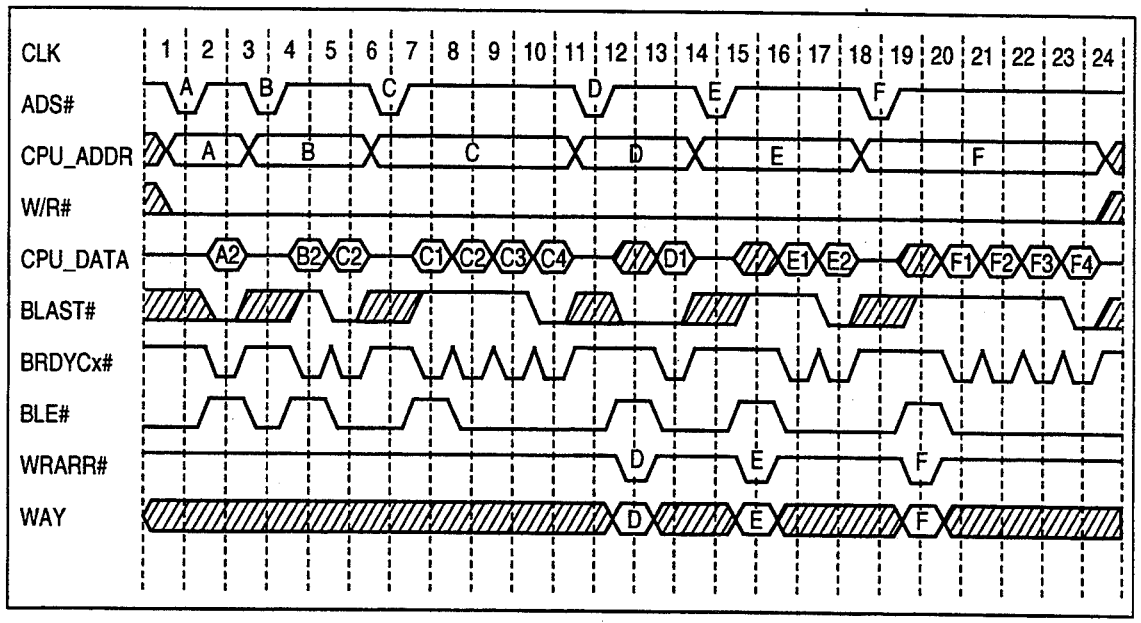
FIG_39
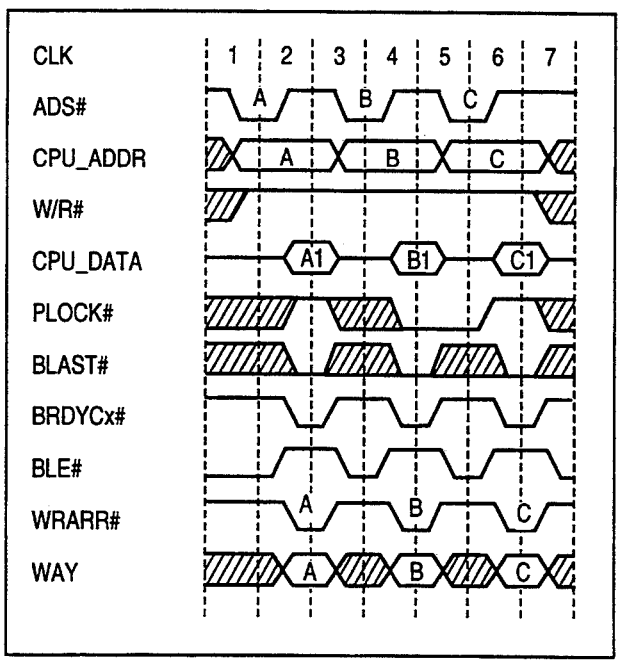

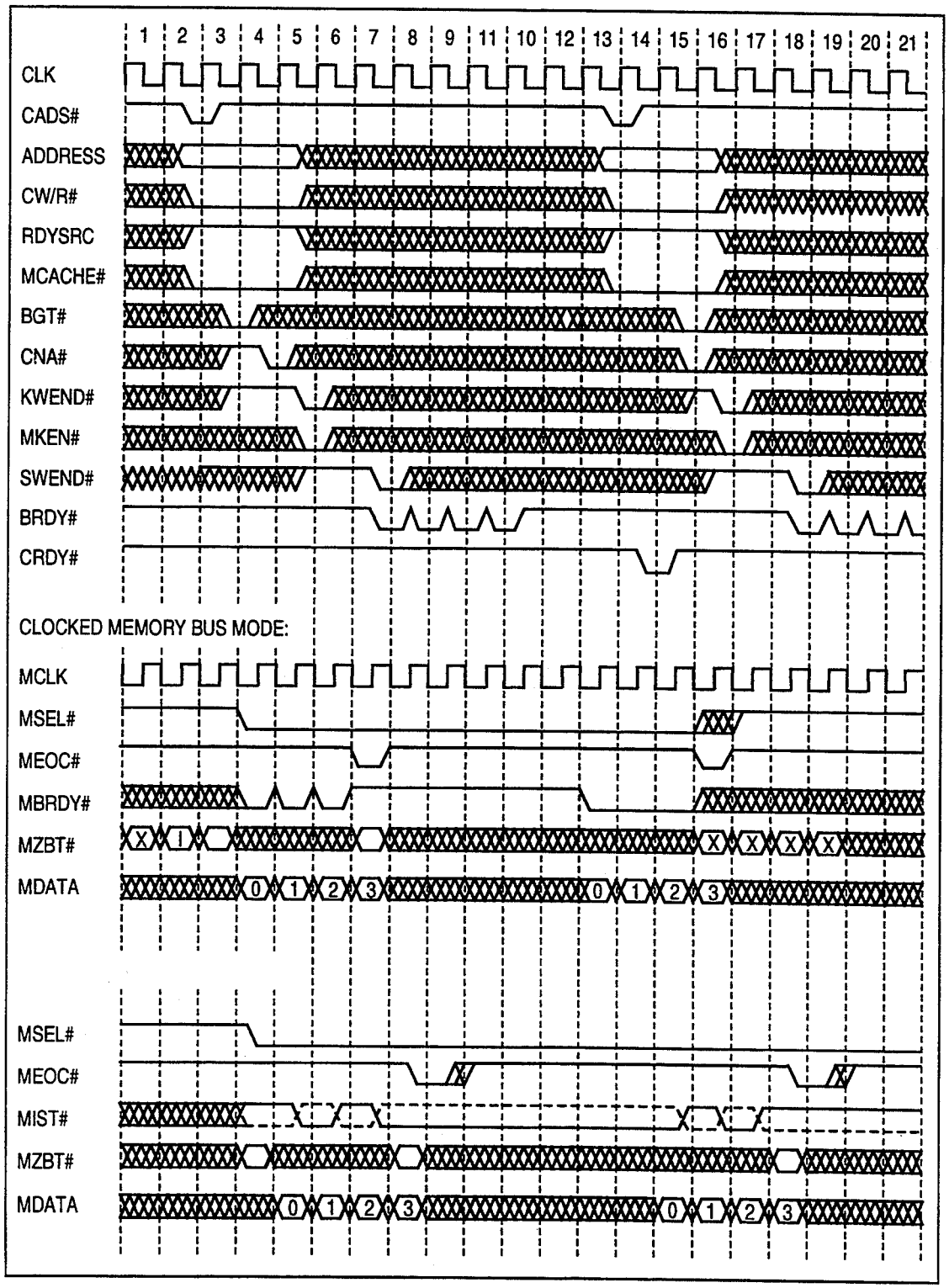
FIG_37
CACHEABLE READ MISS WITH CLEAN REPLACEMENT

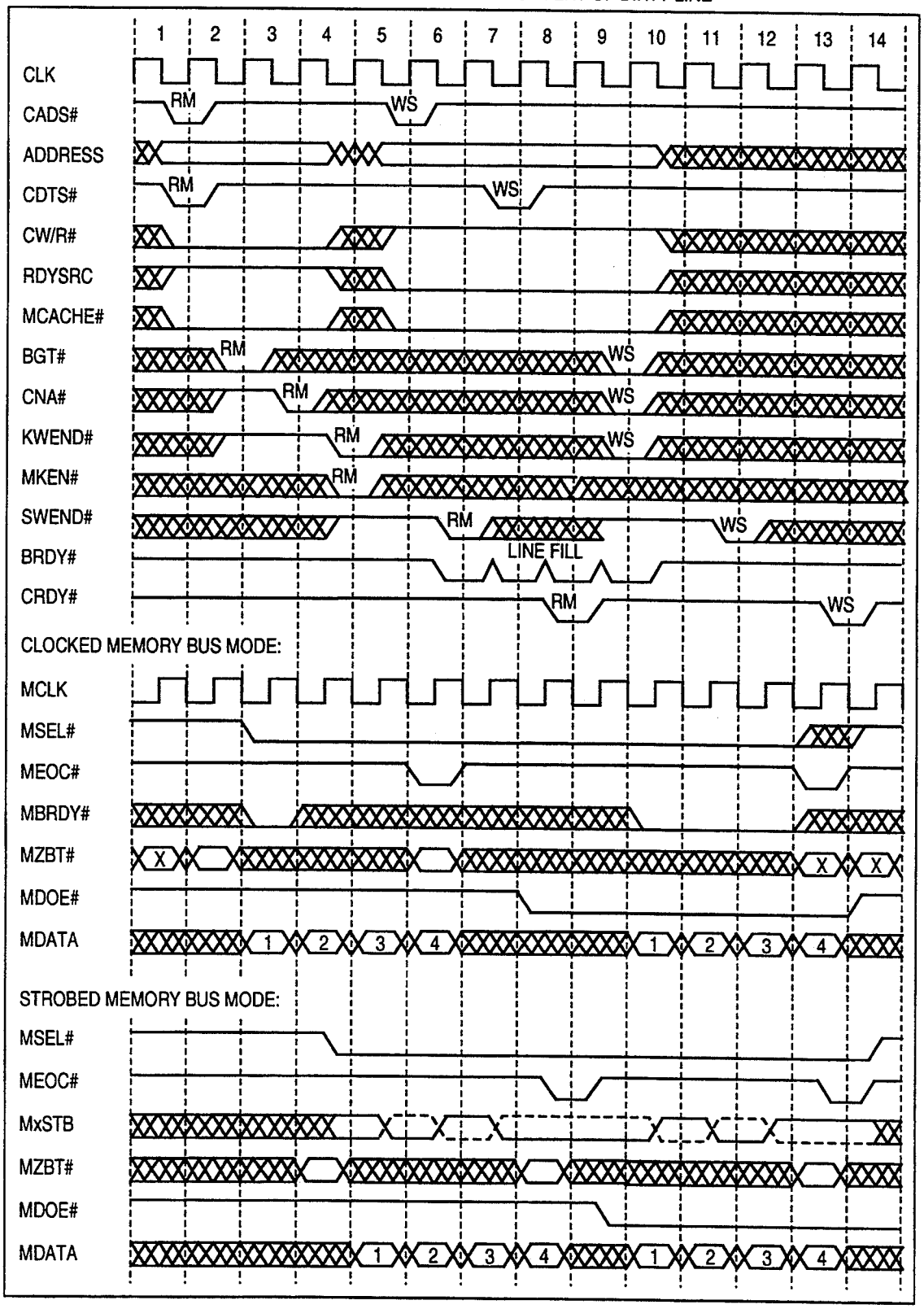
FIG_38 CACHEABLE READ MISS WITH REPLACEMENT OF DIRTY LINE

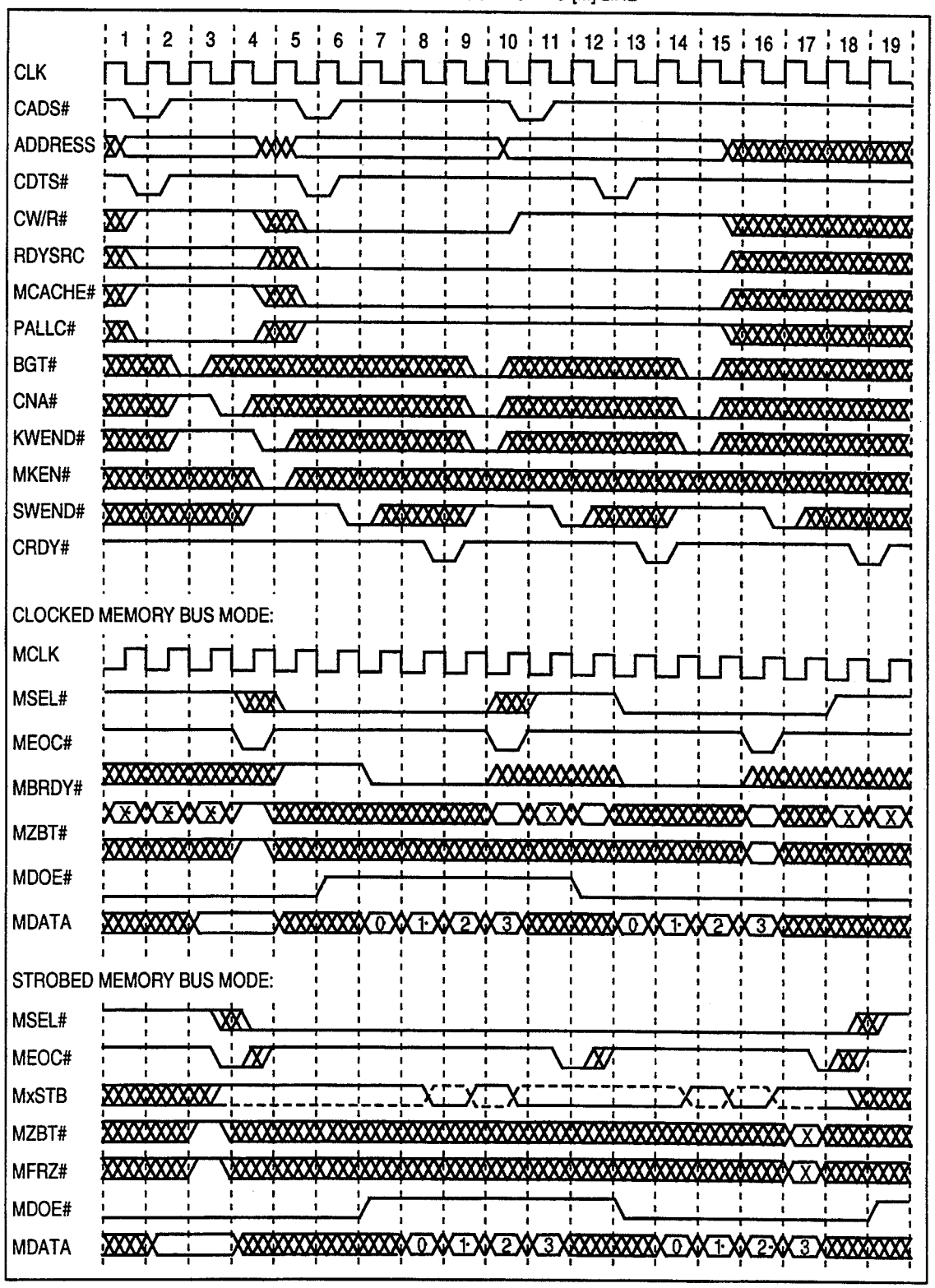

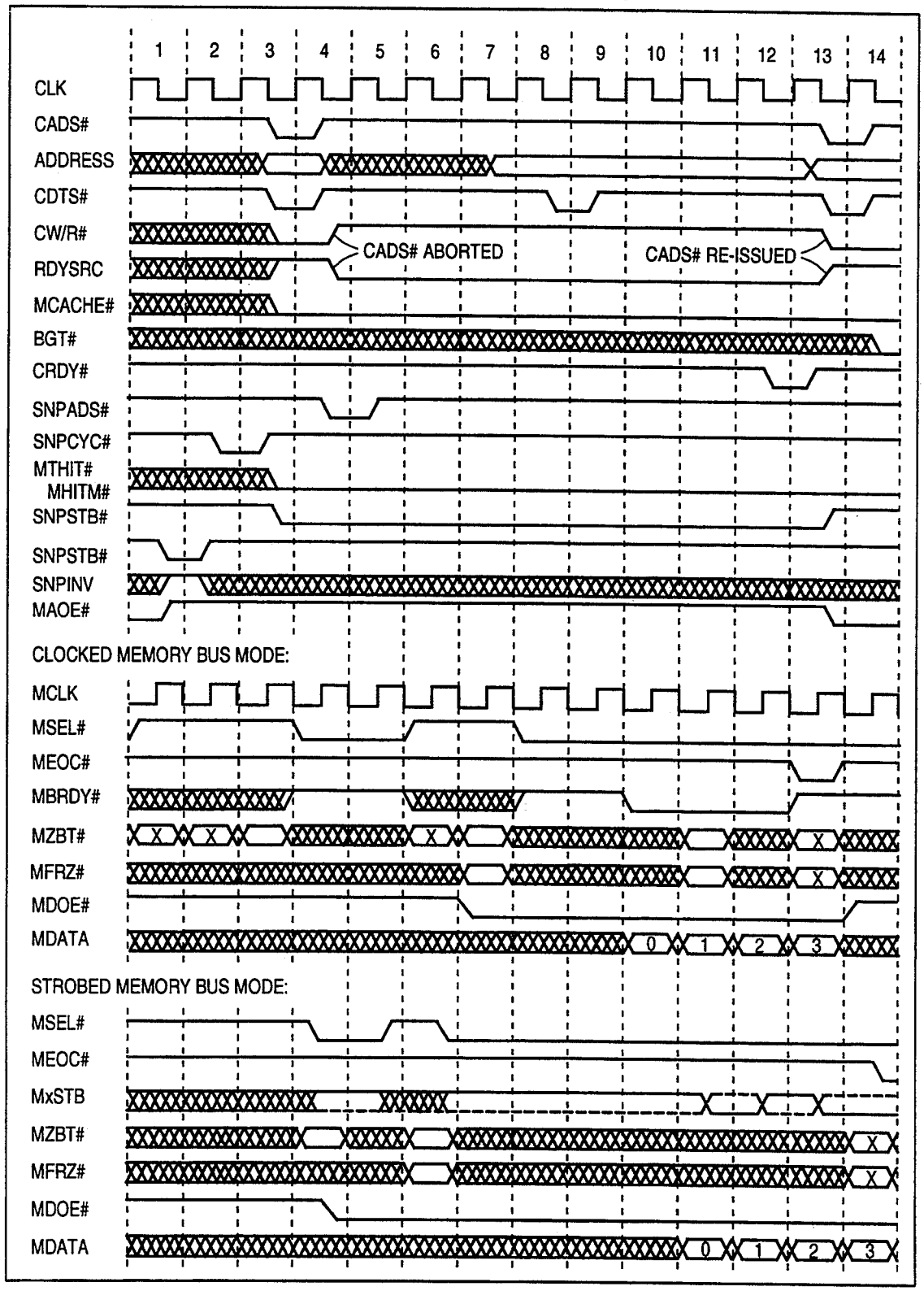
FIG_41 SYNCHRONOUS SNOOPING MODE

SECOND LEVEL CACHE CONTROLLER UNIT AND SYSTEM

This is a continuation of application Ser. No. 07/710,507, filed Jun. 4, 1991, now abandoned.

FIELD OF THE INVENTION

The present invention relates generally to the field of microprocessors; specifically, to second level cache memories which represent the level of the memory hierarchy in a computer system between the central processing unit (CPU) cache and the main memory.

BACKGROUND OF THE INVENTION

Historically, the demands of microprocessor technology have been increasing at a faster rate than the support technologies, such as DRAM and TTL/programmable logic. Recent trends are further aggravating this mismatch in the following ways. First, microprocessor clock rates are rapidly approaching, and in some cases exceeding, the clock rates of standard support logic. In addition, the clocks per instruction rate is rapidly decreasing, putting a very high bandwidth demand on memory. Newer designs such as RISC architectures, are demanding evermore memory bandwidth to accomplish the same amount of work. The memory bandwidth demand has been further aggravated by the need for direct memory access (DMA) by devices such as coprocessors and multi-processors. Finally, the rate at which new devices are being introduced into the market place is accelerating-further exacerbating all of the above.

As a result of these trends, two severe performance bottlenecks have emerged that continue to influence the way that systems are designed. Memory bandwidth, as a performance limiter, has already forced the use of cache memories in many microprocessors systems. By way of example, the use of cache memories is common place in the 80386 TM generation of microprocessors manufactured by Intel Corporation. Also, Intel's 80486 TM and i860 TM (also referred to as the i860XP TM )processors include on-chip caches for enhanced performance. It is clear that further changes in the memory hierarchy (primary cache, secondary cache, DRAM architectures, etc.) will be required to sustain performance increases in future generations. (Intel, 80386, 80486, i860, and i860XP TM are all trademarks of Intel Corporation.)

Another performance bottleneck is the clock rate and input/output (I/O) timings. It has become apparent that the investment required to continue increasing the microprocessor clock rate (and the resulting I/O timings) cannot be sustained across all components in the system. Even if one could afford the investment, the schedule impact of coordinating with possibly many vendors, could easily make such an architecture non-competitive. These factors have already forced the use of asynchronous interfaces to isolate the frequency scaling problem to a subset of the system components. In the future, it is clear that high speed CPU interfaces will need to be designed around an even more tightly controlled specification in order to reach the desired level of performance.

Exemplary of the prior art, Intel's 80385 cache SRAM memory is typical of past approaches. To begin with, one of the chief drawbacks associated a 80385 like SRAM array is its inability to support concurrent operations at both the CPU and memory interfaces. That is, for every access to the read/write storage array, only one piece of data gets transferred. This means that when coupled to the 80486, for example, a cache line read operation requires four separate transfers. In other words, the SRAM array needs to be accessed repeatedly to obtain each piece of the cache line, severely limiting the clocks available to the memory interface. Alternatively, a wide bank of SRAMs could be employed along with corresponding external multiplexers, but only at the expense of additional complexity and cost.

Another common drawback of prior art cache memories is that every transfer is required to be synchronized. In other words, as data arrives at the cache from the memory bus, before that data can be transferred to the CPU bus, a handshake must occur with the microprocessor. This process must be repeated for the next data segment to be brought in from the memory bus. Note that this is simply another way of stating that the transfer of data between the memory and CPU buses requires synchronous operations. Such operation presents a serious burden on the computer system's performance as CPU clock rates increase.

The present invention discloses an integrated cache controller employed within a second level cache memory system for multiprocessor systems. It is intended to work cooperatively with a CPU unit such as the Intel 80486 or i860XP TM processors, with cache memory as disclosed in a co-pending application entitled, "Integrated Cache SRAM Data Path" and with a memory bus controller (MBC) for adapting the second level cache controller to a wide range of memory bus protocols such as disclosed in a co-pending application entitled, "Second Level Memory Bus Controller Unit" which applications are assigned to the assignee of the present invention.

SUMMARY OF THE INVENTION

Accordingly, it is one object of the present invention to provide a cache controller, a cache memory unit and a memory bus controller, working cooperatively with an associated CPU, for overcoming the aforementioned drawbacks for the purpose of enhancing overall computer system performance.

It is another purpose of the present invention to provide a gateway between the CPU and the main memory bus by servicing all CPU accesses which can be serviced by the local cache memory thereby reducing memory bus traffic and the memory bus bandwidth required.

It is another purpose of the present invention to provide decoupling between the CPU and main memory busses allowing the CPU to operate efficiently at higher rates than normally achievable over the main memory bus.

It is another purpose of the present invention to be the main control element including the assignment of tags and line states.

It is another purpose of the present invention to serve the CPU access to cache memory with zero wait states while providing the aforementioned decoupling to the CPU.

It is another purpose of the present invention to handle the CPU bus requests completely and coordinate with the memory bus controller when an access requires the memory bus.

It is another object of the present invention to control the cache memory data paths for both hits and misses in order to provide the CPU with correct data partitioned to minimize the impact of critical timing.

A further object of the present invention is to dynamically control the cache memory way selector switch based on the most recently used (MRU) way rule prediction in order to decrease average cache memory latency for the CPU.

Another purpose of the present invention is to control memory bus snoop operations while other devices are using the memory bus in order to provide data consistency in a multi-processor system. This includes consistency of the second level cache as described in this specification, as well as a primary cache integrated on the CPU device, based on the principle of inclusion.

And yet another purpose of the present invention is to drive the cycle address during a memory bus access and provide cycle status, control attributes, and response to the MBC to support a wide range of memory bus transfer and cache consistency protocols.

In accordance with these and other objects of the present invention, there is disclosed an integrated circuit which, in one embodiment, implements a controller for a secondary cache memory system comprising a CPU, a CPU bus, a two way set associative cache memory, a memory bus controller and a main memory with its associated memory bus. The cache controller unit further comprises CPU bus interface, a memory bus address path with latch, a memory bus queue, a memory bus controller interface, a snoop latch, a cache directory, and a cache memory interface.

BRIEF DESCRIPTION OF THE DRAWINGS

The present invention will be understood from the detailed description given below and from the accompanying drawings of the preferred embodiments of the invention which, however, should not be taken to limit the invention to the specific embodiment but are for explanation and understanding only.

FIG. 1 depicts a block diagram of the basic cache subsystem of the currently preferred embodiment of the present invention.

FIG. 2 is a functional block diagram of the integrated cache controller unit.

FIG. 3 is a block diagram of the internal address latches with detail on the Memory Bus Address Latch.

FIG. 4 is a detailed block diagram of the Snoop Latch and Snoop Controller.

FIG. 5 shows the detailed architecture of the two way set associative cache controller.

FIG. 6 shows the pin configuration of the cache controller.

FIG. 7 cross references the cache controller pins with their physical location.

FIG. 8 shows the timing relationship for configuration input sampling.

FIG. 9 shows the configuration options available for use with the Intel 80486 CPU.

FIG. 10 defines the function of the CPU bus interface pins.

FIG. 11 defines the memory bus controller (MBC) decoding of the cache controller cycles:

FIG. 12 defines which memory bus address lines are controlled by which set of cache controller control signals.

FIG. 13 shows a partial state diagram of the MESI coherency protocol.

FIG. 14 shows the read cycle state table for the master cache controller.

FIG. 15 shows the write cycle state table for the master cache controller.

FIG. 16 shows the snooping (without invalidation request) cache controller state table.

FIG. 17 shows the snooping (with invalidation request cache controller state table.

FIG. 18 shows the SYNC cycle state table.

FIG. 19 shows the FLUSH cycle state table.

FIG. 20 is a more detailed secondary cache system block diagram with added control, address and data flow.

FIG. 21 shows the relationship between cycle attribute and progress signals.

FIG. 22 shows the strobed method for initiation of a snoop.

FIG. 23 shows the clocked method of snoop initiation.

FIG. 24 shows the synchronous snoop mode.

FIG. 25 shows the timing of snoops without invalidation.

FIG. 26 shows the timing of snoops with invalidation.

FIG. 27 shows the timing for the fastest synchronous snooping mode.

FIG. 28 shows the timing for the fastest asynchronous snooping mode.

FIG. 29 shows the timing sectors used to overlap snoops with data transfers.

FIG. 30 shows the blocking of a snoop by signal BGT#.

FIG. 31 shows a snoop occurring before BGT# is recognized.

FIG. 32 shows the progress of a memory bus cycle in terms of cache controller input/output signals.

FIG. 33 shows the progress of a memory bus cycle for snoop cycles.

FIG. 34 shows the progress of a memory bus cycle with snooping during LOCKed cycles.

FIG. 35 shows the timing of snoops during PLOCKed cycles.

FIG. 36 shows the timing waveforms for a secondary cache read-hit.

FIG. 37 shows the timing waveforms for a cacheable read-miss with replacement of a modified, [M], line.

FIG. 38 shows the timing waveforms for a cacheable read-miss with replacement of a modified, [M], line.

FIG. 39 shows the timing waveforms for a write-hit to an exclusive, [E], or modified, [M], line.

FIG. 40 shows the timing waveforms for a write-miss with allocation to a modified, [M], line.

FIG. 41 shows the timing waveforms for a snoop-hit to a modified, [M], line.

DESCRIPTION OF THE PREFERRED EMBODIMENT

A. Introduction

An integrated circuit which implements a controller for a secondary cache system is described. In the following description, numerous specific details are set forth, such as specific numbers of bytes, bits, devices, etc., in order to provide a thorough understanding of the preferred embodiment of the present invention. It will be obvious to one skilled in the art that the present invention may be practiced without these specific details. Also, well known circuits have been shown in block diagram form, rather than in detail, in order to avoid unnecessarily obscuring the present invention.

In the course of describing the present invention, frequent reference may be made to the use of the invented cache controller in conjunction with certain specific CPU architectures and/or microprocessor types, such as the Intel 80486 and i860XP TM microprocessors. These implementations merely reflect the currently preferred embodiment of the present invention. It should be understood that the concepts embodied in the present invention are applicable, or may be extended to other processor types and architecture.

In addition, in describing the present invention, reference is made to signal names peculiar to the currently preferred embodiment. A description of each of these signals is provided in the text. Reference to these specific signal names should not be construed as a limitation on the spirit or scope of the present invention.

B. Overview of the Secondary Cache System

Use of a data cache is based on the principle of locality. This principle recognizes that if an item is referenced, it will tend to be referenced again soon afterwards (i.e., locality in time). Likewise, if an item is referenced, nearby items will tend to be referenced soon thereafter (i.e., locality in space). Thus, the rationale of using a cache memory is to provide efficient access to frequently used information, thereby accelerating processing speed.

FIG. 1 depicts a block diagram of a secondary cache system upon which the present invention is based. The basic cache system comprises a CPU 10, which in the currently preferred embodiment comprises either an Intel 80486 or i860XP TM microprocessor and Cache Memory 13, in conjunction with Cache Controller 12 and Memory Bus Controller (MBC) 11, provide a gateway between the CPU Bus 14 and the Memory Bus 15. All CPU accesses which can be serviced locally by the cache subsystem comprising blocks 12–13, are removed from the memory bus traffic. Therefore, local cycles (CPU cycles which hit the cache and do not require a memory bus cycle) are completely invisible to Memory Bus 15. This provides a reduction in Memory Bus bandwidth which is often required for multiprocessing systems.

As will be described in more detail, another important function of the secondary cache system is to provide speed decoupling between the CPU Bus 14 and Memory Bus 15. The system of FIG. 1 is optimized to serve CPU 10 with zero wait-states up to very high frequencies (e.g., >50 MHz), while at the same time providing the decoupling necessary to run slower memory bus cycles.

Memory bus 15 typically is either 32, 64, or 128-bits wide. This compares to a CPU bus width which is 32-bits wide in the case of an 80486 microprocessor. Thus, the secondary cache system of FIG. 1 easily supports memory bus widths equal to or greater than the CPU bus width. Memory bus widths less than that of the CPU bus can be supported by use of external buffers.

Cache Controller 12 provides the main control element of the secondary cache system and includes the tags and line states, and provides decision on accesses, hits or misses (based on variations of a MESI protocol). Controller 12 handles the CPU bus requests completely and coordinates with MBC 11 when an access needs control of Memory Bus 15. Controller 12 also controls the Cache Static Random Access Memory (SRAM) 13 data paths for both hits and misses to provide the CPU with the correct data. It dynamically adds wait states based on a most-recently-used (MRU) prediction mechanism and access contentions. The MRU mechanism makes use of temporal locality. Specifically, the most recently used way of a set is most likely to be used again. The inverse of MRU, least recently used (LRU) is used to choose the way to be replaced, for the same reason. Cache Controller 12 also provides cycle requests to MBC 11 and the address to Memory Bus 15 for cache misses.

Cache Controller 12 is also responsible for performing memory bus snoop operations while other devices are utilizing Memory Bus 15. Snooping refers to the operation whereby Cache Controller 12 monitors shared Memory Bus 15 to determine whether or not other devices sharing Memory Bus 15 have a copy of the accessed cache line. Cache Controller 12 snoops for both the second level cache and the primary cache in CPU 10, based on the principle of inclusion.

The secondary Cache SRAM 13 control logic performs two key functions. The first is to supply burst addresses to the SRAM 13 multiplexer and buffer function for burst transfers. This is essential to maximize the transfer rate for burst operations because it eliminates a slow external chip interface. The second is to track CPU Bus 14 cycles and perform internal operations anticipating a cache hit. The latter capability leads to a strategy minimizing access time to SRAM 13 by CPU 10 by partitioning the look-up functions of Controller 12 and SRAM 13.

Because Cache SRAM 13 and Cache Controller 12 both respond to CPU Bus 14 cycles, Cache Controller 12 can perform the tag look-up in Tag RAM 31 in parallel with the Cache SRAM 13 corresponding data look-up rather than segmentally, and inform both CPU 10 and SRAM 13 of the tag look-up result at the last instant. TagRAM 31 contains all of the storage for address tags, MRU bits, cache state and control, as well as comparators for making the hit/miss for both CPU Bus 14 and Memory Bus 15 snoops. This represents the most critical path in the secondary cache system for achieving zero-wait state operation. Internally, there is approximately one clock interval available to perform a tag look-up, compare and update state. This parallel operation of Cache Controller 12 and SRAM 13 eliminates the sequential operation of Tag RAM 31 look-up followed by SRAM 13 data fetch from the critical timing path.

Memory Bus Controller (MBC) 11 adapts the CPU/cache core to the specific memory bus protocol associated with Memory Bus 15. In doing so, it coordinates with Controller 12, line fills, flushes, write backs, etc.

Byte Enable (BE) Latch 17, an external latch controlled by Cache Controller 12, is used to store a subset of CPU 10 signals that do not pass through Controller 12, and may be functionally considered as part of Cache Controller 12, although not physically incorporated in the present preferred embodiment.

Cache Controller 12 is implemented as a single integrated circuit which includes latches, multiplexers (also referred to as MUXs), logic and random access memory (RAM) operating as the cache directory array. It is a second level cache controller for the Intel 80486 and i860XP TM CPUs. It provides the cache directory and control signals to the external static RAM devices of the cache memory 13. The Controller 12 and Cache Memory 13 chip set provides an unified data and instruction cache which is transparent to the CPU system software. The Cache Controller 12 includes the tags and line states and provides decisions on accesses hits or misses.

Optional external Transceiver (XCR) Latches 16 may be used for interfacing Cache Controller 12 address data and Cache SRAM 13 data to and from Memory Bus 15.

C. Internal Cache Controller Architecture

FIG. 2 is a detailed block diagram of the Cache Controller 12 unit of the secondary cache memory system. It interfaces with all of the elements shown in FIG. 1. Specific interfaces are the CPU Bus Interface 30, MBC Interface 35, Cache Data Interface 37, Memory Bus Address Path 34 and Snoop Latch 33 and Snoop Controller 39.

CPU Bus Interface 30 provides the input/output pin connections to CPU Bus 14. This interface is designed to achieve the highest speed possible on CPU Bus 14 for the flow of data to and from Cache SRAM 13 and Memory Bus 15. The CPU Bus Interface signals comprise: thirty address line (CFA0-6, SET 0-10, TAG 0-11), five cycle definition lines (W/R#, D/C#, M/IO#, CACHE#, LEN), two page attribute lines (PCD, PWT), an atomic access line (LOCK#), five bus cycle control lines (ADS#, BRDYC1 #, BRDYC2#, BLAST#, NA#), and five cache snoop consistency lines (AHOLD, EADS#, INV, HITM#, BOFF#).

In addition, seventeen initialization and execution control pins are provided in the preferred embodiment: a clock (CLK), a reset (RESET), nine configuration pins (CFG0-3, CPUTYP, SNPMD, FPFLDEN#, NCPFLD#, PLOCKEN, VVVVOR#, MEMLDRV) and four test pins (TCK, TD0, TD1, TMC).

MBC Interface 35 couples signals to and from MBC 11 for control of Memory Bus 15 and adapting Controller 12 and Cache SRAM 13 to a specific memory bus protocol. Signals between MBC 11 and Interface 35 represent Memory Bus 15 cycle requests by Controller 12 or MBC 11 cycle progress signals comprising: a burst ready (BRDY#), three address and data strobes (CADS#, SNPADS#, CDTS#), nine cycle controls (CW/R#, CD/C#, CM/IO#, MCACHE#, CPLOCK#, KLOCK#, RDYSRC, CLEN 0-1), four memory cycle attributes (NENE#, SMLN#, PALLOC#, CWAY), four Memory Bus Address Latch 34 enables (MAOE#, MBAOE#, MALE, MBALE), five cycle progress signals (BGT#, KWEND#, SWEND#, CRDY#, CNA#), a MBC 11 associated BE Latch 17 control signal (BLE#), and cache directory array or Tag RAM 31 tag control signals (FLUSH#, SYNC#, FSIOUT#).

Cache Interface 37 couples to Cache SRAM 13 for implementing cache input and output cycle control for a two way cache. The interface signals comprise: a way control (WAY), two array controls (WRARR#, MAWEA#), and five Cache SRAM 13 buffer controls (MCYC, BUS#, WBWE#, WBA, WBTYP).

Memory Bus Address Queue 36 is an internal queue used for scheduling CPU 10 or Controller 12 initiated requests for Memory Bus 15 cycles. A key feature of Queue 36 is the manner in which the address of the next pending activity is handled. The last stage of Queue 36 connects to Memory Bus Controller Interface 35 and to Memory Bus Address Latch 34, a logically transparent address latch with latch enables (MALE, MBALE) and output enables (MAOE#, MBAOE#) supplied by MBC 11 through Memory Bus Controller Interface 35.

FIG. 3 shows in greater detail the internal Controller 12 address latches, i.e., Snoop Latch 33 and Memory Bus Latch 34. Memory Bus Queue 36 provides TAG, SET and CPU Subline (CFAx) signals. Control signals MALE (cache line address) and MBALE (cache subline address) control Latch 21 for TAG, SET and configurable addresses signals (CFAx) respectively. The output of Latch 21 is enabled/disabled by tri-state Output Buffers 22 and 23, controlled by MACE# (cache line address) and MBAOE# (cache sub-line address) respectively. Bidirectional address information flows to and from Memory Bus 15 on the MTAG, MSET, and MCFAx lines.

Cache Controller 12 handles cache consistency on Memory Bus 15 by performing snoops when requested. In response to a snoop request, Snoop Control 39 gains immediate access to Tag Array 31 and performs a look-up. Within a deterministic period of time, it responds back to MBC 11 with the results of the snoop. Signals are provided to indicate if a valid tag was hit and if so, whether the corresponding data is modified [M] state. MBC 11 will convert these signals as required by the specific memory bus protocol.

If a hit is detected, Snoop Control 39 is responsible for further action. The CPU cache consistency protocol is based on the principle of inclusion which requires all lines in the primary cache (i.e., CPU cache) to also exist in the secondary cache (i.e., Cache Controller 12). As a result, if a line is altered in the secondary cache, action must be taken in the primary cache. Any line in the secondary cache that is invalidated must be invalidated in the primary cache by running invalidate cycle(s). If the secondary cache line is modified [M] state, inquire (possibly with invalidate if the secondary cache will be invalidated) cycle(s) must be run (if the CPU cache implements a write-back protocol) and the memory bus controller interface signalled that a snoop write-back cycle is required. Note that in some configurations Cache Controller 12 will run multiple invalidate or inquire cycles since multiple CPU cache lines can fit in a Cache Controller 12 cache line. This parameter is referred to as line ratio.

Because the Snoop Controller 39 to Memory Bus 15 interface is part of Cache Controller 12, it is necessary to support all signalling modes allowed on Memory Bus 15. Specifically, snoops must be recognized for clocked and strobed memory bus protocols, and must work in both synchronous and asynchronous environments. For support of the asynchronous environments, the snoop interface has a built in synchronizer. This is the only synchronizer in Cache Controller 12 that is used during normal operation. It is included to save the extra clock cycle that would be required for an external synchronizer.

Snoop Latch 33, a two stage address latch, is shown in greater detail in FIG. 4, comprising of an input Asynchronous Latch 41 connected to Memory Bus 15 address lines and an output Synchronous Latch 43 that receives data form Latch 41 and passes address data on to MUX 32. Transparent Latch 41 is normally open. When a snoop event is activated on Memory Bus 15 by another snooping MBC, the snoop address is latched by Latch 41. Latch 41 reopens when Synchronous Latch 43 closes. Latch 43 closes after a snoop request (SNPSTB# synchronized) and opens when the snoop look-up is completed. Latch 41 also passes on control signals for Tag RAM 31: snoop invalidation (SNPINV) forcing a snoop hit into state invalid, [I]; memory bus output enable (MAOE#) enabling a snoop when active; and snoop non-caching device access (SNPNCA) indicating that the bus master is a non-caching agent such as a direct memory access (DMA) device ([E] state permitted).

Snoop Latch 33 supports three signalling modes for initiating snoops and controlling Latches 41 and 42: strobed asynchronous, clocked asynchronous, and synchronous. The strobe asynchronous mode uses the falling edge of SNPSTB#. The clocked asynchronous mode uses SNPSTB# active on the rising edge of SNPCLK as the snoop event. Based on the selected mode, MUX 44 closes Latch 41 and passes the signal to Synchronizer 45 which passes it to MUX 42. Synchronous mode uses SNPSTB# active on the rising edge of CLK as the snoop event. SNPSTB# also connects to MUX 42 providing an additional mode select to control the closing of Latch 43 and initiating a snoop cycle. Note that Latch 41 remains open in the synchronous snoop mode. Mode selection is provided on SNPCLK: high for strobed asynchronous, low for synchronous, and toggled for clocked asynchronous.

MUX 32 provides the means for selecting the address source to be used by Tag RAM 31: either an address supplied by CPU 10 through CPU Bus Interface 30 or Snoop Latch 33.

Tag RAM 31 together with Cache SRAM 13 implements a two way set associative cache. For initiation of a cache memory cycle, Tag RAM 31 uses the 12 (11) bit set address bits of Latch 51 to select one of 4K(2K) sets as shown in FIG. 5. The two tags strobed in the two tag cache Directories 52 and 53 are simultaneously compared by Comparators 54 and 55 with the tag bits of the address to look for a match.

For read cycles SRAM 13 simultaneously looks-up the set addressed by the set bits and provides data based on the MRU 59 through MUX 63. If Comparators 54 and 55 detect a match, and this is not the way pointed to by LRU/MRU Directory 58, the data is used. If Comparator 54 or 55 detect a match, and Directory 58 matches, Directories 58 and 59 are updated by SRAM 13 switching MUX 63. If neither Comparator 54 or 55 detects a match, the cycle is passes on to Memory Bus 15.

For write cycle, Comparators 54 and 55 are used to detect hit/miss and to signal SRAM 13 to which way to write in the case of a hit. Write hits also cause Directories 58 and 59 to be updated consistently but not necessarily at the same clock cycle.

Snoops and replacements use the Cache Controller 12 to Cache Memory 13 way correction-like writes to identify the way to be accessed but do not effect the MRU or LRU state.

In order to statistically reduce access time to data in SRAM 13, Tag RAM 31 also implements predictive selection of the way to be chosen on any given access. The prediction is based on the most recently used (MRU) rule. In a read operation, the MRU rule predicts that the most recently used way will provide the required data and so MUX 63 in SRAM 13 (FIG. 5) is set to select the MRU way indicated by the bit in MRU Directory 59. If the prediction is correct, the required data is immediately available. If the prediction is not correct as determined by Prediction Logic 56, which compares the outputs form comparators 54 and 55 with the stored MRU bit in LRU/MRU Directory 58, a wait state is introduced in order to allow time for prediction correction Signal 57 to cause MUX 63 to switch to the other way. As a result, the MRU bit is up-dated in Directories 58 and 59.

The LRU bit is also used for cache memory replacements based on the premise that the most recently used data will more probably be required again rather than the least recently used data.

Tag RAM 31 also stores the four consistency states of each cache entry in a four-bit field. The four states define if a line is valid (hit or miss), shared with other caches, exclusive to a given cache, or if modified relative to contents of main memory.

D. Input and Output Pins

FIG. 6 shows a bottom view of the pinout configuration of one preferred embodiment of the current invention for use with the Intel 80486 processor. The input/output signals on the four sides are mainly grouped as follows: CPU bus interface along the left and bottom sides, memory bus interface along the right side and memory bus controller interface and test pins along the top. The cache memory (C8) interface pins share the bottom side. FIG. 7 is a table for cross referencing signal names with location coordinates. Power supply pins (Vcc and Vss) are centrally distributed on all four sides.

D.1. CPU Bus Interface Pins

The system is initialized by providing the CPU clock signal, CLK, a RESET signal and set of nine configuration signals representing line ratio, tag size, lines/sector, bus width and catch size. The clock signal, CLK, determines the execution rate and timing of Cache Controller 12. The RESET input is asynchronous and forces Controller 12 into a known state. Configuration signals are sampled on the falling edge of RESET and are functionally multiplexed with other pins. FIG. 8 shows the timing relationship for configuration input sampling. Typically, the setup time is three clock cycles followed by a hold of less than one clock after the RESET signal falling edge.

Configuration signals CFG0–CFG3 configure the cache parameters including: line ratio, lines/sector, and number of tags. The Controller 12 decodes these lines and passes relevant information on to the cache memory 13 via the cache memory interface lines LR0, LR1 and SEC2#, each multiplexed on pins MCYC#, BUS# and WBA respectively. FIG. 9 shows the eight configuration options specified by signals CFG0–CFG3 when used with the Intel 80486 CPU. The configuration parameters that are controlled include: line size ratio (1,2; 4 or 8), lines/sector (1 or 2), and number of tags (4K or 8K).

Line size ratio is the relative size of the cache line size to the CPU on-chip line size. Cache Controller 12 uses this information to determine the number of back invalidation or inquire cycles required for completion when accessing the CPU primary cache. Lines/sector refers to the one or two line cache memory sector supported by Cache Controller 12, each sector line being associated with a single tag and each line with a single state. During tag replacement, the entire sector (one or two lines), if modified, is written back into main memory. FIG. 9 also lists the state of signals LR0, LR1 and SEC2# previously discussed. Additionally, in the last column, the states of flag TAG 8 listed indicate to Cache Controller 12, whether 4K or 8K of tags is being supported.

Three of the remaining five configuration parameter signals comprise: CPUTYP, shared with pin HITM#, indicating the CPU type (80486 or i860XP TM); SNPMD, shared with pin SNPCLK#, indicating whether the snoop mode is synchronous or clocked/- strobed asynchronous; and PLOCKEN, multiplexed with CPLOCK#, is used only with the 80486 CPU for handling of 64 bit atomic writes from CPU 10 by enforcing the 80486 CPU PLOCK# function. If PLOCKEN is sampled high at RESET, the PLOCK# function is enabled and PLOCK# requests are represented by Controller 12 pin CPLOCK#. If low, Controller 12 ignores the 80486 CPU PLOCK# requests and CPLOCK# is disabled.

The last two configuration signals comprise: MEMLDRV, shared with pin SYNC#, indicating the choice of high capacitance memory bus drivers if low at RESET, otherwise indicating the choice of low capacitance drivers if high at RESET; and WWOR#, shared with pin MALE#, indicating the choice of weak write-ordering if low at RESET, and the choice of strong write-ordering if high at RESET. Strong write-ordering prevents Controller 12 from completing a write cycle that would go to [M] state if a posted write is pending (i.e. has not been granted Memory Bus 15 with BGT#). Thus, strong ordering ensures that write cycles from CPU 10 are written to memory in the same order.

The preferred embodiment of the Cache Controller 12 has seven configurable address lines which change function according to the previously described configuration option pins. The reason for having these multifunction pins is to reduce pin count because the larger (wider) the cache memory 13, the less tag bits are required. The line functions change in accordance with the CFG0–CFG3 and CPUTYP lines. FIG. 10 shows the function of address lines CFA0–CFA6 and also indicates which CPU address line (A2–A6, A28–A31) should be connected to these lines when using the 80486 CPU.

SET0–SET10 are the set of address pins that are connected directly to the tag array 31 of Cache Controller 12 and to the CPU address lines used for selecting the cache memory set to be accessed. However, in the 8K, tag mode, pin CFA6 serves as SET11.

TAG0–TAG11 are fixed tag lines connected to the associative memory two-way tag comparators used to determine if a hit has occurred. In addition unused CFAx lines, dependent on the configuration selected, may also function as TAG bits. A maximum of 15 TAG lines are supported, enabling the caching of the whole 4 Gigabytes address space for most operating modes.

The Cache Controller 12 supports three bus cycle definition pins in accordance with the 80486 CPU data sheet: W/R#, DC#, and MIO#. These three pins define the type of bus cycles to be performed: W/R# distinguishes between write and read cycles; DC# distinguishes between data and control cycles; and MIO# distinguishes between memory and I/O cycles.

Two additional pins are defined in accordance with the i860XP ™ data sheet: CACHE# AND LEN. CACHE# identifies the CPU intent to cache (not used with the 80486). LEN is used to identify a CPU bus data type that requires two data transfers. The PLOCK# signal on the 80486 is redefined as this signal for use with Cache Controller 12.

PCD and PWT are page attribute pins activated on a page by page basis by CPU 10. PCD indicates a non-cacheable address, while PWT instructs the Cache Controller 12 to attach a write-through attribute to the accessed line causing a write of the same data to main memory. However, the Controller 12 cache state may over-rule PCD and PVVT attributes. (For instance, when accessing a cache line in any valid ([S], [E], [M]) state with PCD active, the controller will ignore PCD and consider the line to be cached; when accessing lines in exclusive states ([E], [M]) with PWT active, PWT will be ignored and the line state will remain exclusive. See section E.1.)

The Cache Controller 12 provides the CPU 10 with the KEN# signal to indicate cacheability of the requested cycle. It is normally active and will go inactive in read hits to read-only addresses, and in all locked cycles. If a cycle is not a hit and because cacheability can be indicated by the memory bus, the Cache Controller 12 will wait for the closure of the cacheability window (KWEND#) to resolve cacheability by reference to the memory bus interface cacheability pin MKEN# and memory bus read-only pin MRO#.

There is a CPU bus cycle locking signal, LOCK#, and two MBC 11 bus looking signals. A LOCK# signal is used when requesting a read-modify-write sequence. Cache Controller 12 passes this request to the MBC 11 via KLOCK# pin for execution of an uninterrupted memory bus sequence. PLQCK# is used to reflect an 80486 CPU 64 bit write request. The current cycle for which CPLOCK# is active and next cycle are treated as an atomic transfer of two 32 bit words (64 bit floating point operands). Cache Controller 12 may disable atomic 64-bit write functionality in order to decrease the worst case snoop latency.

The CPU bus interface supports five bus cycle control pins: ADS#, BRDYC1#, BRDYC2#, BLAST# and NA#. The CPU 10 provides the ADS# address status signal indicating the availability of a new address and status word on the address/status bus by going active on the first clock of a bus cycle and inactive on the second one. BRDYC1# and BRDYC2# are logically equivalent and are provided to decrease loading effects, as well as to indicate to the CPU 10 and Cache 13 that data on the data pins are valid and the next sequence of the burst may be initiated. These signals are generated by the Cache Controller 12 when main memory access is not required. BLAST#, supplied by Cache Controller 12, indicates the completion of the burst and is used by CPU 10 and Controller 12 in conjunction with BRDY to complete the bus cycle. NA# is a next address request signal from Controller 12 initiating a pipeline process by indicating that Controller 12 is prepared to accept the next cycle event if the end of the current cycle has not been completed. If NA# is low, the next address is driven onto CPU Bus 14 when available.

Cache Controller 12 has five cache consistency lines, HITM#, BOFF#, INV, AHOLD and EADS#, for starting a snooping cycle to the CPU. AHOLD causes the CPU to float its address lines, thus enabling the CPU Bus Interface 30 to drive the snooping address on CPU Bus 14. EADS# indicates that the snoop address is valid and should be strobed. Only these two signals are required for snooping with the 80486 CPU. Note, however, that the CPU will invalidate its cache line if the snooped address hits its internal cache, an event called a back-invalidation cycle. The i860XP ™ CPU uses HITM# to indicate a hit to an [M] state line, INV to request invalidation for writes, and BOFF# to break deadlocks.

It should be noted that Cache Controller 12 snoops the CPU cache based on the principle of inclusion. Hits to the second level cache are snooped in the primary cache with [M] state lines in the second level cache and assumed to be in [M] state in the primary cache for the i860XP ™ CPU.

In addition to the above enumerated pins and signals, three input test pins, TCK, TDI, and TMS, and one output pin TDO are used to support boundary scan testing of the cache controller chip in accordance with a subset of the IEEE P1149.1 recommended standard.

D.2. Memory Bus Controller Interface Pins

MBC 11 ensures the transfer of the proper amount of data on the memory bus, i.e., either a full C5 cache controller line or the amount of data requested by the CPU 10. MBC 11 generates a burst ready signal, BRDY#, to Cache Controller 12, Cache Memory 13 and CPU 10. BRDY# indicates that valid data is present in response to a read or that the main memory bus has accepted data in response to a write. BRDY#, sampled on the second and subsequent clocks of a burst cycle, is use by Controller 12 for burst tracking purposes.

Memory Bus Controller Interface 35 provides three address/data strobes: CADS#, SNPADS# and CDTS#. CADS# (address strobe) is active whenever a memory bus cycle is required and is completely analogous to the CPU ADS# signal previously described. It indicates that new cycle control information (as described below) and attribute signals are valid. SNPADS# indicates a memory bus cycle request for a snoop hit to a modified ([M] state) line. This separate address strobe is provided to ease the implementation of MBC 11 in supporting intervening snoop cycles. Activation of SNPADS# causes MBC 11 to abort all its pending, but not committed, cycles. If cycles are committed, the SNPADS# is delayed until completion (as explained later). Pending cycles are restarted by Cache Controller 12 issuing appropriate CADS# signals. CDTS#, the cache data strobe, indicates that the CPU data path will be available to MBC 11 in the next clock for read cycles. For write cycles, it indicates data availability to the memory bus. This implementation provides complete independence between address strobes (CADS# or SNPADS#) and data strobe. In this way, Cache Controller 12 is free to initiate in MBC 11, a new cycle as soon as addresses are available and before data is ready.

Nine cycle control signals are generated by Cache Controller 12. When Cache Controller 12 initiates a memory bus cycle by means of CADS#, the type of cycle requested is defined by the states of three cycle definition signals: cache write/read (CW/R#), cache data/control (CD/C#) and cache memory I/O (CM/IO#). Decoding of these pins by MBC 11, is similar to the CPU 10 W/R#, DC# and M/IO# signals. Further specification of the cycle is accomplished by means of signals CLEN0, CLEN1, CPLOCK#, KLOCK#, MCACHE# and RDYSRC.

CPLOCK# is used to identify 64-bit atomic writes for the 80486 CPU. CPLOCK# may be disabled in order decrease snoop latency. KLOCK# is a signal by which Cache Controller 12 requests MBC 11 to execute an atomic read-modify-write cycle resulting from a CPU 10 LOCK# request.

MCACHE# instructs MBC 11 that the accessed line of data is to be cached by Controller 12 thus implicitly indicating the number of burst transfers to the memory bus cycle. It also serves to provide cacheability information to other agents on the Memory Bus 15. If MCACHE# is active, MBC 11 can make the line cacheable by returning MKEN#, the memory bus cache enable pin. RDYSRC indicates to MBC 11 whether it or Cache Controller 12 will generate burst ready pulses (BRDY# or BRDYCI#/BRDYC2#) to CPU 10. Burst cycle length information is provided to MBC 11 through the CLEN0 and CLEN1 lines (shared with BOFF# and INV, respectively) in the CPU bus interface. FIG. 11 shows the MBC 11 decoding of cache controller cycles for use with the 80486 CPU. The column marked Memory Cycle Length shows the number of burst ready pulses generated by MBC 11. (Note that the symbol (X) indicates "don't care".)

NENE#, SMLN#, PALLC# and CWAY are four general purpose attributes which may be used by MBC 11 to optimize bus implementations. NENE# stands for "next near" and indicates that the current address is in the same DRAM page of main memory as the previous one. This information can be used to facilitate implementation of paged DRAM memory systems. Controller 12 assumes a DRAM page size of 2K addresses. SMLN#, or "same line" signal, indicates that the current cycle address is in the same cache line as the previous one. Controller 12 can use this information to conditionally issue snoop strobes on the memory bus by selectively activating its SNPSTB# signal to other caches in the system. PALLC# is sent to MBC 11 by Controller 12 to indicate that the current write cycle is potentially allocatable, i.e., it satisfies the conditions of: write miss, LOCK#=1, PCD=0, PWT=0. Controller 12 can use this information to implement read for ownership cycles if so desired. CWAY, the cache way signal, indicates to MBC 11 the way used (or to be used) by the requested cycle and can be used by external logic devices to completely track the cache controller tag contents.

BGT#, KWEND#, SWEND#, CRDY# and CNA# are provided by MBC 11 and are used by Controller 12 to track the memory bus cycle. BGT# indicates that the requested cycle is a guaranteed transfer by inhibiting snoops into Controller 12 until the end of the snooping window. KWEND# indicates the closure of the cacheability window, i.e., the amount of time from the start of a cycle on the Memory Bus 15 until cacheability indication is resolved. MBC 11 informs Controller 12 on the closure of the cacheability window by activating the KWEND# signal causing Controller 12 to sample the MKEN# and MRO# attribute pins. The MKEN# (memory bus cache enable) pin is an input to Controller 12 that indicates cacheability of the current memory bus cycle. The MRO# (memory bus read-only) pin indicates that the accessed line should be assigned a read-only attribute ensuring first level non-cacheability and write protection in the second level cache. Also, MRO# is a bit in each C5 tag entry. SWEND# indicates closure of the snoop window and causes Controller 12 to sample the MWB/WT# and DRCTM# pins of the Memory Controller Interface 35. MWB/WT#, the write-back/write through signal is used by Memory Bus 15 to dynamically inform Controller 12 of the write policy to be used. DRCTM# is the memory bus direct to [M] state signal that informs Controller 12 to skip the [E] state and move directly to the [M] state. Both MWB∧WT# and DRCTM# are used by Controller 12 to update the tag state (line fills, allocations and write to [S] state). After SWEND#, MBC 11 can safely start supplying data to CPU 10. However, Controller 12 permits snooping information to be supplied at the very last moment of a cycle so that snooping may run in parallel with the filling of the Cache SRAM 13 line-fill buffer. CRDY#, the cache ready signal, is an input signal to both Controller 12 and Cache Memory 13 from MBC 11 indicating full completion of a Memory Bus 15 cycle releasing Controller 12 and Cache 13 to attend the next cycle. CRDY# assertion allows Controller 12 to sample cycle progress signals (BGT#, KWEND#, SWEND#) for the next cycle if pipelining is used. CRDY# is required for all memory bus cycles, including snoop cycles. CNA#, an input to Controller 12 from MBC 11, used to facilitate the pipelining of bus control cycles, instructs Controller 12 that the contents of the External Address Latch 34 has been used and a new address can be loaded.

Reference to FIG. 2 shows that Controller 12 has an internal Memory Bus Queue 36 to schedule memory bus cycle requests by CPU 10 or allocation and write-back requests generated by Controller 12. An important feature in the use of Queue 36 is its use in conjunction with the use of the address of the next pending activity. Controller 12 permits MBC 11 to control the last stage of Queue 36 by means of logically transparent address latches together with latch enable and output enable signals provided by MBC 11. Two sets of control signals are provided: MALE, MAOE#, and MBALE and MBAOE#. Memory Bus Queue 36 may be pipelined by MBC 11 in conjunction with the CADS# address strobe.

MALE and MAOE# control the timing of the Controller 12 line address Latch 34. Activation of MALE (memory bus latches enable) opens Latch 34 and allows the next line address to flow through to MBC 11. MAOE#, memory bus address output enable, controls the output buffer of the memory bus Address Latch 34 and when active allows Controller 12 to drive the memory bus address and, if inactive, it goes into the high impedance state. Snoop cycles may only occur when MAOE# is inactive.

MBALE and MBAOE# control the latch enable and the output enable for Controller 12 sub-line (burst) addresses similar to MALE and MAOE# control of Controller 12 line addresses except the MBAOE# does not serve as a snoop qualifier as does MACE#. MBAOE# qualifies the subline address during snoops. If MBAOE# is active, the sub-line is set to 0. If MBAOE# is inactive, the sub-line is sampled from Memory Bus 15.

MSET 0-10, MTAG 0-11 AND MCFA 0-6 provides the complete 30 bit address input/output interface of Controller 12 to Memory Bus 15. These signals must pass through Output Latch 34.

FIG. 12 defines which memory bus lines are controlled by which set of control signals. The first column is the configuration number, (1-8), as defined in FIG. 9, while succeeding columns indicate which address lines, MCFA0-MCFA6, MTAG (0:10) or MSET (0:10), are controlled by control signals MALE and MACE# as indicated by MAxx or by MBALE and MBAOE# as indicated by MBxx.

BLE#, the byte enable latch enable signal, is generated by Controller 12 and is used to control the enable of the clock edge triggered MBC 11 BE Latch 17 used to capture CPU 10 signals that do not go through Controller 12, i.e., BE0#-BE3#, PWT and PCD. BE0#-B3# are byte enable signals that indicate active CPU bus bytes when low during read and write cycles. BE0#, BE1#, BE2# and BE3# apply to CPU data bytes D0-7, D8-15, D16-23 and D24-31 respectively. PWT, the page write-through signal, and POD, the page cache disable signal, reflect the state of the CPU page attribute bits. BE Latch 17 typically closes one clock after ADS# of a non-blocked CPU cycle, indicating that a new valid address and cycle definition information is currently being driven onto to the address, byte enables, and cycle definition lines of CPU Bus 14 by the CPU 10. BE Latch 17 closes and re-opens immediately for hit cycles and re-opens either with CNA#, or with CRDY# for miss cycles.

FLUSH#, SYNC# and FSIOUT# are cache synchronization signals. FLUSH# and SYNC# are MBC 11 generated. FLUSH#, when active, causes Controller 12 to completely write-back all of its modified lines into main memory and then invalidate all tag locations. When used with the 80486 CPU, Controller 12 assumes FLUSH# is activated with or after the CPU flush has been completed thereby obviating the need for Controller 12 to execute back invalidation cycles. After FLUSH#, all CPU 10 and Controller 12 cache lines should be in the [I] state. SYNC#, the Controller 12 cache synchronization signal supplied by MBC 11, causes synchronization of Controller 12 Tag Array 31 with main memory by writing-back all modified entries to main memory. At the completion of the synchronization process, all Controller 12 and CPU 10 lines will be in non-modified states. The difference between FLUSH# and SYNC# is that SYNC# does not invalidate Tag Array 31 entries. All valid entries will be kept, with all modified lines becoming exclusive ([E]-state) lines. FLUSH# and SYNC# are asynchronous inputs to Controller 12. During both FLUSH# and SYNC# sequences, Controller 12 activates AHOLD on the CPU interface 30 thus placing CPU 10 in the address hold request mode, but Controller 12 continues to snoop memory bus 15 for data consistency. FSIOUT#, a Controller 12 output, indicates the start and end of the FLUSH#, SYNC# and RESET sequences.

D.3. Memory Bus Interface Signals

The Memory Bus Interface 38 includes pins for snoop clock, memory bus address, snooping mode selection and memory attribute definition in addition to the line and sub-line control pins, (MALE, MAOE#, MBALE and MBAOE#) previously discussed.

SNPCLK, is a snoop clock signal input pin for use with clocked memory buses. In this mode, Controller 12 assumes snoop related signals to be synchronous with SNPCLK.

MCFA0-MCFA6, MSET0-MSET10 and MTAG-0-MTAG11 are memory bus address lines having the same functionality as the CPU bus counterparts, CFA-0-CFA6, SET0-SET10 and TAG0-TAG11, and should be connected to the A2-A31 (A3-A31 for 64 bit bus) signals of the Memory Bus 15. Together with the byte enables, these signals define the physical area of memory or I/O accessed. Because these signals define Controller 12 configuration including cache size, CPU line ratio and the number of lines/sector, they must be connected exactly the same as their respective CPU Bus 14 signals. These pins are bidirectional: Controller 12 memory bus Address Latch 34 driving these signals in normal memory bus cycles and Controller 12 Snoop Latch 33 accepting them as inputs during snooping. As discussed in the previous section, MAOE# and MBAOE# enable the memory bus address lines with MBAOE#, only, controlling subline (burst) address enabling.

Controller 12 supports three snooping modes: choice of strobed asynchronous, clocked asynchronous, or synchronous modes. Modes are selected at reset by configuring the SNPCLK signal as follows: high for strobe asynchronous, low for synchronous and toggling for clocked asynchronous. In the strobe mode, Controller 12 samples the address/attribute lines relative to the falling edge of snoop strobe SNPSTB#. In the clock mode, Controller 12 samples address/attribute signals during the rising edge of input snoop clock signal, SNPCLK, when SNPSTB# is sampled active. In the synchronous mode, Controller 12 samples address attribute signals of CLK when SNPSTB# is sampled active. Output SNPCYC# is activated during the clock when the snoop is actually performing the tag look-up.

Memory bus address output latch enable, MAOE#, previously described in reference to MBC 11 interface, must be inactive to permit a snooping request.

SNPNCA and SNPINV are snooping cycle attribute signals sampled with SNPSTB#. SNPNCA indicates the current memory bus master is performing a non-caching access which allows Controller 12 to keep lines exclusive for reads. SNPINV indicates that the snooped line must be invalidated on completion of the snoop.

Upon snoop request, Controller 12 latches address and snoop attribute lines and performs a cache look-up. Snooping cycles always take priority on the Tag Array 31 and will cause a CPU wait state on contentions. Controller 12 activates MTHIT# for snoop cycles that hit any exclusive, shared or modified line in Cache SRAM 13 MHITM# is activated during a snoop cycle to indicate a hit to a modified line. If active, Controller 12 automatically schedules a write-back to the Memory Bus 15. If Controller 12 asserts MHITM#, it alerts the requesting MBC 11 that the bus must be temporarily given to the snooper that has MHITM# asserted so that the modified line may be written out to the memory bus. SNPBSY#, the snoop busy indicator, may also be activated if a snoop hit was made to a modified line or a back-invalidation is needed when one is already in progress. In either case, Controller 12 will not perform the look-up for a pending snoop until SNPBSY# is deactivated. SNPBSY# is deactivated when Controller 12 is ready to accept another snoop cycle. The maximum snoop rate is one snoop per two clocks in the synchronous mode.

MKEN#, an input to Controller 12, when active indicates memory bus cacheability in Controller 12 CPU 10 when active. When inactive, or non-cacheable, Controller 12 will not execute line fills or allocates.

MRO#, a read only line attribute, is an input to Controller 12 causing the addressed line to be write protected. Any write to this line will be a non-allocatable (PALLOC# inactive) write-miss. Read only lines will only be cacheable if MKEN# is active. This attribute is useful for caching of the contents of ROM (read only memory) devices.

MWB/WT# is a memory bus input attribute indicating either a write-back or write-through attribute and is sampled with the closure of the snoop window SWEND#.

DRCTM#, a memory bus input attribute signal, indicates a direct to [M] state transfer when active, allowing Controller 12 to skip the [E] state and put the line in [M] state. This attribute is useful for allowing ownership exchange during snoop hits to dirty data, and/or for allowing external tracking of the controller cache. It is sampled by Controller 12 with the closure of the snoop window, SWEND#.

D.4. Cache Memory Interface Pins

Controller 12 supports nine cache memory interface pins for the following purposes: way control (WAY); array control (WRARR#, MAWEA#); and buffer control (MCYC, BUS#, WBWE#, WBA, WBTYP).

WAY, an output signal is used to indicate the correct way to be used by Cache-Memory 13 during write cycles, line-fills and write-back-buffer loads. When an MRU (most recently used rule) miss occurs on a read-hit, WAY is used to update the MRU bit in Cache Controller 12 and in Cache Memory 13 which indicates the most recently used way.

WRARR#, an output signal is used to control cache memory writes originating from the CPU Bus 14 to cache memory RAM. It causes Cache Memory 13 to set its internal way mux to select the way indicated by WAY and up-date the cache memory MRU when required. In the case of miss-read cycles, WRARR# is activated for the purpose of updating the MRU bit.

MAWEA#, memory bus array write enable/allocate signal, when active indicates to the Cache Memory 13 that it should write the line contained in its memory buffer into the RAM in the clock following CRDY#, the Cache Memory bus ready signal generated by MBC 11. In the case of write-cycles, MAWEA# active indicates that the cycle requires an allocation of a new tag.

MCYC#, memory bus cycle indication signal, generated by Controller 12 indicates to Cache Memory 13 that the current CPU cycle will use the memory buffers. If the current cycle is a read and MCYC# goes active, the cycle becomes a Memory Bus 15 read. If the current CPU cycle is a write, MCYC# asserted indicates a Memory Bus 15 write cycle. If the CPU write cycle ends before CRDY# is asserted, the memory buffer is marked as full and the write is posted until CRDY# ending the memory bus cycle is asserted.

BUS#, bus/array select signal generated by Controller 12, controls the selection of CPU buffer data during read operations. When Active, Cache Memory 13 sets an internal mux so that Memory Bus 15 is the source instead of its RAM array. BUS# is not activated for locked read-cycles (read-through) even though the cycle requests Memory Bus 15, if the cycle hits an [M] state line in the Cache Memory 13. Instead, data will be supplied from the array.

WBWE#, write-back buffer write-enable generated by Controller 12 in conjunction with WBA (write-back buffer address signal) is used to load the two cache memory write-back buffers, one for each line of sector. WBA, sampled when WBWE# is active, indicates the first line in write-back buffer; when inactive, indicates the second line.

WBTYP, write-back cycle type signal is generated by Controller 12 in conjunction with WBA. When high, it indicates a snoop write-back cycle and points to the two Cache Memory 13 snoop buffers, otherwise a replacement or explicit write-back cycle due to FLUSH# or SYNC# and points to the two Cache Memory 13 write-back buffers. It is sampled by Cache Memory 13 by the activation of WBWE# or HITM# and ADS#. Thus, WBTYP together with WBA are used to specify line one or two of either the snoop or write-back buffers.

E. Cache Consistency Protocol

In order to maintain data consistency in a multiprocessor system, Cache Controller 12 implements a "write-back" cache with full support for multiprocessing data consistency. Because any cache controller may, at a given time, contain data which is not updated in memory, a write-back mechanism is provided to ensure that data read by any system bus master is correct and timely.

A key feature for multiprocessing systems is reduction of the memory bus utilization. The memory bus quickly becomes a resource bottleneck with the addition of multiple processors. The cache consistency mechanism insures minimum usage of memory bus bandwidth.

Cache Controller 12 allows portions of main memory to be defined as non-cacheable. For the cacheable areas, it allows selected portions to be defined as write-through locations.

This protocol is implemented in Cache Controller 12 by assigning state bits for each cached line. Those states are dependent on both data transfer activities performed by Controller 12 as the bus master, and snooping activities performed in response to snoop requests generated by other memory bus masters.

The consistency protocol is the set of rules which allows Cache Controller 12 to contain data that is not updated in main memory while ensuring that memory accesses by other devices do not receive stale data. This consistency is accomplished by assigning a special consistency state to every cached entry (line) in Controller 12. The following rules apply to memory read and write cycles. All I/O and special cycles bypass the cache.

Cache Controller 12 consistency protocol has 4 states. They define whether a line is valid (hit or miss), if it is available in other caches (shared or exclusive), and if it is modified (has been modified). The four states are:

- [I]-INVALID Indicates that the line is not available in the cache. A read to this line will be a miss and cause Controller 12 to execute a line fill (fetch the whole line and deposit it into the Cache SRAM 13). A write to this line will cause the C5 to execute a write-through cycle to Memory Bus 15 and in some circumstances initiate an allocation (assignment of a new value to a tag).
- [S]-SHARED This state indicates that this line is potentially shared with other caches (The same line may exist in more than one cache). A shared line can be read out of Cache SRAM 13 without a main memory access. Writing to a shared line updates the cache, but also requires Controller 12 to generate a write-through cycle to Memory Bus 15. In addition to updating main memory, the write-through cycle will invalidate this line in other caches. Since writing to a shared line causes a write-through cycle, the system can enforce a "write-through policy" to selected addresses by forcing those addresses into the [S] state. This can be done by setting the PWT attribute in the CPU page table or asserting the MWB/WT# pin each time the address is referenced.
- [E]-EXCLUSIVE This state indicates a line which is exclusively available in only this cache, and that this line is not modified (main memory also has a valid copy). Writing to an exclusive line causes it to change to the modified state and can be done without informing other caches, so no memory bus activity is generated.
- [M]-MODIFIED This states indicates a line which is exclusively available in only this cache, and is modified (main memory's copy is stale). A modified line can be updated locally in the cache without acquiring Memory Bus.

MESI is an acronym used to refer to the four states described above and will be used as a convenience in discussing state transitions.

E.1. Basic State Transitions

The basic state transitions of cache lines may be classified in two parts: the first covers MESI state changes which occur in a CPU/cache core due to its own actions; the second describes MESI state transitions in a CPU/cache core caused by the actions of other, external devices. FIG. 13 shows a partial state diagram of the MESI coherency protocol which includes these basic transitions.

The MESI state of each cache line changes as a result of Controller 12 and Cache 13 servicing read and write requests generated by CPU 10. However, the state of the cache line (M, E or S) remains unchanged by a read operation which hits Cache 13.

When CPU 10 generates a read cycle on CPU Bus 14 and the data is not present in Cache 13, a read miss arises. Also, a read miss occurs if a match is found but the data is in state [I] (invalid). Consequently, Controller 12 generates a main memory access to fetch the required data (assumed to be cacheable) and the surrounding data needed to fill the cache line. The PCD (page caching disabled) pin is a Controller 12 input driven by the CPU's PCD output, which corresponds to a cacheability bit in the page table entry of a memory location's virtual address. If the PCD bit is asserted when the CPU presents a memory address, that location will not be cached in either Controller 12 or the CPU 10. Controller 12 allows cacheability to be determined on both a per page and per line basis. The page cacheability function is determined by software, while cacheability on a line-by-line basis is driven by hardware. MKEN# is a Controller 12 input which connects to the memory bus controller or the memory bus. MKEN# inactive prevents the caching of the memory location in both Controller 12 and CPU 10, and only affecting the current address. If a read miss is indicated non-cacheable by either of these signals, the line is not stored in Cache 13 or CPU 10 cache, and no cache states are modified. On a write miss, a non-cacheable indication from either of these inputs forces a write miss without allocation. Note that if Cache 13 already has a valid copy of the line, the PCD attribute from the CPU 10 and MKEN# attribute from Memory Bus 15 are ignored.

The DRCTM# (direct to modified) pin is an input which informs Controller 12 to skip exclusive state, [E], and place a line directly in the modified state, [M]. The signal can be asserted during reads of the main memory for special Cache 13 data accesses like read-for-ownership and cache-to-cache-transfer. The signal can also be asserted during writes, for purposes of cache tracking and also for upgrading a [S] state line to [M] state line. The new data replaces an invalid line or replaces the least-recently-use (LRU) line. If the replaced LRU line is in the modified, [M], state, it is written back to memory. When a line is replaced, Cache Controller 12 is also responsible to invalidate the same line in the primary cache to maintain the principle of inclusion. Invalidation may involve multiple lines (line ratio>1) in the primary cache and possibly involve write-backs from primary cache if data has been modified.

The new line is placed in the exclusive state, [E], unless CPU 10 activates its PVVT (page write through) pin indicating a CPU write-through request or memory bus 15 asserts MWB/WT# (memory bus write-through) pin, in which case the new line is placed in shared state, [S], by Controller 12. The new line will be placed into modified state, [M], rather than exclusive state, [E], if DRCTM# is asserted.

When CPU 10 generates a write cycle, and the data is present in Cache 13, it is updated and may undergo a MESI state change.

If the write hit line is originally in the exclusive state, [E], it changes to modified state, [M], upon a write. If the hit line is in the modified state, [M], it remains in that state. Neither of these cases generates any bus activity.

A write to a line which is in the shared state, [S], causes Controller 12 to write the data out to main memory as well as update Cache 13. The write to main memory also serves to invalidate any copy of the data which resides in another cache. The cache line state changes according to activity on the PWT and MWB/WT# pins. If neither of these pins is asserted, the write hit line becomes exclusive, [E]. If either of these pins is asserted, the line is forced to remain write-through, so the state remains shared, [S].

A write miss occurs if CPU 10 generates a write cycle, and the data is not present in the Cache 13. In a simple write miss, Controller 12 assists CPU 10 by delivering data to memory, but the data is not placed in Cache 13. No cache lines are affected, so no state changes take place.

A write miss with allocate is a special case of a write miss. It occurs when the memory location written by the CPU is not currently in Cache 13, but is brought into Cache 13 and updated. Like a regular write miss, Controller 12 assists CPU 10 in writing the data out to main memory. After the data is written to memory, Controller 12 reads back the same data following the rules of a read miss, above. Cache Memory 13 allows this data merge to occur internally obviating the need for a write request to Memory Bus 15. In this case, DRCTM# must be used to force modified state, [M].

The ability to perform an allocation depends on all of the following conditions being fulfilled: the write is cacheable; PWT is not asserted, forcing write-through; the write is not LOCKed; and the write is to memory (not to I/O) and the write is not cached as read-only. These conditions are signalled to MBC 11 by assertion of PALLOC#.

MESI state transitions in Controller 12 and Cache 13 of one core can be induced by actions initiated by other cores or devices on the shared Memory Bus 15. In the following explanation, assume that Controller 12 which is responding to actions of other devices does not currently own Memory Bus 15, and thus may be referred to as a "slave" or, in the case of snooping, a "snooper". The controller which currently owns the bus is the "master".

The master which is accessing data from main memory on Memory Bus 15 sends a request to all caching devices on the bus (snoopers) to check or snoop their caches for more recently updated version of the data being accessed. If one of the snoopers has a copy of the requested data, it is termed a "snoop hit".

When a snoop hit is detected, Cache Controller 12 must update the line state as specified by SNPINV and SNPNCA. Controller 12 is also responsible for maintaining consistency of the primary cache, included in CPU 10, based on the principle of inclusion. Specifically, all lines in the primary cache must be in the secondary cache and any [E] or [M] state lines in the primary cache must be in [M] state in the second level cache as detailed in section E.3 state Tables.

If a snooper has modified version of the data ("snoop hit to a modified line"), it proceeds to generate an "inquire cycle" to CPU 10, asking CPU 10 if it also has a modified copy of the line, i.e., a more recently modified line. The most up-to-date line is written out by the snooping agent controller to Memory Bus 15 and then to main memory or directly to the requesting master so that the requesting master can utilize it.

MESI protocol state changes in a snooping cache which has a snoop hit depend on attribute inputs SNPINV and SNPNCA, which are driven by the master.

The SNPINV input tells a snooping controller to invalidate the line being snooped if hit: the master requesting the snoop is about to write its copy of this line and will therefore have the most up-to-date copy. When SNPINV is asserted on the snoop request, any snoop hit is placed in invalid state, [I], and a "back invalidation" is generated which instructs the CPU to check its cache and likewise invalidate a copy of the line. When the snooping controller has a snoop hit to a modified line and SNPINV is asserted by the bus master, the back invalidate is combined with the inquire cycle. Inquire cycles are for the i860XP ™ CPU only, Controller 12 performs "back-invalidations" to the 80486 CPU since it is a write-through cache and never has modified data.

The SNPNCA input tells a snooping controller whether the requesting master is performing a non-caching access. If the requesting master is not caching the data, a snoop hit to a modified, [M], or exclusive, [E], line can be placed in the exclusive state. Because the requester isn't caching the line, an invalidation does not have to be broadcast. If the requesting master is caching the data, then a snoop hit to a modified or exclusive line must be placed in the shared state, which insures that a future write hit causes an invalidation to other caches. Note that a snoop hit to shared line must remain in the shared state regardless of SNPNCA. Also note that an asserted SNPINV always overrides SNPNCA.

Cache synchronization is performed to bring the main memory up-to-date with respect to the secondary cache system. Control signals to accomplish this include: FLUSH# and SYNC#.

A cache flush is initiated by asserting Controller 12 FLUSH# pin. Once initiated, Controller 12 writes all modified lines out to main memory, again performing back invalidations and inquire cycles on CPU 10. When completed, all secondary cache Tag RAM 31 entries will be in the invalid state.

Activation of the SYNC# pin also causes all modified lines to be written to memory. Unlike the FLUSH# pin, the cache lines remain valid after the SYNC# process has completed, with modified lines changing to the exclusive state.

E.2. Additional State Transition

In addition to the above described basic state transitions, several other events produce effects on the MESI states including: non-cacheable, read only, locked and forced direct transfer to state [M] access cycles.

The MRO# (memory read only) input to Controller 12 is driven by the memory bus to indicate that a memory location is read only. When asserted during a read miss line fill, MRO# causes the line to be placed in Cache 13 in the shared state, [S], and also sets a read-only bit in the cache Tag RAM 31. MRO# accesses are not cached in CPU 10. On subsequent write hits to a read-only line, the write is actually written through to memory without updating the Cache 13 line, which remains in the shared state, [S], with the read-only bit set.

The LOCK# signal driven by CPU 10 indicates that the requested cycle should lock the memory location for an atomic memory access. Because locked cycles are used for interprocessor and intertask synchronization, all locked cycles must appear on Memory Bus 15. On a locked write, Controller 12 treats the access as a write-through cycle, sending the data to the memory bus-updating memory and invalidating other cached copies. Of the data is also present in Cache 13, it is updated but its M, E, or S state remains unchanged. For locked reads, Controller 12 assumes a cache miss and starts a memory read cycle. If the data resides in Cache Memory 13 the M, E, S state of the data remains unchanged. If the requested data is in Cache 13 and is in the modified state, [M], when the memory bus returns data, Controller 12 will use the Cache 13 data and ignores the memory bus data. LOCKed read and write cycles which miss cache 13 are noncacheable in both Cache 13 and CPU 10.

It is possible to enhance the implementation for LOCKs within a cache line by allowing the line to be cached and snoops to the specific line to be blocked during the locked cycle. This enhancement would further reduce memory bus traffic by confining access to most semiphores to the cache.

E.3. State Tables

Lines Cached by Controller 12 can change states as a result of either the CPU Bus 14 activity (that sometimes require Controller 12 to become a memory bus master) or as a result of Memory Bus 15 activity generated by other system masters (Snooping). State transitions are affected by the type of CPU 10 and Memory Bus 15 transactions (reads, writes) and by a set of external input signals previously discussed and internally generated variables discussed below. In addition, Controller 12 will drive certain CPU/Memory Bus signals as a result of the consistency protocol.

Internally generated variable resulting from CPU Bus 14 activity include:

PWT (Page Write Through, PWT Input pin): Indicates a CPU Bus 15 write through request. Activated by the 80486 or i860XP ™ CPU PWT pin. This signal effects line fills and will cause a line to be put in the [S] state if active. Controller 12 will not execute write allocations for write-through lines. If PWT is asserted, it overrides a write-back indication on the MWB/WT# pin.

PCD (Page Cacheability Disable, PCD input pin): Indicates that the accessed line is non cacheable. If PCD is asserted, it overrides a cacheable indication from an asserted MKEN#.

i860XP ™ /486 (80486 or i860XP ™ CPU indication, CPUTYP Input pin, sampled during reset falling edge): Signal indicates the CPU type currently connected to Cache Controller 12 (primary cache protocol and line size).

NWT (i860XP ™ Write-Through Indication, C5's WB/WT# Output Pin): When low forces the i860XP ™ to keep the accessed line into the SHARED state. Write back mode (WB=1) will be indicated by the !NWT notation. In those cases the i860XP ™ is allowed to go into exclusive states [E], [M]. NWT is normally active unless explicitly stated.

KEN (CPU caching enable, KEN# output pin): When active indicates that the requested line can be cached by the CPU 10 primary cache. KEN is normally active unless explicitly stated.

Memory Bus 15 activity affects the following internal variables:

MWT (Memory Bus Write-Through Indication, MWB/WT# Input Pin): When active forces Controller 12 to keep the accessed line into the shared state,[S]. Write back mode will be indicated by the !MWT notation. In those cases, Controller 12 is allowed to go into exclusive states [E], [M].

DRCTM (Memory Bus Direct to [M] indication, DRCTM# Input Pin): When active forces skipping of the [E] state and direct transfer to [M].

MKEN (Memory Bus Cacheability Enable, MKEN# Input pin): When active indicates that the memory bus cycle is cacheable.

MRO (Memory Bus Read-Only Indication, MRO# Input Pin): When active forces line to be read-only.

MTHIT (Tag Hit, MTHIT# Output pin): Activated by Controller 12 during snoop cycles and indicates that the current snooped address hits a valid line ([E], [S], or [M]) in Controller 12 and Cache 13.

MHITM (Hit to a line in the [M] State, MHITM# Output pin): Activated by the Controller 12 snoop cycles and indicates that the current snooped address hits a modified line in the Controller 12 Tag Array.

SNPNCA (Non Caching device access): When active indicates to Controller 12 that the current bus master is performing a non-caching access.

SNPINV (Invalidation): When active indicates to Controller 12 that the current snoop cycle must invalidate the addressed cache line.

Other internal variables include:

TRO (Tag Read Only, Tag bit): This bit when set indicates that the 1 or 2 lines associated with this tag are read-only lines.

BINV: Execution of a CPU Back Invalidation Cycle (Snoop with INV active or 80486 CPU with WT cache) to maintain the principle of inclusion in the primary cache.

INQR: Execution of a i860XP ™ Inquire Cycle (may be executed with INV active, performing a back invalidation simultaneously) to maintain the principle of inclusion in the primary cache.

WBCK (Controller 12 Write-Back Cycle): This is a Memory Bus 15 write cycle generated when [M] state data cached in Controller 12 is to be copied back into main memory. A write-back cycle affects a complete Controller 12 line.

WTHR (C5 Write Through Cycle): This is a system write cycle in response to a CPU write. It may or may not affect the cache SRAM (update). In a write-through cycle, Controller 12 drives the Memory Bus 15 with the same Address, Data and Control signals as the CPU 10 does on the CPU Bus 14. Main memory is updated, and other caches invalidate their copies.

RTHR (Controller 12 Read Through cycle) This is a special cycle to support locked reads to lines that hit the Controller 12. Controller 12 will request a Memory Bus 15 cycle for lock synchronization reasons, data will be supplied from Bus 15 except for [M] state which will have data supplied from memory 13.

LFIL (Line fill): Causes Controller 12 to generate Memory Bus 15 cycles to fetch a new line and deposit into Cache 13.

RNRM (Controller 12 Read Normal Cycle): This is a normal read cycle which will be executed by Controller 12 for non-cacheable accesses.

SRUP: (Cache 13 SRAM UPDATE): Occurs any time new information is placed in Cache Memory 13. An update is implied in the LFIL cycle.

ALLOC: (Controller 12 ALLOCATION). Write-miss cycle that is cacheable, causing Controller 12 to issue a line read.

FIGS. 14 through 19 define the state transitions from the present state shown in the first column, the existing condition and resulting next state in the second column and the Memory Bus and CPU activity (in terms of the preferred embodiment above defined variables) in the third and fourth column respectively. For convenience, in FIGS. 14 through 19, the symbol "XP" is used to represent the i860XP TM CPU and "CC" to represent Cache Controller 12.

F. Basic Timing of Protocols

The operation of the secondary cache system depends heavily on the interaction of Cache Controller 12 and MBC 11, the two elements that control the flow of data on Memory Bus 15 to and from main memory, as well as other cache systems, and bus masters.

FIG. 20, a more detailed secondary cache system block diagram, provides additional details on control address and data flow between CPU 10, CPU Bus 14, C5 Controller 12, C8 Cache SRAM 13, optional memory bus transceiver (XVR) or latch unit 16, MBC 11 and Memory Bus 15.

Controller 12 requests control of Memory Bus 15 by signalling MBC 11. MBC 11 is responsible for arbitrating and granting the bus to Controller 12. Once granted, MBC 11 is responsible for executing the requested cycle, snooping the other caches, and ending the cycle. Controller 12 supports different modes of snooping, different modes of memory bus operation, and various cache consistency protocol options. MBC 11 design dictates which of these features are used, and exactly how they are used.

F.1. Cycle Attributes and Progress

A memory bus cycle is initiated by Cache Controller 12 asserting the cache address strobe, CADS#. When asserted, this signal indicates that the cache cycle control and attribute signals are valid to MBC 11. Controller 12 also supplies the cache data strobe signal, CDTS#, to MBC 11. CDTS# tracks CADS# and indicates the start of the cycle data phase. For read cycles it indicates that starting in the next CLK, the CPU Bus 14 is in read mode under the control of the MBC 11 until the last BRDY# is asserted (specified by cycle length and cacheability attributes to MBC 11, signalled on CPU Bus 14 by Cache Controller 12 by an asserted BLAST#). In read cycles, if the MBC 11 already owns CPU Bus 14, CDTS# will be activated with CADS#. For allocate cycles the MBC 11 does not need CPU Bus 14, therefore CDTS# is activated together with CADS#.

For write cycles, CDTS# indicates that the first piece of data is available on Memory Bus 15. In 80486 CPU write cycles, this is asserted together with CADS#. For write-back cycles CDTS# indicates that all data is available, i.e., write-back-buffer or snoop buffer is loaded with correct write-back data.

As a response to the cycle request, the Memory Bus Controller 11 responds with cycle progress signals. All cycle progress signals are sampled once after CDTS# and CRDY# for the previous cycle and are then ignored until CRDY# of the corresponding cycle. BGT# indicates a commitment by the Memory Bus Controller 11 to complete the cycle execution on Memory Bus 15. Up until this point Cache Controller 12 owns the cycle. This means that intervening snoop-write-backs will abort it and Controller 12 is responsible to re-issue the cycle to the MBC 11 if necessary. One case where Cache Controller 12 will issue a new, not a re-issued, cycle: if the original CADS# operation is a write-back cycle, and the interrupting snoop cycle hits that write-back buffer, then the subsequent CADS# will be for a completely new cycle (not a re-issuing of the interrupted CADS# operation).

After MBC 11 sends Controller 12 a BGT# signal, indicating a guarantee by MBC 11 to complete the cycle on Memory Bus 15, MBC 11 owns the cycle. Controller 12 assumes the cycle will terminate and will not allow snoops until any tag changes are resolved. Following BGT# comes KWEND# which indicates that the cacheability window is closed and that Controller 12 must sample MKEN#, MRO# attributes, indicating to Controller 12 cacheability and read-only, respectively. (These attributes can be determined by decoding the controller address). Based on those attributes, Controller 12 executes allocations, line-fills, replacements, etc.

Following KWEND#, SWEND# is activated. It indicates that the snoop window is closed. Controller 12 samples MWB/WT# and DRCTM# attributes at this time. These attributes are determined by snooping the other caches in the system. At this point, Controller 12 updates its Tag RAM 31 state related to the line access in progress.

Lastly, the MBC 11 issues CRDY#, which indicates the end of the bus cycle to Cache Controller 12.

Controller 12 allows memory bus pipelining by asserting CNA# between BGT# and CRDY# which allows the MBC 11 to request a new address phase before the conclusion of the current data phase. Cache Controller 12 supports a one level deep address pipeline on Memory Bus 15.

These operations are symbolically represented in FIG. 21.

F.2. Snoop Operations

Cache Controller 12 provides for snooping operations on the memory bus to ensure cache consistency. A snoop operation consists of two phases: an initiation phase and a response phase. During the initiation phase, the MBC 11 provides Controller 12 with the snoop address information. During the response phase, Cache Controller 12 provides the snoop status information.

The three modes for initiating snoops are:
1. Strobed: the falling edge of SNPSTB# is used;
2. Clocked: SNPSTB# is sampled with SNPCLK; and
3. Synchronous: SNPSTB# is sampled with CLK.

These three snooping modes are configured as follows:
1. Strobed: The SNPCLK signal must be strapped high.
2. Clocked: The SNPCLK signal must be connected to the snoop clock source.

3. Synchronous: The SNPCLK signal must be strapped low.

FIG. 22 shows the strobed method of snoop initiation. The memory address, SNPNCA, SNPINV, and MBAOE# are latched with the falling edge of the SNPSTB#. If MAOE# is sampled active (low), the SNPSTB# will not cause a snoop. The snoop initiation is recognized by Controller 12, synchronized in the next clock, and causes a snoop in the following clock.

FIG. 23 shows the clocked method of snoop initiation. The memory address, SNPNCA, SNPINV, and MBAOE# are latched with the rising edge of SNPCLK when SNPSTB# is first sampled low. SNPSTB# must be sampled high for at least one SNPCLK in order to rearm for another snoop. If MAOE# is sampled active (low), the SNPSTB# will not cause a snoop. The snoop initiation is recognized by Controller 12, synchronized in the next clock, and causes a snoop in the following clock.

FIG. 24 shows the synchronous snoop mode. The memory address, SNPNCA, SNPINV, and MABOE# are latched with the rising edge of CLK when SNPSTB# is first sampled low. SNPSTB# must be sampled high for at least one CLK in order to rearm for another snoop. If MAOE# is sampled active (low), the SNPSTB# will not cause a snoop. The snoop initiation is recognized by the C5, Cache Controller 12, and causes a snoop in the next clock.

The snoop response phase by Cache Controller 12 consists of two parts: a state indication and a snoop processing completion signal. The response phase is always synchronous with the CPU CLK. The state indication is presented on MHITM# and MTHIT# and remains stable until the next snoop. These signals indicate the state of the cache controller line just prior to the snoop operation. MBC 11 can predict the final state of the cache controller line knowing the initial state and the SNPINV and SNPNCA inputs. The snoop completion information is determined by the SNPBSY# output. SNPBSY# output inactive indicates that Cache Controller 12 is ready to accept another snoop cycle. FIG. 25 shows Cache Controller 12 response to snoops without invalidation. The first snoop is to a line which is not currently stored in the cache, [I] state. The next snoop is to a line in [E] or [S] state and the last to a line in [M] state. FIG. 26 shows Controller 12 response to snoops with invalidation. The SNPBSY# signal will be activated for one of two reasons: a snoop hit to a modified line (SNPBSY# will remain active until the modified line has been written back), or a back invalidation is needed and there is a back invalidation in process. The SNPBSY# minimum active time is two CLK periods. This allows external logic to trap and hold active SNPBSY# with an asynchronous clock. The external logic must first look for active SNPCYC# by which Controller 12 indicates that a snoop is being executed and then trap and hold SNPBSY#.

Cache Controller 12 allows the MBC 11 to pipeline snoop operations. It also allows the next snoop address to be supplied and the next snoop requested before the last snoop has completed. The rules which govern the operation of pipelined snoops are as follows:
1. For strobed mode snoops, MBC 11 cannot cause a second falling edge of SNPSTB# until after the falling edge of SNPCYC#.
2. For clocked mode snoops, MBC 11 cannot cause a second asserted SNPSTB# to be sampled by SNPCLK, until after the falling edge of SNPCYC#.
3. For synchronous mode snoops, MBC 11 cannot cause a second falling edge of SNPSTB# to be sampled by CLK, until the CLK after SNPCYC# is active.

FIGS. 27 and 28 show how the fastest pipelined snoop operations may be achieved for the synchronous and asynchronous case respectively.

The Cache Controller 12 allows snoops to be overlapped with data transfers to and from main memory by dividing the memory bus cycle into four sectors as shown in FIG. 29.

Sector 1 follows a previous memory bus cycle (i.e. after CRDY#) and lasts until the new memory bus cycle starts (before CADS#). A snoop in this region is looked-up immediately and serviced immediately.

Sector 2 follows the start of a memory bus cycle (CADS#), but ends before Controller 12 has been granted the bus (BGT#). A snoop in this region is looked-up immediately and serviced immediately. CADS# is reissued for the aborted cycle once the snoop completes, if necessary.

Sector 3 follows after Controller 12 has been granted the bus, up until SWEND# is completed. A snoop in this region has its look-up blocked until after the SWEND#. At this point the snoop response is given, but no write-back will be initiated until after CRDY#.

Sector 4 follows after SWEND# and ends before CRDY#. A snoop in this region is looked-up immediately but serviced after CRDY#. This snoop is logically treated as if it occurred after CRDY#. (Snoop hits to modified data will schedule a write-back which will be executed after the conclusion of the current memory bus cycle.) Note that the result of the snoop (MHITM#, MTHIT#) will be available immediately with the look-up.

Cache Controller 12 uses two interlock mechanisms to ensure that snoops are identified within the proper sector. The first interlock ensures that once a BGT# has been given, snoops are blocked until after SWEND#. The second interlock ensures that once a snoop has been started, BGT# cannot be given until after the snoop has been serviced.

FIG. 30 shows that once BGT# is active, Controller 12 blocks all snoops until after SWEND#. If snoop has been initiated, and no SNPCYC# has been issued before BGT# assertion, the snoop is blocked.

FIG. 31 shows a snoop occurring before BGT#. Once Controller 12 has honored a snoop, it may ignore BGT# until the snoop is serviced. It will always ignore BGT# when SNPCYC# is active. If the snoop result is a hit to a modified line (MHITM# active), it will ignore BGT# as long as both SNPBSY# and MHITM# remain active. In this case, it is the responsibility of MBC 11 to hold BGT# until SNPBSY# goes inactive or reassert it after SNPBSY# becomes inactive. If the snoop result is not a hit to a modified line (MHITM# inactive), Controller 12 is capable of accepting BGT# even when SNPBSY# is active. This allows MBC 11 to proceed with a memory bus cycle by asserting BGT# while Controller 12 is performing back-invalidations. Even when snoops are delayed, address latching is performed with the activation of SNPSTB#. These two interlock mechanisms provide a flexible method of ensuring predictable handling of overlapped snoops.

During snoops concurrent with line-fills/allocates, the following rules must be observed in order to insure data consistency:

1. If a snoop happens before BGT#, i.e., if SNPCYC# is active before BGT#, it is the system responsibility not to return stale data within the line-fill/allocation.
2. If a snoop happens after BGT#, i.e., if SNPCYC# is active after BGT# then the C5 insures data consistency by providing interlocks with the CPU which avoid caching of stale data.

F.3. Memory Bus Controller (MBC) Interface Rules

FIG. 32 shows the progress of a memory bus cycle in terms of Cache Controller 12 input and output signals.

To begin a cache cycle, Controller 12 generates the CADS# signal. The cache address and other cycle parameters are guaranteed to be stable with CADS# assertion until the assertion of CNA# or CRDY# of that cycle. After CNA# or CRDY# is asserted, these parameters are undefined.

Either during or after CADS#, the CDTS# signal is asserted guaranteeing data is stable, or the data path is available.

BGT#, KWEND#, SWEND#, and CRDY# are generated by MBC 11 in response to CDTS#. BGT# and CRDY# are required for all (non-snoop) cycles. KWEND#, required for line-fills and write cycles with potential allocation, and SWEND#, indicating memory bus snoop completion, are only required for those cycles which sample them.

Once a pin has been sampled, it is a "don't care" until CRDY# of that cycle. Additionally, these signals plus the attributes MRO#, MKEN#, MWB/WT#, and DRCTM# need only follow setup and hold times when they are being sampled.

For pipelined cycles, the cycle attributes (BGT#, KWEND# . . .) will only be sampled after CRDY# of the previous cycle.

Snoop-write-back cycles are a subset of the normal cycles. Snoop-write-back cycles are requested as a consequence of snoop hits to modified, [M] state lines. Those are intervening cycles and are requested by activating SNPADS# instead of CADS#. For those cycles, as shown in FIG. 33, Controller 12 only samples the CRDY# response. It assumes that the MBC 11 owns the bus to perform the intervening write-back and that no other agents will snoop this cycle. Also, it will ignore CNA# during snoop-write-backs.

F.4. LOCK# Protocol

LOCK# is an input signal from CPU Bus 14 indicating that the requested memory cycle should lock the memory bus for an atomic transaction. Lock cycles are used for interprocessor task synchronization and hence a lock request propagates to Memory Bus 15.

In response to a CPU LOCK signal, Cache Controller 12 generates a signal called KLOCK#. KLOCK#, like the other cycle attributes, is valid with CADS# assertion.

When CPU 10 initiates a LOCK operation, Controller 12 always initiates a memory bus cycle. LOCK cycles are non-cacheable to both Controller 12 and CPU 10, so the information is passed through Cache Memory 13 to CPU 10 with BRDY generated by MBC 11. If a LOCKed read cycle is a cache hit to [M] state, Controller 12 ignores the data that it is receiving and supplies data from Cache Memory 13 (in accordance with the BRDYs supplied by the MBC 11). Locked writes are posted like any other write. Both read and write LOCKed cycles never change the Cache Controller 12 tag state.

Using pipelining, it is possible for the KLOCK# signal on the bus to remain active from one locked operation to the next. If the MBC wishes to relinquish the bus between locked operations, it must detect a write followed by a read cycle. All CPU locked cycles to the memory bus begin with a read cycle and typically end with a write cycle.

During a LOCKed cycle, MBC 11 must prevent other masters form snooping its cache controller to any data involved in the locked operation. Specifically, MBC 11 must prevent SNPSTB# between BGT# of the first locked transfer, and SWEND# of the last locked transfer, as shown in FIG. 34. Unless alignment of locks to cache lines is well behaved, snoops should be blocked to all addresses. If snoops can be bounded to a cache line, it is possible to snoop other lines during the locked operation.

F.5. PLOCK# Protocol

The Intel 80486 pseudo-lock output pin, PLOCK#, when asserted indicates that the current bus transaction requires more than one bus cycle to complete. Examples of such operations include floating point 64 bit reads and writes and 128 bit cache line fills. The 80486 CPU will drive PLOCK# active until the addresses for the last bus cycle of the transaction have been driven regardless of whether BRDY# has been returned.

Cache Controller 12 supports the 80486 CPU PLOCK# protocol by providing a PLOCKEN configuration input (multiplexed with CPLOCK# pin). If PLOCKEN is detected high at RESET, CPLOCK# pin reflects a modified 80486 CPU PLOCK# (LEN) output for write cycles. Controller 12 implements the following PLOCK rules: read cycles never generate CPLOCK#; if PLOCKEN is detected low at RESET, CPLOCK# is not generated and the PLOCK rules are not enforced.

The MBC 11 must not allow snoops to be initiated between BGT# of the first write and BGT# of the last write of a PLOCKed sequence, as shown in FIG. 35.

During PLOCKed hit cycles, where there is no bus activity Controller 12 blocks any snoop write-back until after the PLOCKed write cycles are complete.

A PLOCKed operation will always consist of two write cycles to the same cache line. This cache line can be in one of four possible states. The effect of a PLOCKed operation on the MESI state is described below.

[M] PLOCKed writes to the [M] state are completed before any intervening snoop can occur. Controller 12 ensures this by delaying any write-backs during this time (MTHIT# and MHITM# are generated without delay). It also delays assertion of AHOLD so that the second write can proceed. Even though an intervening snoop may change tag state, Controller 12 ensures that the second write operations sees [M] state.

[E] The first PLOCKed write upgrades the state to [M] state. Any intervening snoop is handled like the [M] case above.

[S] The first PLOCKed write hits [S] and becomes a write-through. The C5 blocks the upgrade (tag change to [E]) so the second write sees [S] also, The upgrade happens after the second write. PALLC# is inactive for both writes. If an intervening snoop invalidation changed the [S] to [I], allocation would not be allowed for either cycle.

[I] A PLOCKed write sequence to the [I] state will generate two memory bus write cycles which are PLOCKed together. Controller 12 will block allocation on the first write, but allow allocation for the second write. This prevents read-for-ownership from being implemented on PLOCKed write cycles. PALLC# is driven active on the first write even though Controller 12 blocks allocation. As a result, external tracking logic can track PLOCKed accesses to [S] and [I] states.

F.6. Consecutive Cycles

Because a secondary cache line can be longer than a CPU cache line, there are circumstances where a read miss will be to a line that is currently being filled. If this should happen, Controller 12 treats this like a read hit, but supplies data after CRDY# for the line fill. Data is supplied from SRAM 13.

F.7. CPU/Memory Bus Concurrency

Cache Controller 12 permits concurrent operation of the CPU and memory buses. CPU bus cycles will either be serviced locally by Controller 12 (hits) or require memory bus service. Whenever a CPU cycle requires memory bus service, it will be scheduled to run on Memory Bus 15, and CPU Bus 14 activity will be allowed to continue.

Example of concurrency include: snoops and CPU bus operations, posted writes with CPU and Memory Bus operations, CPU bus operation on the back of long line fills (secondary cache line longer than the CPU line), and allocations and replacements with CPU and Memory Bus operations.

In certain cases, consistency of data and prevention of deadlocks preclude concurrency. Problems may occur when the current memory bus cycle changes the tag state and therefore affects the operation of the next CPU cycle request. In those cases, Controller 12 will inhibit concurrency to ensure data consistency. Controller 12 handling of those cases is completely transparent to the MBC 11.

G. Secondary Cache Controller Cycle Timing Examples

It should be noted that the rich set of control and attribute signals generated by and applied to Cache Controller 12 are capable of handling a wide variety of secondary cache memory modes of operation. The following timing diagrams, FIGS. 36-41, are exemplary of this variety.

FIG. 36 illustrates a sequence of read hit cycles. It shows MRU hit (A, B, C) and MRU miss (D, E, F) cycles.

The first cycle (clocks 1 to 2) is a one transaction (length=1) read cycle. Controller 12 executes a cache directory (TagRAM) look-up (clocks 1-2), and detects a hit with an MRU hit. Concurrently SRAM 13 accesses the array, loads the SRAM 13 CPU buffer with the contents of both ways corresponding to the selected set. Its internal way multiplexer selects the way pointed out by the MRU bit (also corresponding to the selected set). The W/R# signal sampled low, enables the SRAM 13 outputs onto the CPU Bus 14.

Because Controller 12 detects an MRU hit, it activates the BRDY# immediately after ADS#, i.e. zero waiting state access. The BLAST# signal is sampled active by SRAM 13 by the end of clock 2 (concurrently with the BRDY#), indicating the end of the cycle.

In clock 3, CPU 10 issues an ADS# (cycle B) with a burst length of two transactions (floating point read), while in clocks 6-10 a CPU line-fill (or code prefetch) is executed (length=4).

In clock 11 CPU 10 issues a new ADS# (cycle D). Because of the MRU miss Controller 12 activates WRARR# with the correct WAY (clock 12). Upon sampling WRARR# active, SRAM 13 will update its internal MRU bit with the way information presented by the WAY signal. This information is also used by SRAM 13 to select from its CPU buffer the data corresponding to the correct way. SRAM 13 drives the CPU Bus 14 by the end of clock 13. Also a wait-state is inserted (clock 12) due to the MRU miss.

Two and four transactions read hits with MRU misses are shown in clocks 14-23 (cycles E, F).

Note that BLE# is deactivated immediately after ADS# for all cycles. It activated again in the next clock, because all cycles are hits.

FIG. 37 illustrates CPU initiated read cycles that miss the secondary cache and replace a non-dirty (e.g. clean or empty) line in the cache. In such cycles, Controller 12 will instruct the MBC 11 to perform a cache line-fill cycle on Memory Bus 15. A cache line-fill is a read of a complete cache line from main memory. The line is then written into SRAM 13, and data is transferred to the CPU 10 as requested. If the line fetched form main memory replaces a secondary cache line which is in valid unmodified state ([E] or [S]), then a back-invalidation cycle is performed on CPU Bus 14 to guarantee that the replaced data is also removed from the CPU's first level cache, thus maintaining the inclusion property.

The CPU initiates the read cycle to secondary cache where the cache tag state is looked-up. Once Controller 12 determines the cycle to be a cache miss, it issues CADS# (clock 2) and the associated cycle control signals to the MBC 11 (e.g. CW/R#, CM/IO#, CD/C#, RDYSRC, MCACHE#)in order to schedule the cache line-fill operation. MCACHE# is active, indicating that the read miss is potentially cacheable by Controller 12; RDYSRC is active, indicating that the MBC 11 must supply BRDY#s to the CPU cache core.

The memory bus address (MSET[10:0], MTAG[11:0], MCFA[6:0]) is valid with CADS# (clocks 2 and 13 for the two cycles in this example) and remain valid until after CNA# is sampled active by Controller 12 (clocks 5 and 16). MALE and MBALE may be used to hold the address as necessary.

MBC 11 arbitrates for the memory bus and returns BGT# asserted (clock 3), indicating that the cycle is guaranteed to complete on the memory bus. Once Controller 12 samples BGT# asserted, it must finish that cycle on Memory Bus 15. Prior to this point, the cycle can be aborted by a snoop hit form another cache.

CNA# is asserted by MBC 11 (clock 4) to indicate that it is ready to schedule a new memory bus cycle. Note that after CNA# activation, cycle control signals are not guaranteed to be valid.

When the MBC 11 has determined the cacheability attribute of the cycle, it drives the MKEN# signal accordingly. MBC 11 also drives the KWEND# signal at this time, indicating the end of the cacheability window. Controller 12 samples MKEN# signal accordingly. MBC 11 also drives the KWEND# signal at this time, indicating the end of the cacheability window. Controller 12 samples MKEN# during KWEND# (clock 5) to determine that the cycle is indeed cacheable.

MBC 11 asserts SWEND# when the snoop window end on the memory bus. Controller 12 samples MWB/WT# and DRCTM# during SWEND# (clock 7) and updates the cache tag state according to the consistency protocol. The closure of the snoop window also enables MBC 11 to start providing CPU 10 with data that has been stored in the secondary cache memory cycle buffer. The MBC 11 supplies BRDY# to CPU 10 (clocks 7-10).

Controller 12 issues a new CADS# in clock 13, which also misses the secondary cache. Since Controller 12 has already sampled CNA# asserted (clock 4), it issues a new CADS# prior to receiving CRDY# of the current cycle (i.e., this cycle is pipelined within the MBC 11). Note that once the cycle progress signals (BGT#, CNA#, KWEND#, SWEND#) of a cycle are sampled asserted, Controller 12 ignores them until the CRDY# of that cycle. Controller 12 does not pipeline the cycle progress signals (i.e., it will not sample them again until after CRDY# of the current memory bus cycle).

The first cycle ends when CRDY# is driven active by the MBC 11 (clock 14). It is at this time that the data in the Cache Memory 13 memory cycle buffers is loaded into the cache SRAM.

The cache controller Memory Address Latch 21 enable signals (MALE and MBALE) may remain asserted by MBC 11 to place the address latches in flow through mode. If Controller 12 is the current bus master, the memory address output enables (MAOE# and MBAOE#) should be asserted by the MBC11. MDOE# must be inactive to allow the data pins to be used as inputs.

Some time after the address has been driven onto the memory bus, data will be supplied from main memory to the C8 cache SRAM 13.

For clocked memory bus mode, MSEL# is driven active by the MBC 11 (clock 4) to allow sampling of MBRDY# and to latch MZBT# for the transfer. MZBT# is sampled on all MCLK edges where MSEL# is inactive. Once MSEL# is sampled active by Controller 12, the value of MZBT# sampled on the prior MCLK is used for the next transfer. MBRDY# is driven active by MBC 11 in clocks 4 to 6 to cause the memory burst counter to be incremented and data to be placed into the secondary cache memory cycle buffers. MBC 1 drives MEOC# asserted (clock 7) to end the current cycle on the memory bus and switch memory cycle buffers for the new cycle. MZBT# is latched at this time (when MEOC# is sampled asserted and MSEL# remains low) for the next transfer.

MBRDY# is driven active by MBC 11 in clocks 13 to 15 to read data into the secondary cache memory cycle buffers. MBC 11 asserts MEOC# (clock 16) to end the second read miss cycle on the memory bus and switch the memory cycle buffers for a new cycle.

For strobed memory bus mode, MSEL# is driven active by MBC 11 (clock 4) to allow MISTB operation and to latch MZBT# (on the falling edge of MSEL#) for the transfer. MISTB is toggled in clocks 5 to 7 to cause the memory burst counter to be incremented, and data to be placed into the secondary cache memory cycle buffers. Note that MISTB latches the memory bus data on both the rising and falling edges. The MBC 11 drives MEOC# asserted (clock 8) to end the current cycle on Memory Bus 15 and switch memory cycle buffers for the new cycle. MABT# for the next cycle, is sampled at this time on the falling edge of MEOC#.

MISTB is toggled by the MBC 11 (clocks 15-17) to read data into secondary memory cycle buffers. MBC 11 asserts MEOC# (clock 18) to end the second read miss cycle on the memory bus and switch the memory cycle buffers for a new cycle.

FIG. 38 illustrates a CPU read cycle which misses the secondary cache, and requires the replacement of a modified line (e.g. tag replacement, lines/sector=1, line ratio=1). In such cycles, Controller 12 will instruct MBC 11 to perform a cache line-fill on Memory Bus 15, instruct Cache SRAM 13 to fill its write-back buffer with the contents of the array location corresponding to the line which must be replaced, and perform a back invalidation to CPU 10 to maintain the first and second level cache consistency. Once the cache line-fill has completed, the secondary cache will write back the contents of the replaced line to main memory from the SRAM 13 write-back buffer.

The CPU initiates the read cycle to the secondary cache where the cache tag state is looked-up. Once Controller 12 determines the cycle to be a cache miss, it issues CADS# (clock 1) and the associated cycle control signals to the MBC 11 (e.g. CW/R#, CM/IO#, CD/C#, RDYSRC, MCACHE#) in order to schedule the cache line-fill operation. MCACHE# is active, indicating that the MBC 11 must supply BRDY#s to CPU 10.

The memory bus address (MSET[10:0], MTAG[11:0], MCFA[6:0]) is valid with CADS# (clocks 1 and 5 for the two cycles in this example) and remain valid until after CNA# is sampled active by Controller 12 (clocks 4 and 10). MALE and MBALE may be used to hold the address as necessary.

MBC 11 arbitrates for the memory bus and returns BGT# asserted (clock 2), indicating that the cycle is guaranteed to complete on Memory Bus 15. At this point, the SRAM 13 write-back buffer is prefilled with the line to be replaced. Once Controller 12 samples BGT# asserted, it must finish that cycle on Memory Bus 15. Prior to this point, the cycle can be aborted by a snoop hit from another cache.

CNA# is asserted by the MBC 11 (clock 3) to indicate that it is ready to schedule a new memory bus cycle. Note that after CNA# activation, cycle control signals are not guaranteed to be valid.

When MBC 11 has determined the cacheability attribute of the cycle, it drives the MKEN# signal accordingly. It also drives the KWEND# signal at this time, indicating the end of the cacheability window. Controller 12 samples MKEN# during KWEND# (clock 4) to determine that the cycle is indeed cacheable.

MBC 11 asserts SWEND# (clock 6) when the snoop window ends on Memory Bus 15. The closure of the snoop window enables MBC 11 to start providing the CPU with data that has been stored in the SRAM 13 memory cycle buffer. The MBC 11 supplies BRDY#s to CPU 10 (clocks 6-9) to serve the read cycle. Note that data may be supplied to secondary cache immediately after MSEL# activation, and need not wait for SWEND#.

On Memory Bus 15, Controller 12 issues a write-back (WB) cycle. CNA# is sampled active in clock 3 causing Controller 12 to issue the CADS# (also CDTS#) of the write-back (clock 5). The MBC 11 knows this is a write back cycle and not a CPU 10 initiated write cycle by sampling MCACHE# asserted. This tells the MBC 11 how many data transfers are necessary.

BGT#, CNA#, and KWEND# of the write-back are sampled asserted by the MBC 11 (clock 9) after the CRDY# of the read miss cycle (clock 8). At this point, Controller 12 may issue another CADS# for a new (unrelated) memory bus cycle. Also, the data in the cache memory cycle buffers is loaded into SRAM. The data to be written back to main memory is in the Cache SRAM 13 write back buffers.

The snoop window for the write back cycle is closed by MBC 11 in clock 11, and the cycle is ended by CRDY# sampled asserted in clock 13.

The memory address latch enables (MALE and MBALE) may remain asserted by MBC 11 to place the address latches in flow through mode. If Controller 12 is the current bus master, the memory address output enables (MAOE# and MBAOE#) should be asserted by MBC 11.

Some time after the address has been driven onto Memory Bus 15, data will be supplied from main memory to Cache SRAM 13.

For clocked memory bus mode, MSEL# is driven active by MBC 11 (clock 3) to allow sampling of MBRDY# and to latch MZBT# for the transfer. MZBT# is sampled on all MCLK edges where MSEL# is inactive. Once MSEL# is sampled active by Controller 12, the value of MZBT# sampled on the prior MCLK is used for the next transfer. MBRDY# is driven active by MBC 11 in clocks 3 to 5 to cause the memory burst counter to be incremented and data to be placed into the secondary cache memory cycle buffers. MBC 11 drives MEOC# asserted (clock 6) to end the current cycle on Memory Bus 15 and switch memory cycle buffers for the new cycle. MZBT# is latched at this time (when MEOC# is sampled asserted) for the next transfer.

MBC 11 asserts the memory data output enable signal (MDOE#, clock 8) to drive the memory data outputs.

MBRDY# is driven active by MBC 11 in clocks 10 to 12 to write data from the Cache SRAM 13 memory cycle buffers onto the memory bus. MBC 11 asserts MEOC# (clock 13) to end the write back cycle on the memory bus and switch the memory cycle buffers for a new cycle.

For strobed memory bus mode, MSEL# is driven active by MBC 11 (clock 4) to allow MISTB operation and to latch MZBT# for the transfer (on MSEL# falling edge). MISTB is toggled in clocks 5 to 7 to cause the memory burst counter to be incremented, and data to be placed into the SRAM 13 cache memory cycle buffers. Note that MISTB latches the memory bus data on both the rising and falling edges. MBC 11 drives MEOC# asserted (clock 8) to end the current cycle on Memory Bus 15 and switch memory cycle buffers for the new cycle. MZBT# for the next cycle, is latched at this time on the falling edge of MEOC#.

MBC 11 asserts MDOE# (clock 9) to drive the memory data outputs.

MOSTB is toggled by MBC 11 (clocks 10 to 12) to write data from the SRAM 13 memory cycle buffers onto the memory bus. MBC 11 asserts MEOC# (clock 13) to end the write back cycle on Memory Bus 15 and switch the memory cycle buffers for a new cycle.

FIG. 39 illustrates a sequence of CPU memory write cycles that hit Controller 12 entries marked in the [E] or [M] states. Such cycles are served by Controller 12 by directly writing to the Cache SRAM 13 array, without any Memory Bus 15 activity.

In clock 1, the first CPU write cycle (A) starts. Controller 12 looks-up the cache directory (TagRAM) and detects a hit to [E] or [M] states in clock 2. WRARR# is activated in clock 2 in preparation for the ARRAY write, and WAY points to the way to be written. Controller 12 asserts BRDY# in clock 2 (zero wait-state). Because the BLAST# is also active in clock 2, SRAM 13 executes a write cycle into the array in the first half of clock 3.

Cycles B and C are PLOCKed. For those cycles Controller 12 ensures that the second PLOCKed ADS# (C) is guaranteed to execute before AHOLD assertion, i.e., the AHOLD assertion is delayed until the second ADS# is issued by CPU 10.

FIG. 40 illustrates a CPU 10 initiated write cycle which misses the secondary cache and follows the write to main memory with an allocation cycle. An allocation occurs when the cache follows a write-miss cycle with a line-fill. This example assumes that allocating the new line requires the replacement of a modified line (i.e., a write-back to main memory).

CPU 10 initiates the write cycle to the secondary cache where the cache tag state is looked-up. Once Controller 12 determines the cycle to be a cache-miss, it assures CADS# (clock 1) and the associated cycle control signals to the MBC 11 (e.g. CW/R#, CM/IO#, CD/C#, RDYSRC#, MCACHE#, PALLC#) in order to schedule the write operation. MCACHE# is not active; RDYSRC is not active, indicating that Controller 12 will supply BRDY# to CPU 10; PALLC# is asserted , indicating a potential allocate cycle after the write-through cycle.

The write-miss data is posted in the SRAM 13 memory cycle buffer, and the cycle completes with no wait states to CPU 10. CPU 10 is free to issue another (non-related) cycle while waiting for Controller 12 to complete the allocation. If this new cycle is a cache hit, it will be serviced by the Controller 12 immediately; but if it is a cache miss, its service will wait until the CRDY# of the allocation.

The memory bus address (MSET[10:0], MTAG[11:0], MCFA[6:0]) is valid with CADS# (clocks 1,5, and 10 for the three cycles in this example) and remains valid until after CNA# is sampled active by Controller 12 (clocks 4, 10, and 15). MALE and MBALE may be used to hold the address as necessary.

The MBC 11 arbitrates for Memory Bus 15 and returns BGT# asserted (clock 2), indicating that the write-through cycle is guaranteed to complete on Memory Bus 15. Once Controller 12 samples BGT# asserted, it must finish that cycle on Memory Bus 15. Prior to this point, the cycle can be aborted by a snoop hit from another cache.

CNA# is asserted by the MBC 11 (clock 3) to indicate that it is ready to schedule a new memory bus cycle. Note that after CNA# activation, cycle control signals are not guaranteed to be valid.

When MBC 11 has determined the cacheability attribute of the write through cycle, it drives the MKEN# signal accordingly. It also drives the KWEND# signal at this time, indicating the end of the cacheability window.

Cache Controller 12 samples MKEN# active during KWEND# (clock indicating that the missed line should be allocated in its cache.

At the first available time (clock 5), Controller 12 asserts CADS# to request an allocation cycle. The cycle controller signals are valid at this point: MCACHE# is active, indicating the cacheability of the line-fill cycle; RDYSRC is not active, indicating that MBC 11 need not supply BRDY#s to CPU 10 (no BRDY#s are necessary for an allocation cycle).

MBC 11 asserts SWEND# (clock 6) when the snoop window of the write through cycle ends on Memory Bus 15.

MBC 11 may return CRDY# to the secondary cache Controller 12 and SRAM 13 any time after the closure of the snoop window. In this example, k CRDY# is issued by MBC 11 in clock 8. Also, the cycle progress signals for the allocation cycle may be issued by MBC 11 to complete the line fill.

Once again, MBC 11 arbitrates for the Memory Bus 15 and returns BGT# asserted (clock 9) for the allocation cycle. MBC 11 also asserts CNA# and KWEND# at this time. Controller 12 back-invalidates CPU 10 to maintain first and second level cache consistency.

In clock 10, Cache Controller 12 asserts CADS# for the write back cycle (because the miss was to a dirty line). CDTS# is asserted by Controller 12 two clocks later (clock 12). CDTS# of the write back cycle is not asserted with CADS# because the data is not yet available in the SRAM 13 write-back buffer.

MBC 11 asserts SWEND# (clock 11 ) when the snoop window of the allocation cycle ends on the Memory Bus 15.

At this time, MBC 11 may assert CRDY# to Controller 12 and SRAM 13 for the allocation cycle. CRDY# assertion will cause the data stored in the SRAM 13 memory cycle buffers to be latched into the cache array.

During clock 14, BGT#, CNA#, and SWEND# area sampled active for the write back cycle. The snoop window is closed two clocks later (clock 16) by MBC 11 with SWEND#, and the write back cycle is completed with CRDY# asserted in clock 18.

The Memory Address Latch 21 enable signals (MALE, and MBALE) may remain asserted by MBC 11 to place the address latches in flow through mode. If Controller 12 is the current bus master, the memory address output enable signals (MAOE# and MBAOE#) should be asserted by MBC 11.

For clocked memory bus mode, the memory data output enable (MDOE#) has been asserted by MBC 11 to drive the memory data outputs.

MEOC# is asserted by MBC 11 (clock 4) to latch MZBT# for the transfer, and end the current cycle on the memory bus (MBRDY# is not necessary because this example shows a single transfer write miss cycle). MZBT# is driven high by MBC 11 in order to force the read cycle to begin with the correct burst address. MFRZ# is driven inactive by MBC 11, allowing the line to be placed into the exclusive ([E]) state and requiring the data to be written to main memory.

For the allocation (line fill) cycle, MSEL# is driven active by MBC 11 (clock 6) to allow sampling of MBRDY# and to latch MABT# for the transfer. MZBT# is sampled on all MCLK edges where MSEL# is inactive. Once MSEL# is sampled active by Controller 12, the value of MZBT# sampled on the prior MCLK is used for the next transfer. MDOE# is also deasserted in clock 6 to allow the data pins to be used as inputs for the allocation cycle.

MBRDY# is driven active by MBC 11 in clocks 7 to 9 to cause the memory burst counter to be incremented and data to be placed into the SRAM 13 cache memory cycle buffers. MBC 11 drives MEOC# asserted (clock 10) to end the allocation cycle on Memory Bus 15 and the SRAM 13 switch memory cycle buffers for the new cycle. MZBT# is sampled and latched at this time for the next data transfer.

MDOE# is asserted by the MBC (clock 12) to drive the memory data outputs for the write back cycle.

MBC 11 again asserts MBRDY# (clocks 13 to 15) for the write-back cycle to increment the memory burst counter and cause data to be read from the SRAM 13 memory cycle buffers. The write-back cycle ends on Memory Bus 15 and switches memory cycle buffers with MEOC# assertion (clock 16). MZBT# and MFRZ# for the next transfer are sampled at this time. MFRZ# need not be active since the cycle is not potentially allocatable.

For strobed memory bus mode, the memory data output enable (MDOE#) has been asserted by MBC 11 to drive the memory data outputs for the write-miss cycle.

MEOC# is driven active by MBC 11 (clock 4) to latch MABT# for the transfer, and end the current cycle on Memory BUS 15 (MOSTB is not necessary because this example shows a single transfer cycle). MZBT# is driven high by MBC 11 in order to force the read cycle to begin with the correct burst address. MFRZ# is driven deasserted by MBC 11, allowing the line to be placed into the exclusive ([E]) state.

For the allocation (line fill) cycle, MSEL# is driven active by MBC 11 (clock 6) to allow MISTB operation and to latch MZBT# for the transfer. MISTB is toggled in clocks 8 to 10 to cause the memory burst counter to be incremented, and data to be placed into SRAM 13 cache memory cycle buffers. MISTB latches the memory bus data on both the rising and falling edges. MDOE# is also deasserted in clock 6 to allow the data pins to be used as inputs for the allocation cycle.

MBC 11 drives MEOC# asserted (clock 11) to end the allocation cycle on Memory Bus 15 and switch memory cycle buffers for the new cycle. MABT# for the next cycle, is latched at this time on the falling edge of MEOC#.

MDOE# is asserted by MBC 11 (clock 14) to drive the memory data outputs for the write back cycle.

MBC 11 toggles MOSTB (clocks 15 to 17) for the write back cycle to increment the memory burst counter and cause data to be read from the SRAM 13 memory cycle buffers.

The write-back cycle ends on the Memory Bus 15 and switches memory cycle buffers with MEOC# assertion (clock 18). MZBT# and MFRZ# for the next transfer, are sampled at this time. MFRZ# need not be active because the cycle is not potentially allocatable.

FIG. 41 illustrates a snoop hit to a dirty line sequence occurring simultaneously with a CPU 10 initiated read-miss cycle. This example assumes synchronous snooping mode (i.e., requests for snoops are done via SNPSTB# from MBC 11, sampled on the Controller 12 CLK).

In clock I SNPSTB# is asserted by the MBC 11, indicating a request for snooping to Controller 12. Controller 12 samples MAOE# (it must be inactive) in order to recognize the snoop request. It is latched together with the snoop address (MSET[0:10], MTAG[0:11], MCFA[0:6]), SNPINV, MBAOE#, and SNPNCA on the Controller 12 CLK during SNPSTB# assertion. The tag look-up is done immediately after SNPSTB# is sampled active since snoop operations have the highest priority in the cache tag state arbiter. Controller 12 issues SNPCYC# (clock 2), indicating that the snoop look-up is in progress. The results of the look-up are driven to the memory bus via MTHIT# and MHITM# in the next clock after SNPCYC#. Because the snoop hit a modified line, both signals are asserted (clock 3). SNPBSY# is also issued to indicate that Controller 12 is busy with CPU 10 back-invalidations, the SRAM 13 snoop buffer if full, or a write-back is to follow. Controller 12 will accept snoops only when SNPBSY# is inactive.

Simultaneously with Memory Bus 15 activity due to the snoop request, CPU 10 initiates a read-miss cycle. Controller 12 issues a memory bus request (CADS#0, CDTS#, and cycle control signals to MBC 11 in clock 3. MBC 11 must wait for the pending snoop cycle to complete on Memory Bus 15 prior to servicing this read-miss cycle.

The memory bus address (MSET[10:0], MTAG[11:0], MCFA[6:0]) is not valid until MAOE# goes active after CRDY# of the snoop write back cycle is sampled active by Controller 12 and the CADS# is reissued (clock 13).

In clock 4 Controller 12 issues SNPADS# and cycle control signals to MBC 11 indicating a request to flush a modified line out of the secondary cache. SNPADS# activation causes MBC 11 to abort the pending read-miss cycle. It is the Controller 12 responsibility to re-issue the aborted cycle after the completion of the write-back, because BT# was not asserted by MBC 11.

Data is loaded into the SRAM 13 snoop buffer. Because SNPINV was sampled asserted by Controller 12 (clock 1) during SNPSTB# assertion, it back-invalidated the CPU 10 first level cache.

Controller 12 asserts CDTS# (clock 8) indicating to MBC 11 that data is available in the snoop buffer. When MBC 11 completes the write back cycle on Memory Bus 15, it activates CRDY# to the secondary cache Controller 12 and SRAM 13. At this time, Controller 12 deasserts SNPBSY# (clock 13) and re-issues the aborted read-miss cycle (clock 13) by asserting CADS# and CDTS#.

For clocked memory bus mode, the memory data output enable (MDOE#) is not activated by MBC 11 in order to allow the memory data pins to be used as inputs.

MSEL# is driven active by MBC 11 (clock 4) to allow sampling of MBRDY# and to latch MZBT# for the read-miss transfer. MZBT# is sampled on all MCLK rising edges where MSEL# is inactive. Once MSEL# is sampled active by Controller 12, the value of MZBT# sampled on the prior MCLK is used for the next transfer.

Because the read miss cycle is aborted due to the snoop hit to a modified line (requires a write-back cycle), no MEOC# is given. MSEL# is deasserted by MBC 11 (clock 6) and reasserted (clock 8) to allow latching of MZBT# for the snoop write back cycle and sampling of MBRDY# for that cycle. MFRZ# is also sampled at this time.

The memory data output enable (MDOE#) signal is driven active by MBC 11 (clock 7) to drive the memory data outputs.

MBRDY# is driven active by MBC 11 in clocks 10 to 12 to cause the memory burst counter to be incremented and data to be written form the secondary cache snoop buffers. MBC 11 drives MEOC# asserted (clock 13) in order to end the write-back cycle on the memory bus and switch memory cycle buffers for the new cycle. MZBT# and MFRZ# are sampled and latched at this time for the next data transfer.

MDOE# is deasserted by MBC 11 (clock 14) to allow the memory data pins to be used as inputs for the reissued read cycle.

For strobed memory bus mode, the memory data output enable (MDOE#) has not been asserted by MBC 11 in order to allow the memory data pins to be used as inputs for the read-miss cycle.

MSEL# is asserted by MBC 11 (clock 4) to allow sampling of MISTB and latch MZBT# (on the falling edge of MSEL#) for the read-miss transfer.

Because the read-miss cycle is aborted due to the snoop-hit to a modified line (requires a write-back cycle), no MEOC# is given. MSEL# is deasserted by MBC 11 (clock 5) and reasserted (clock 6) to allow latching of MZBT# for the snoop-write-back cycle and sampling of MOSTB for that cycle. MFRZ# is also sampled at this time.

MOSTB is toggled in clocks 11 to 13 to cause the memory burst counter to be incremented, and data to be read from the secondary cache memory cycle buffers. MOSTB latches the memory bus data on both the rising and falling edges. MBC 11 drives MEOC# asserted (clock 14) to end the snoop-write-back cycle on the memory bus and to switch memory cycle buffers for the new cycle. MZBT# and MFRZ# for the next cycle, are latched at this time on the falling edge of MEOC#.

MDOE# is deasserted by MBC 11 (clock 14) to allow the memory data pins to be used as inputs for the reissued read-miss cycle.

We claim:

1. A second level cache controller integrated circuit for use in a microprocessor system second level cache memory subsystem, the second level cache memory subsystem connected to a control processor unit (CPU) by means of a CPU bus and to a main memory bus for independently accessing a cache memory from the CPU bus and the main memory bus and for transferring data between the CPU bus and the main memory bus, the second level cache memory subsystem includes a memory bus controller for controlling access to and from the main memory bus, a cache memory coupled to the CPU bus and the main memory bus for data storage and retrieval, and a second level cache controller integrated circuit for control of the cache memory and independent data paths to and from the CPU bus and the main memory bus, the second level cache controller integrated circuit comprising:

a) a memory bus controller interface for coupling to the main memory bus controller and for adapting the second level cache controller to a specific main memory bus protocol;

b) a memory bus address queue coupled to the memory bus controller interface for scheduling main memory bus accesses by providing line and subline address data;

c) a CPU bus interface for coupling to the CPU bus and connected to the memory bus address queue for transmission of memory bus address data from the CPU bus to the memory bus address queue;

d) a cache memory interface for coupling to the secondary cache memory for control of the cache memory input and output cycles;

e) a memory bus interface for coupling to the main memory bus, for accepting and sending main memory bus addresses, and for performing snoop operations, connected to memory bus queue for acceptance of memory bus addresses originating from the CPU bus;

f) a cache directory array coupled to the memory bus interface for snoop addresses, coupled to the CPU bus interface for cache access addresses and having an output for coupling address information to the cache memory interface; and g) a snoop controller, selectably configurable for operation in a synchronous, an asynchronous, a strobed, and a clocked snoop mode, coupled to a second level cache controller clock, coupled to the main memory bus for receipt of snoop requests including snoop strobe and snoop clock signals, coupled to the memory bus interface for control of snoop address delivery to the cache directory array, coupled to the cache directory. array for delivering a snoop request and for receiving back a snoop request status signal, and coupled to the memory bus controller for communicating the snoop request status signal.

2. The integrated circuit of claim 1 wherein the memory bus interface further comprises:

a) a memory bus address latch connected to the memory bus controller interface for latch control and connected to the memory bus address queue for receiving memory bus addresses;

b) output control means connected to the memory bus controller interface for control and to the memory bus address latch output for connecting the memory bus address latch contents to the main memory bus; and c) a snoop latch with its input coupled to the main memory bus for receiving snoop requests and addresses with its output coupled to the cache directory array for initiating a cache memory look-up.

3. The integrated circuit of claim 2 further comprising a multiplexer with a first input connected to the CPU interface output, a second input connected to the snoop latch output, and an output connected to the cache directory array, for selecting an input address to the cache directory array.

4. The integrated circuit of claim 2 wherein the snoop latch further comprises:

a) a first latch, normally open, having an input, an output, and a latch control input, the input coupled to the main memory bus for receiving a snoop address data, and the latch control input coupled to the snoop controller; and b) a second latch, having an input, an output, and a latch control input, the input coupled to the first latch output, for receiving and latching the input data as directed by the second latch control input, the latch control input coupled to the snoop controller, and the output coupled to the cache directory array.

5. The integrated circuit of claim 4 wherein the snoop controller further comprises:

a) sampling means for sampling the snoop request strobe state synchronously with the snoop clock;

b) a first multiplexer, responsive to the snoop mode control signals for a selected configuration, for selecting the snoop request strobe or the synchronously sampled snoop request strobe and providing at its output the selected signal as a control signal to the First latch control input;

c) a synchronizer for providing controlled delay for synchronizing the output of the first multiplexer with the second level cache clock at the synchronizer output; and d) a second multiplexer, responsive to the snoop mode control signals for a selected configuration, for selecting the output of the synchronizer or the snoop request strobe and providing at its output the selected signal as a control signal to the second latch control input and as snoop request signal to the cache directory array.

6. The integrated circuit of claim 5 wherein the snoop controller further comprises means for selectively operating the second level cache controller in various configurable snooping modes including:

a) a strobe latching mode wherein addresses are latched by the snoop request strobe;

b) a clocked asynchronous latching mode wherein addresses are latched by the snoop clock sampled snoop strobe output signal of the sampling means;

c) a synchronous latching mode wherein the snoop strobe remains inactive and the snoop address flows through the first latch and is clocked out of the second latch; and d) an asynchronous snooping mode wherein the synchronizer output is selected as the output the second multiplexer.

7. The integrated circuit of claim 5 wherein the first snoop latch additionally passes on control signals for the cache array directory including: a snoop invalidation signal for forcing a snoop hit into an invalid state; a main memory bus output enable for enabling a snoop; and a snoop noncaching device access signal indicating that the main memory bus snoop source is a noncaching device.

8. The integrated circuit of claim 5 wherein the snoop controller is coupled to the cache array directory for receiving a signal indicating if a snoop produced a hit that resulted in an altered line and, if so, invalidating a copy of the altered data in the primary cache memory of the CPU.

9. A second level cache memory system connected between a central processor (CPU) bus and a main memory bus, the CPU having a first level cache memory, the second level cache memory system comprising:

a) a cache memory subsystem with two independent cache data paths, one path coupled to the CPU bus and another coupled to the main memory bus, and a data path between the CPU bus and the main memory bus, operating synchronously with the CPU bus and asynchronously with the memory bus, controlled by a second level cache controller;

b) a second level cache controller integrated circuit comprising:

i) a memory bus controller interface for coupling to the main memory bus controller and for adapting the second level cache controller to a specific main memory bus protocol;

ii) a memory bus address queue coupled to the memory bus controller interface for scheduling main memory bus accesses by providing line and subline address data;

iii) a CPU bus interface for coupling to the CPU bus and connected to the memory bus address queue for transmission of memory bus address data from the CPU bus to the memory bus address queue;

iv) a cache memory interface for coupling to the secondary cache memory for control of the cache memory input and output cycles;

v) a memory bus interface for coupling to the main memory bus for accepting and sending main memory bus addresses, and for performing snoop operations, and connected to memory bus queue for acceptance of memory bus addresses originating from the CPU bus;

vi) a cache directory array coupled to the memory bus interface for snoop addresses, coupled to the CPU bus interface for cache access addresses and having an output for coupling address information to the cache memory interface; and vii) a snoop controller, configurable for a synchronous, an asynchronous, a strobed, and a clocked snoop mode, coupled to a second level cache controller clock, coupled to the main memory bus for receipt of snoop requests including snoop strobe and snoop clock signals, coupled to the memory bus interface for control of snoop address delivery to the cache directory array, coupled to the cache directory array for delivering a snoop request and for receiving back a snoop request status signal, and coupled to the memory bus controller for communicating the snoop request status signal; and c) a main memory bus controller, coupled to the main memory bus and cache controller for arbitrating and controlling access to the main memory bus using address data supplied by the second level cache controller for sending write data from the cache memory subsystem and for receiving data from the main memory bus.

* * * * *